US011395244B2

(12) United States Patent
Moon et al.

(10) Patent No.: US 11,395,244 B2
(45) Date of Patent: Jul. 19, 2022

(54) APPARATUS AND METHOD FOR SUPPORTING BURST ARRIVAL TIME REFERENCE CLOCK BASED ON TIME-SENSITIVE COMMUNICATION ASSISTANCE INFORMATION IN WIRELESS COMMUNICATION NETWORK

(71) Applicant: Samsung Electronics Co., Ltd., Suwon-si (KR)

(72) Inventors: Sangjun Moon, Suwon-si (KR); Youngkyo Baek, Suwon-si (KR); Jungshin Park, Suwon-si (KR); Jicheol Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 97 days.

(21) Appl. No.: 16/862,005

(22) Filed: Apr. 29, 2020

(65) Prior Publication Data
US 2020/0351804 A1 Nov. 5, 2020

(30) Foreign Application Priority Data

May 3, 2019 (KR) .................. 10-2019-0052583
Jan. 3, 2020 (KR) .................. 10-2020-0001070

(51) Int. Cl.
*H04W 56/00* (2009.01)
*H04W 76/25* (2018.01)
(52) U.S. Cl.
CPC ......... *H04W 56/001* (2013.01); *H04W 76/25* (2018.02)

(58) Field of Classification Search
CPC ............... H04W 56/001; H04W 76/25; H04W 56/0015; H04W 56/0075
See application file for complete search history.

(56) References Cited

U.S. PATENT DOCUMENTS 9,179,475 B2    11/2015  Koleszar et al.
2019/0289616 A1*  9/2019  Hampel ............ H04W 72/1242
(Continued)

OTHER PUBLICATIONS

3rd Generation Partnership Project; Technical Specification Group Services and System Aspects; System Architecture for the 5G System; Stage 2. (Release 16); Jun. 2019.
(Continued)

*Primary Examiner* — Dinh Nguyen
(74) *Attorney, Agent, or Firm* — Jefferson IP Law, LLP

(57) ABSTRACT

The disclosure relates to a pre-$5^{th}$-Generation (5G) or 5G communication system to be provided for supporting higher data rates Beyond $4^{th}$-Generation (4G) communication system such as Long Term Evolution (LTE). A method for obtaining clock synchronization information in a base station configured to operate based on a reference clock of a wireless communication system in a wireless communication system is provided. The method includes obtaining a burst arrival time of TSCAI (time-sensitive communication assistance information) based on a TSN (time-sensitive networking) clock, obtaining offset information indicating the difference between the TSN clock and a reference clock of the wireless communication system, and adjusting the burst arrival time, based on the offset to obtain an adjusted burst arrival time based on a reference clock of the wireless communication system.

18 Claims, 61 Drawing Sheets

(56) References Cited

U.S. PATENT DOCUMENTS

| | | | |
|---|---|---|---|
| 2020/0137756 A1* | 4/2020 | Lee | H04W 72/02 |
| 2020/0259896 A1* | 8/2020 | Sachs | H04W 12/03 |
| 2020/0267084 A1* | 8/2020 | Hande | H04W 72/087 |

OTHER PUBLICATIONS

3rd Generation Partnership Project; Technical Specification Group Services and System Aspects; System Architecture for the 5G System (5GS); Stage 2. (Release 16); Dec. 2019.
3GPP TSG-SA WG2 Meeting #133; S2-1906752; May 17, 2019; Reno, US. (revision of S2-1906613).
SA WG2 Meeting #134; S2-1908574; Jun. 28, 2019; Sapporo, Japan. (Revision of S2-1907143,8390,8542).
3GPP TSG-SA WG2 Meeting #134; S2-1908575; Jun. 28, 2019; Sapporo, Japan, (was 8543,8392,7690).
International Search Report dated Aug. 13, 2020, issued in an International Application PCT/KR2020/005753.
Nokia et al.; Clarifications on TSC Assistance Information; R2-1907194, May 2, 2019.
Qualcomm Incorporate; TSN Time Synchronization; S2-1903326, Apr. 2, 2019.
China Telecom; Discussion on RAN3 Impact of TSC QoS;, R3-192277, Apr. 30, 2019.
Nokia et al., Evaluation for TSN Time Synchronization; S2-1903650, Apr. 2, 2019.
Samsung, The clock the periodicity and burst arrival time should refer to; S2-1903641, Apr. 2, 2019.
Nokia, Nokia Shanghai Bell; Update to Support PDU Session Binding; SA WG2 Meeting #132; S2-1903656 Apr. 2, 2019, Xian, China.
ZTE; Discussion and proposai on the ENs in the TSC; SA WG2 Meeting #132; S2-1903612; Apr. 2, 2019, Xian, China.
Extended European Search Report dated Apr. 14, 2022, issued in a counterpart European Application No. 208025671.

* cited by examiner

APPARATUS AND METHOD FOR SUPPORTING BURST ARRIVAL TIME REFERENCE CLOCK BASED ON TIME-SENSITIVE COMMUNICATION ASSISTANCE INFORMATION IN WIRELESS COMMUNICATION NETWORK

CROSS-REFERENCE TO RELATED APPLICATION(S)

This application is based on and claims priority under 35 U.S.C. § 119(a) of a Korean patent application number 10-2019-0052583, filed on May 3, 2019, in the Korean Intellectual Property Office, and of a Korean patent application number 10-2020-0001070, filed on Jan. 3, 2020, in the Korean Intellectual Property Office, the disclosure of each of which is incorporated by reference herein in its entirety.

BACKGROUND

1. Field

The disclosure relates to a wireless communication system. More particularly, the disclosure relates to an apparatus and method for providing additional information to a base station to efficiently process traffic for time-sensitive communication when clock synchronization between nodes is provided in a wireless communication system.

2. Description of Related Art

To meet the demand for wireless data traffic having increased since deployment of $4^{th}$ generation (4G) communication systems, efforts have been made to develop an improved $5^{th}$ generation (5G) or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid frequency-shift keying (FSK) and quadrature amplitude modulation (QAM) Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

In a 5G wireless communication system, clock synchronization between nodes in the system is required for normal use of the system.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method for transmitting and receiving clock information between a gateway (e.g., user-plane function (UPF)) and a terminal (e.g., user equipment) (UE)) has been proposed to allow a clock synchronization function, which to date has only been supported by wired networks, to also be supported on wireless communication networks. According to this method, a gateway, a terminal, and a base station (e.g., gNB), which are nodes in a wireless communication network, are all synchronized using a common clock (e.g., 5GS clock) while the base station is not synchronized with a clock (e.g., time-sensitive networking (TSN)) on a wired network.

Meanwhile, a representative of time-sensitive communication (TSC) traffic is periodic traffic, which has a traffic pattern including period, a burst size, and a burst arrival time. However, there already exists a standard to centrally collect and manage traffic patterns. Resources can be efficiently managed if a base station (gNB) of a wireless communication network utilizes a TSC traffic pattern (time-sensitive communication assistance information (TSCA)) by utilizing this standard. For example, the base station allocates resources for a burst size to perform transmission at a burst arrival time for each pre-configured time period.

In the case of utilizing a clock synchronization method using the wireless communication network proposed above, a gateway (UPF) and a terminal (UE) of the wireless communication network are aware of the clock (TSC clock) of the wired network while the base station (gNB) is not. Therefore, the base station may be aware of the exact reference clock of TSCAI.

Another aspect of the disclosure is to provide an apparatus and method for providing additional information to a base station for efficient processing of traffic for time-sensitive communication in order to make the base station aware of the exact reference clock of TSCAI in a wireless communication system.

Additional aspects will be set forth in part in the description which follows and, in part, will be apparent from the description, or may be learned by practice of the presented embodiments.

In accordance with an aspect of the disclosure, a method for obtaining clock synchronization information in a base station configured to operate based on reference clock of a wireless communication system in a wireless communication system is provided. The method includes obtaining a burst arrival time of TSCAI (time-sensitive communication assistance information) based on a TSN (time-sensitive networking) clock, obtaining offset information indicating the difference between the TSN clock and a reference clock of the wireless communication system, and adjusting the burst arrival time, based on the offset to obtain an adjusted burst arrival time based on the reference clock of the wireless communication system.

In accordance with another aspect of the disclosure, a method for obtaining clock synchronization information in a base station configured to operate based on a reference clock of a wireless communication system in a wireless communication system is provided. The method includes obtaining an adjusted burst arrival time obtained by adjusting a burst arrival time of TSCAI (time-sensitive communication assistance information) based on a TSN (time-sensitive networking) clock, based on a reference clock of the wireless communication system.

In accordance with another aspect of the disclosure, an apparatus and method are provided. The apparatus and method enable clock synchronization between nodes in a wireless communication network.

In accordance with another aspect of the disclosure, an apparatus and method are provided. The apparatus and method can be utilized in applications requiring clock synchronization between nodes, such as in factory automation.

In accordance with another aspect of the disclosure, an apparatus and method are provided. The apparatus and method enable a base station of a wireless communication network to efficiently allocate resources when time-sensitive communication traffic passes through a wireless communication network.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1A:
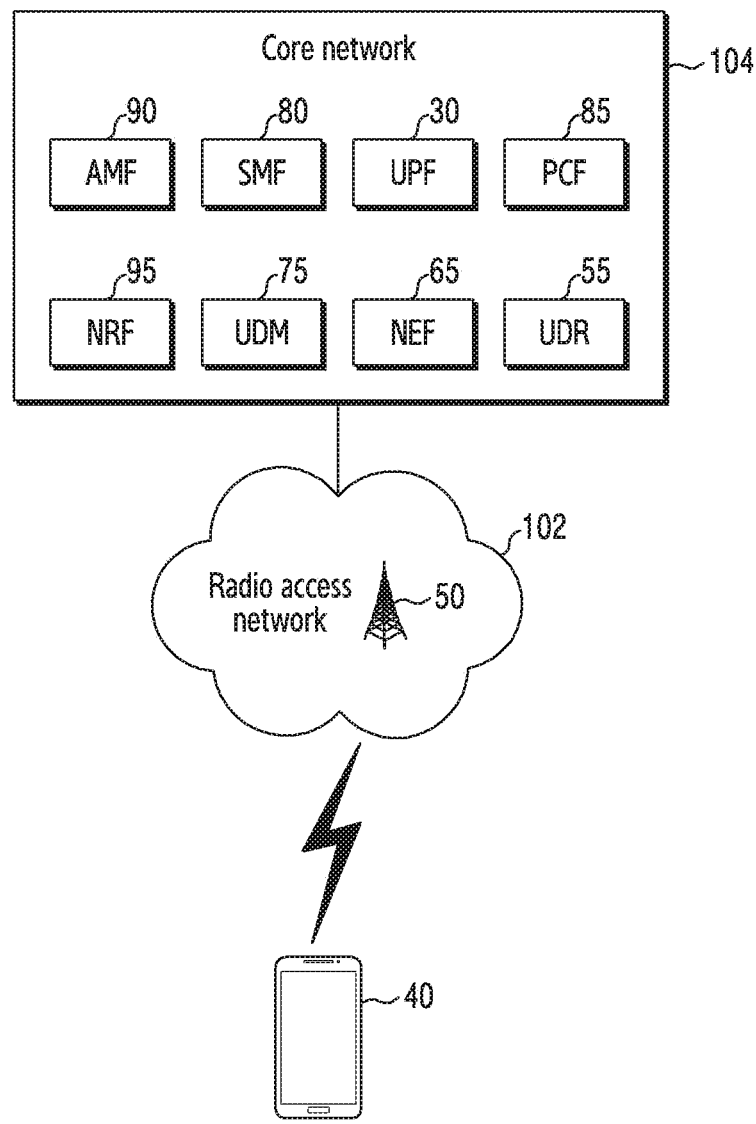
FIG. 1A illustrates a wireless communication system according to an embodiment of the disclosure.

The following description with reference to the accompanying drawings. is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the following description, terms for identifying access nodes, terms referring to network entities, terms referring to messages, terms referring to interfaces between network entities, terms referring to various identification information, and the like are illustratively used for the sake of convenience. Therefore, the disclosure is not limited by the terms as used below, and other terms referring to subjects having equivalent technical meanings may be used.

In the disclosure, the expressions "exceeding" (or "larger than" or "greater than") or "less than" (or "below" or "smaller than") may be used to determine whether a certain condition is satisfied or fulfilled. However, this is only a description for expressing an example, and does not exclude the cases of "equal to or greater than" or "equal to or less than". In relation to described conditions, "equal to or greater than", "less than or equal to", and "equal to or greater than and less than" may be replaced by "exceeding", "less than", and "exceeding and less than or equal to", respectively.

For convenience of description below, terms and names defined according to $5^{th}$ generation system (5GS) and new-radio (NR) standards, which are the most recent standards defined by the $3^{rd}$ generation partnership project (3GPP) group, among existing communication standards, are used in the disclosure. However, the disclosure is not limited by the terms and names and may be equally applied to wireless communication networks according to other standards. In particular, the disclosure may be applied to 3GPP 5GS/NR, which is a $5^{th}$ generation wireless communication standard.

FIG. 1A illustrates a wireless communication system according to an embodiment of the disclosure.

Referring to FIG. 1A, a wireless communication system includes a radio access network (RAN) 102 and a core network (CN) 104.

The radio access network 102, which is a network that is directly connected to a user device, for example, a terminal 40, is an infrastructure that provides wireless connection to the terminal 40. The radio access network 102 may include a group of a plurality of base stations including a base station 50, and the plurality of base stations may perform communication via an interface configured therebetween. At least a part of the interfaces between the plurality of base stations may be wired or wireless. The base station 50 may have a structure having a central unit (CU) and a distributed unit (DU) separated from each other. In this case, one CU may control a plurality of DUs. The base station 50 may be referred to as a "access point (AP)", a "next-generation node (gNB)", a "$5^{th}$ generation node", a "wireless point", or a "transmission/reception point (TRP)", rather than a base station, or using some other terms having a technical meaning equivalent thereto. The terminal 40 accesses the wireless or radio access network 102 and communicates with the base station 50 via a wireless channel. The terminal 40 may be referred to as a "user equipment (UE)", a "mobile station", a "subscriber station", a "remote terminal", and a "wireless terminal", or a "user device", rather than a terminal, or other terms having a technical meaning equivalent thereto.

A core network 104, which is the network that manages the entire system, controls the radio access network 102 and processes data and control signals for the terminal 40, transmitted and received via the radio access network 102. The core network 104 performs various functions including control of a user plane and a control plane, processing of mobility, management of subscriber information, charging, interworking with other types of systems (e.g., long-term evolution (LTE) system), and the like. To perform the various functions described above, the core network 104 may include a plurality of functionally separated entities having different network functions (NFs). For example, the core network 104 may include an access and mobility management function (AMF) 90, an session management function (SMF) 80, a user-plane function (UPF) 30, a policy and charging function (PCF) 85, a network repository function (NRF) 95, a unified data management (UDM) 75, a network exposure function (NEF) 65, and a unified data repository (UDR) 55. The core network 104 may interwork with an application function (AF) 70, a central network controller (CNC) 60, and a time-sensitive networking (TSN) system. The core network 104 may be referred to as a $5^{th}$ generation (5G) core (5GC), which is a core network of a 5G system.

The terminal 40 is connected to the radio access network 102 and accesses the AMF 90, which performs a mobility management function of the core network 104. The AMF 90 is a function or a device that is responsible for both access to the radio access network 102 and the mobility management of the terminal 40. The SMF 80 is an NF that manages a session. The AMF 90 is connected to the SMF 80, and the AMF 90 routes session-related messages of the terminal 40 to the SMF 80. The SMF 80 is connected to the UPF 30 to allocate a user plane resource to be provided to the terminal 40 and establishes a tunnel for transmitting data between the base station 50 and the UPF 30. The SMF 80, as a main entity managing a PDU session, may be responsible for QoS setting/update for QoS flows in the PDU session. The PCF 85 controls information associated with a policy and charging of a session used by the terminal 40. The NRF 95 stores information on NFs installed in the wireless communication operator network and performs a function of informing the stored information. The NRF 95 may be connected to all NFs. Each NF is registered with the NRF 95 when starting to run in the operator network, so as to inform the NRF 95 that the NF is running in the network. The UDM 75, as an NF that performs a role similar to a home subscriber server (HSS) of a 4G network, stores subscription information of the terminal 40 or context information used by the terminal 40 in the network.

The NEF 65 serves to connect a $3^{rd}$-party server to an NF in the 5G wireless communication system. In addition, the NEF 65 serves to provide data to the UDR 55 and to update or obtain data. The UDR 55 serves to store subscription information of the terminal 40, store policy information, store data exposed to the outside, or store information necessary for a 3-party application. Further, the UDR 55 also serves to provide stored data to other NFs.

The UDM 75, PCF 85, SMF 80, AMF 90, NRF 95, NEF 65, and UDR 55 may be connected to a service-based interface. Services or application programing interfaces (APIs) provided by NFs are used by other NFs and thus may exchange control messages with each other. The NFs define services they provide, which are defined in standard as Nudm, Npcf, Nsmf, Namf, Nnrf, Nnef, Nudr, etc. For example, when the AMF 90 delivers a session-related message to the SMF 80, a service or API called Nsmf_PDUSession_CreateSMContext may be used. The AF may be configured in various manners. Although the AF is not explicitly shown in FIG. 1A, the AF may be associated with 5GC 104. The AF may be a 3rd-party entity outside the operator network or an entity inside the operator network. For example, TSN AF may be an entity within 5GC, which is an operator network, since 5GC corresponds to an essential function for supporting TSN.

Figure 1B:
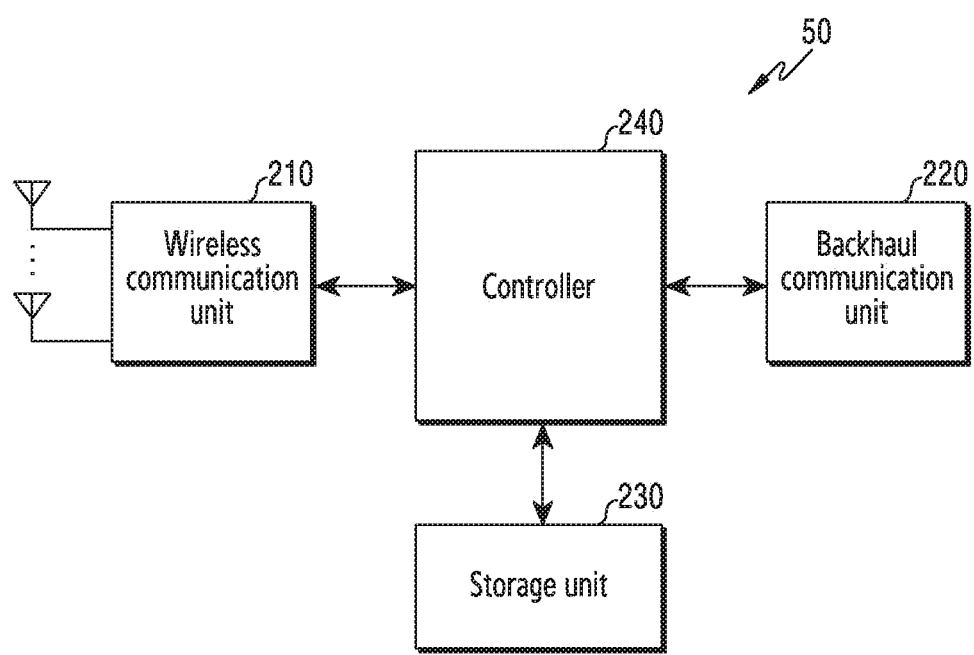
FIG. 1B illustrates a configuration of a base station in a wireless communication system according to an embodiment of the disclosure.

FIG. 1B shows a configuration of a base station in a wireless communication system according to an embodiment of the disclosure. The configuration illustrated in FIG. 1B may be understood as a configuration of the base station 50. Terms such as " . . . unit", " . . . device" used below refer to a unit for processing at least one function or operation, which may be implemented by hardware, software, or a combination of hardware and software.

Referring to FIG. 1B, the base station 50 includes a wireless communication unit 210, a backhaul communication unit 220, a storage unit 230, and a controller 240.

The wireless communication unit 210 performs functions for transmitting and receiving a signal via a wireless channel. For example, the wireless communication unit 210 performs a function of conversion between a baseband signal and a bitstream according to the physical layer standard of the system. For example, the wireless communication unit 210 generates complex symbols during data transmission by encoding and modulating a transmission bitstream. In addition, the wireless communication unit 210 restores, when receiving data, a reception bitstream through demodulation and decoding of the baseband signal.

In addition, the wireless communication unit 210 up-converts a baseband signal into an RF (radio-frequency) band signal and then transmits the signal via an antenna, and down-converts an RF-band signal received via the antenna into a baseband signal. To this end, the wireless communication unit 210 may include a transmission filter, a reception filter, an amplifier, a mixer, an oscillator, a DAC (digital-to-analog convertor), and an ADC (analog-to-digital converter). In addition, the wireless communication unit 210 may include a plurality of transmission/reception paths. Furthermore, the wireless communication unit 210 may include at least one antenna array configured by a plurality of antenna elements.

With regard to hardware, the wireless communication unit 210 may be configured by a digital unit and an analog unit, and the analog unit may be configured by a plurality of sub-units according to operating power, operating frequency, and the like. The digital unit may be implemented as at least one processor (e.g., DSP (digital signal processor)).

The wireless communication unit 210 transmits and receives a signal as described above. Accordingly, all or part of the wireless communication unit 210 may be referred to as a "transmitter", a "receiver", or a "transceiver". In addition, transmission and reception performed via a wireless channel are used in the following description as a meaning of including a process performed as described above by the wireless communication unit 210.

A backhaul communication unit 220 provides an interface for performing communication with other nodes in a network. That is, the backhaul communication unit 220 converts a bitstream transmitted from a base station to another node, for example, another access node, another base station, an upper node, a core network, or the like into a physical signal, and converts a physical signal received from another node into a bitstream.

The storage unit 230 stores data, such as a basic program, applications, and configuration information, for the operation of a base station. The storage unit 230 may configured as volatile memory, nonvolatile memory, or a combination of volatile memory and nonvolatile memory. Further, the storage unit 230 provides the stored data at the request of the controller 240.

The controller 240 controls the overall operations of a base station. For example, the controller 240 transmits and receives a signal via the wireless communication unit 210 or the backhaul communication unit 220. In addition, the controller 240 records and reads data in the storage unit 230. The controller 240 may perform the functions of a protocol stack required by a communication standard. According to another embodiment, the protocol stack may be included in the wireless communication unit 210. To this end, the controller 240 may include at least one processor. According to various embodiments, the controller 240 may control the base station to perform operations according to various embodiments described below.

Figure 1C:
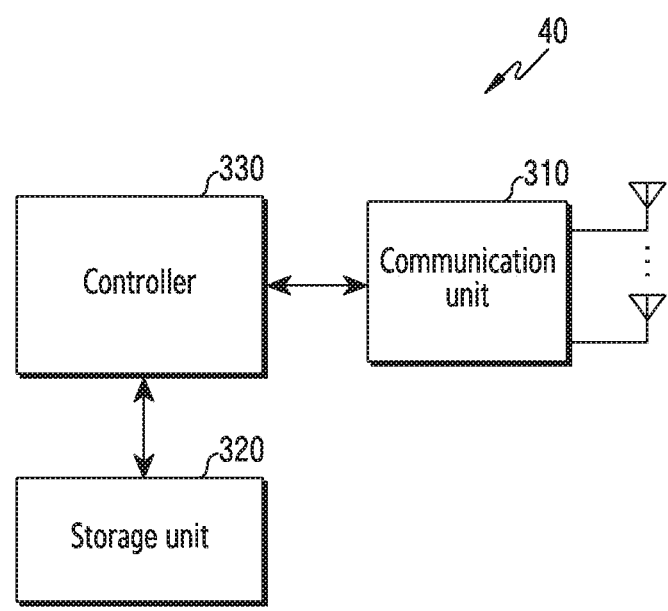
FIG. 1C illustrates a configuration of a terminal in a wireless communication system according to an embodiment of the disclosure.

FIG. 1C shows a configuration of a terminal in a wireless communication system according to an embodiment of the disclosure. The configuration illustrated in FIG. 1C may be understood as a configuration of the terminal 40. Terms such as " . . . unit", " . . . device" used below refer to a unit that processes at least one function or operation, which may be implemented by hardware, software, or a combination of hardware and software.

Referring to FIG. 1C, the terminal 40 includes a communication unit 310, a storage unit 320, and a controller 330.

The communication unit 310 performs functions for transmitting and receiving a signal via a wireless channel. For example, the communication unit 310 performs a function of conversion between a baseband signal and a bitstream according to the physical-layer standard of a system. For example, the communication unit 310 generates complex symbols during data transmission by encoding and modulating a transmission bitstream. In addition, the communication unit 310 restores, when receiving data, a reception bitstream through demodulation and decoding of the baseband signal. In addition, the communication unit 310 up-converts a baseband signal into an RF-band signal and then transmits the signal via an antenna, and down-converts an RF-band signal received via the antenna into a baseband signal. For example, the communication unit 310 may include a transmission filter, a reception filter, an amplifier, a mixer, an oscillator, a DAC, and an ADC.

In addition, the communication unit 310 may include a plurality of transmission/reception paths. Furthermore, the communication unit 310 may include at least one antenna array configured as a plurality of antenna elements. With regard to hardware, the communication unit 310 may be configured as a digital circuit and an analog circuit (e.g. RFIC (radio frequency integrated circuit)). In this regard, the digital circuit and the analog circuit may be implemented as a single package. In addition, the communication unit 310 may include a plurality of RF chains. Furthermore, the communication unit 310 may perform beamforming.

The communication unit 310 transmits and receives a signal as described above. Accordingly, all or part of the communication unit 310 may be referred to as a "transmitter", a "receiver", or a "transceiver". In addition, transmission and reception performed via a wireless channel are used in the following description as a meaning of including a process performed as described above by the communication unit 310.

The storage unit 320 stores data, such as a basic program, applications, and configuration information, for the operation of a terminal. The storage unit 320 may be configured as volatile memory, nonvolatile memory, or a combination of volatile memory and nonvolatile memory. Further, the storage unit 320 provides the stored data at the request of the controller 330.

The controller 330 controls the overall operations of a terminal. For example, the controller 330 transmits and receives a signal via the communication unit 310. In addition, the controller 330 records and reads data in the storage unit 320. In addition, the controller 330 may perform the functions of a protocol stack required by a communication standard. To this end, the controller 330 may include at least one processor or microprocessor or may be a part of the processor. Further, a part of the communication unit 310 and the controller 330 may be referred to as a CP (communication processor). According to various embodiments, the controller 330 may control the terminal to perform operations according to various embodiments described below.

Figure 1D:
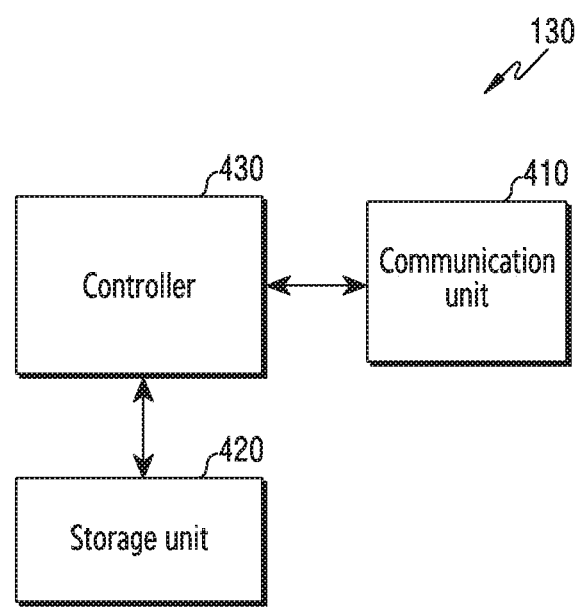
FIG. 1D illustrates a configuration of a core network entity in a wireless communication system according to an embodiment of the disclosure.

FIG. 1D shows a configuration of a core network object in a wireless communication system according to an embodiment of the disclosure. The configuration shown in FIG. 1D may be understood as a configuration of a device having at least one function among the AMF 90, SMF 80, UPF 30, PCF 85, NRF 95, UDM 75, AF 70, NEF 65, and UDR 55 of FIGS. 1A to 1D. Terms such as " . . . unit", " . . . device" used below refer to a unit that processes at least one function or operation, which may be implemented by hardware or software, or a combination of hardware and software.

Referring to FIG. 1D, the core network object 130 includes a communication unit 410, a storage unit 420, and a controller 430.

The communication unit 410 provides an interface for performing communication with other devices in a network. That is, the communication unit 410 converts a bitstream transmitted from the core network object to another device into a physical signal, and converts a physical signal received from another device into a bitstream. That is, the communication unit 410 may transmit and receive signals. Accordingly, the communication unit 410 may be referred to as a modem, a transmitter, a receiver, or a transceiver. At this time, the communication unit 410 allows the core network object to communicate with other devices or systems via a backhaul connection (e.g., wired backhaul or wireless backhaul) or via a network.

The storage unit 420 stores data, such as a basic program, applications, and configuration information, for the operation of the core network object. The storage unit 420 may be configured as volatile memory, nonvolatile memory, or a combination of volatile memory and nonvolatile memory. Further, the storage unit 420 provides the stored data at the request of the controller 430.

The controller 430 controls the overall operations of the core network object. For example, the controller 430 transmits and receives a signal via the communication unit 410. In addition, the controller 430 records and reads data in the storage unit 420. To this end, the controller 430 may include at least one processor. According to various embodiments, the controller 430 may control the core network object to perform operations according to various embodiments described below.

According to an embodiment, a method performed by a network entity of a core network in a wireless communication system, the method comprises obtaining a burst arrival time associated with a $5^{th}$ generation (5G) clock; and transmitting time-sensitive communication assistant information (TSCAI) including information on the burst arrival time to a node of an access network. The burst arrival time associated with the 5G clock is mapped from a TSN clock to the 5G clock, based on an offset between $5^{th}$ generation system (5GS) time and a time-sensitive networking (TSN) time.

In some embodiments, the method further comprises receiving information on the offset from a user-plane function (UPF).

In some embodiments, if a change to the offset from a previous offset between a TSN time and a 5GS time is greater than a threshold value, the information is transmitted from the UPF to the network entity.

In some embodiments, the TSCAI is transmitted based on a protocol data unit (PDU) session modification procedure.

In some embodiments, the burst arrival time is determined based on a core network (CN) packet delay budget (PDB) if the burst arrival time is associated with a downlink, and the burst arrival time is determined based on a UE residence time if the burst arrival time is associated with an uplink.

In some embodiments, the method further comprises receiving information from an application function (AF); and determining the TSCAI, based on the received information.

In some embodiments, the network entity is a session management function (SMF), and a mapping of the burst arrival time associated with the 5G clock is performed by an application function (AF).

According to an embodiment, a method performed by a base station in a wireless communication system, the method comprises receiving time-sensitive communication assistant information (TSCAI) including information on a burst arrival time associated with a $5^{th}$ generation (5G) clock from a network entity of a core network. Information on the burst arrival time is determined based on an offset between a $5^{th}$ generation system (5GS) time and a time-sensitive networking (TSN) time.

According to an embodiment, a method performed by a user-plane function (UPF) in a wireless communication system, the method comprises transmitting information on an offset between a $5^{th}$ generation system (5GS) time and a time-sensitive networking (TSN) time to a network entity of a core network.

In some embodiments, the transmitting of the information on the offset comprises determining whether a change to the offset from a previous offset between a TSN time and a 5GS time is greater than a threshold value; and transmitting information on the offset to the network entity based on the change being greater than the threshold value.

According to an embodiment, a method performed by an application function (AF) in a wireless communication system, the method comprises transmitting information to a network entity of a core network. The information is used for determination of time-sensitive communication assistant information (TSCAI). The TSCAI includes information on a burst arrival time associated with a $5^{th}$ generation (5G) clock.

In some embodiments, the method further comprises mapping a burst arrival time from a TSN clock to a 5G clock, based on an offset between a $5^{th}$ generation system (5GS) time and a time-sensitive networking (TSN) time; and obtaining a burst arrival time associated with the 5G clock, based on the mapping.

According to an embodiment, an apparatus of a network entity of a core network in a wireless communication system, the apparatus comprises at least one transceiver; and at least one processor coupled to the at least one transceiver. The at least one processor is configured to: obtain a burst arrival time associated with a $5^{th}$ generation (5G) clock; and control the at least one transceiver to transmit time-sensitive communication assistant information (TSCAI) including information on the burst arrival time to a node of an access network. The burst arrival time associated with the 5G clock is mapped to the 5G clock from a time-sensitive networking (TSN) clock, based on an offset between a $5^{th}$ generation system (5GS) time and a TSN time.

In some embodiments, the at least one processor is further configured to control the at least one transceiver to receive information on the offset from a user-plane function (UPF).

In some embodiments, if a change to the offset from a previous offset between a TSN time and a 5GS time is greater than a threshold value, the information is transmitted from the UPF to the network entity.

In some embodiments, the TSCAI is transmitted based on a protocol data unit (PDU) session modification procedure.

In some embodiments, the burst arrival time is determined based on a core network (CN) packet delay budget (PDB) if the burst arrival time is associated with a downlink, and the burst arrival time is determined based on a UE residence time if the burst arrival time is associated with an uplink.

In some embodiments, the at least one processor is configured to: control the at least one transceiver to receive information from an application function (AF); and determine the TSCAI, based on the received information.

In some embodiments, the network entity is a session management function (SMF), and a mapping of the burst arrival time associated with the 5G clock is performed by an application function (AF).

According to an embodiment, an apparatus operated by a base station in a wireless communication system, the apparatus comprises at least one transceiver; and at least one processor coupled to the at least one transceiver. The at least one processor is configured to: control the at least one transceiver to receive time-sensitive communication assistant information (TSCAI) including information on a burst arrival time associated with a $5^{th}$ generation (5G) clock from a network entity of a core network. Information on the burst arrival time is determined based on an offset between a $5^{th}$ generation system (5GS) time and a time-sensitive networking (TSN) time.

According to an embodiment, an apparatus operated by a user-plane function (UPF) in a wireless communication system, the apparatus comprises at least one transceiver; and at least one processor coupled to the at least one transceiver. The at least one processor is configured to control the at least one transceiver to transmit information on an offset between a $5^{th}$ generation system (5GS) time and a time-sensitive networking (TSN) time to a network entity of a core network.

In some embodiments, in order to transmit the information on the offset, the at least one processor is configured to: determine whether a change to the offset from a previous offset between a TSN time and a 5GS time is greater than a threshold value, and control the at least one transceiver to transmit information on the offset to the network entity if the change is greater than the threshold value.

According to an embodiment, an apparatus operated by an application function (AF) in a wireless communication system, the apparatus comprises at least one transceiver; and at least one processor coupled to the at least one transceiver. The at least one processor is configured to control the at least one transceiver to transmit information to a network entity of a core network. The information is used for determination of time-sensitive communication assistant information (TSCAI). The TSCAI includes information on a burst arrival time associated with a $5^{th}$ generation (5G) clock.

In some embodiments, the processor is further configured to: map a burst arrival time from a TSN clock to a 5G clock, based on an offset between a $5^{th}$ generation system (5GS) time and a time-sensitive networking (TSN) time; and obtain a burst arrival time associated with the 5G clock, based on the mapping.

According to an embodiment, a method for obtaining clock synchronization information in a base station configured to operate based on a reference clock of a wireless communication system, the method comprises: obtaining a burst arrival time of time-sensitive communication assistance information (TSCAI) based on a time-sensitive networking (TSN) clock; obtaining offset information indicating a difference between the TSN clock and a reference clock of the wireless communication system; and adjusting a burst arrival time, based on an offset to obtain an adjusted burst arrival time based on the reference clock of the wireless communication system. In some embodiments, the operation "adjustment" from a previous one to a current one comprises an mapping from the previous one to the current one.

In some embodiments, the obtaining of the offset information comprises: obtaining the offset information using a radio resource control (RRC) message coming from a terminal; or obtaining the offset information using an N2 request message coming from an access and mobility management function (AMF).

In some embodiments, the obtaining of the offset information indicating a difference between the TSN clock and the reference clock of the wireless communication system, comprises: obtaining offset difference information indicating a difference between a previous offset and a current offset. The obtaining of the adjusted burst arrival time comprises: adjusting again the adjusted burst arrival time, based on the offset difference information to obtain an adjusted burst arrival time based on the reference clock of the wireless communication system.

According to an embodiment, a method for obtaining clock synchronization information in a base station configured to operate based on a reference clock of a wireless communication system in the wireless communication system, the method comprises: obtaining an adjusted burst arrival time obtained by adjusting a burst arrival time of time-sensitive communication assistance information (TSCAI) based on a time-sensitive networking (TSN) clock, based on a reference clock of the wireless communication system.

In some embodiments, the obtaining of the adjusted burst arrival time comprises a previously adjusted burst arrival time and a newly calculated and adjusted burst arrival time, which are received from an external device.

In some embodiments, the obtaining of the adjusted burst arrival time comprises: obtaining the adjusted burst arrival time using a radio resource control (RRC) message coming from a terminal; or obtaining the adjusted burst arrival time using an N2 request message coming from an access and mobility management function (AMF).

In some embodiments, the obtaining of the adjusted burst arrival time comprises: obtaining a previously adjusted burst arrival time and offset difference information indicating a difference between a previous offset and a current offset; and obtaining the adjusted burst arrival time, based on the offset difference information and the previously adjusted burst arrival time.

In some embodiments, the adjusted burst arrival time is calculated by a terminal, a session management function (SMF), a policy and charging function (PCF), or an application function (AF).

In some embodiments, a base station allocates resources to perform transmission of the adjusted burst arrival time for a pre-configured time period.

In some embodiments, the reference clock comprises a 5G clock.

In some embodiments, time expressed by the 5G clock includes 5GS reference time.

Figure 2A:
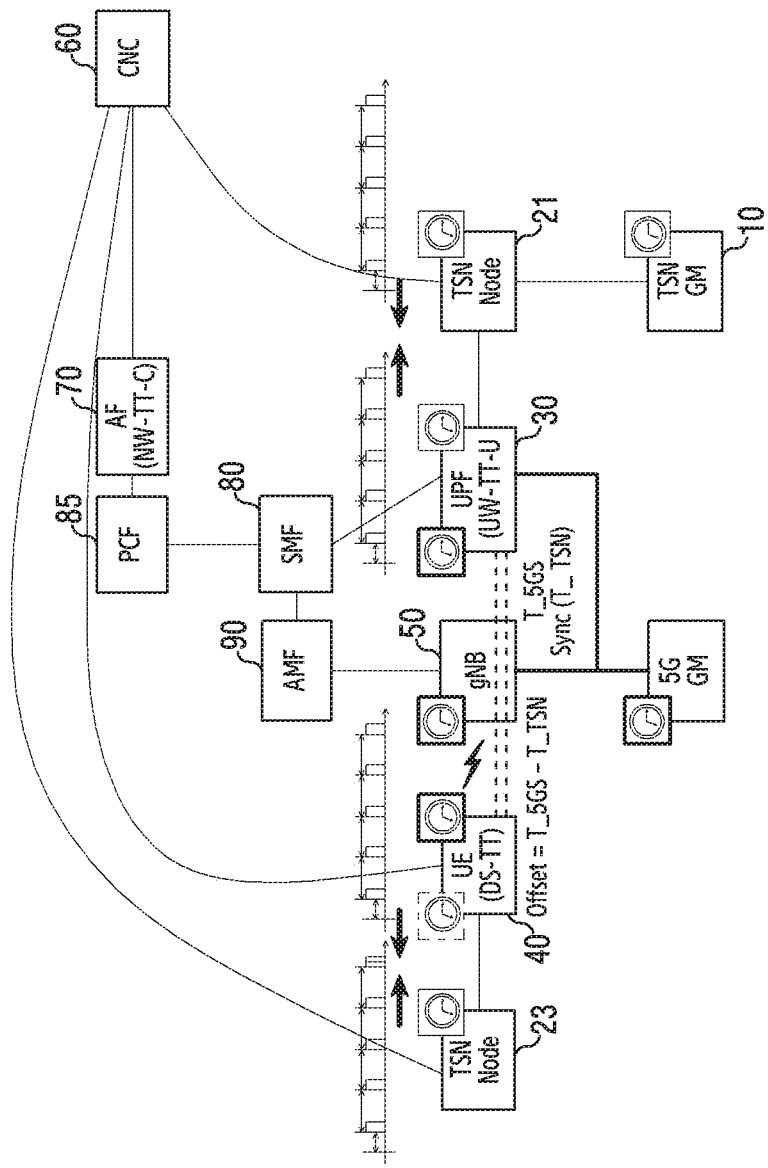
FIG. 2A illustrates clock synchronization of a wireless network that does not support time-sensitive networking (TSN) of a wired network referred to for explanation of the disclosure, and a problem with a time-sensitive communication assistance information (TSCAI) reference clock, which is to be solved by the disclosure according to an embodiment of the disclosure.

FIG. 2A illustrates clock synchronization of a wireless network that does not support TSN (time-sensitive networking) of a wired network, which is referred for explanation of the disclosure, and problem with a TSCAI reference clock, which is to be solved by the disclosure according to an embodiment of the disclosure.

Figure 2B:
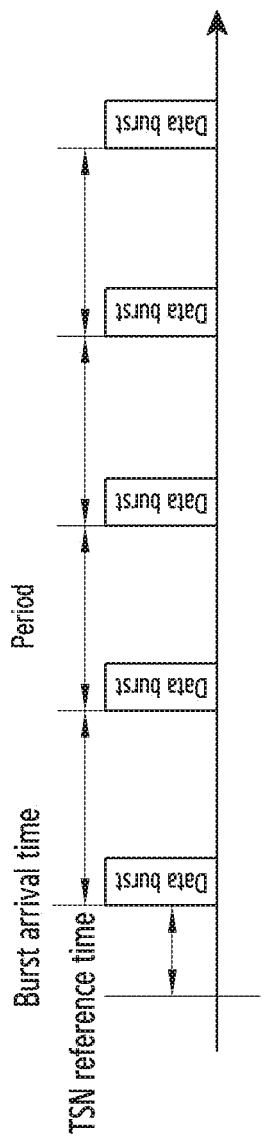
FIG. 2B illustrates an example of time-sensitive communication (TSC) traffic pattern information (time-sensitive communication assistance information (TSCAI)) delivered between TSN support nodes according to an embodiment of the disclosure.

FIG. 2B illustrates an example of time-sensitive communication assistance information (TSCAI) delivered between TSN support nodes according to an embodiment of the disclosure.

Referring to FIG. 2A, in order to support TSN in a wired network, TSN nodes 21 and 23 support a protocol that delivers a clock of TSN GM (Grand Master) 10 via an Ethernet frame. In order to extend this to a wireless network, a UPF (user-plane function) 30, which is a gateway, and a UE (user equipment) 40, which is a terminal, have a TSN translator function so as to support the above-mentioned protocol. A method for supporting the transmission of TSN clock even between the UPF 30 and the UE 40 has been proposed. In this method, the terminal (UE) 40, the base station (gNB) 50, and the gateway (UPF) 30 in a 5G system are synchronized using a 5G system clock, and the UPF 30 and the UE 40 deliver the value of a TSN clock to a 5GS clock through time-stamping using this synchronization. That is, in the case in which this method is used, the UPF 30 and the UE 40 are both aware of the TSN clock and the 5GS clock at the same time, but the base station is only aware of the 5GS clock.

Meanwhile, in order to effectively deliver TSC traffic between TSN support nodes, the TSN nodes 21 and 23 deliver traffic pattern information to a CNC (central network controller) 60, and the CNC 60 shares traffic pattern information with other TSN nodes 21 and 23, thereby assisting the scheduling of all nodes. The 5G system is regarded as one TSN node, and receives a traffic pattern, which comes from an external TSN node to the 5G system via the UE 40 and the UPF 30, from the CNC 60 via the AF 70. Similarly, with respect to the traffic coming into the 5G system, a pattern of traffic going out to the external TSN node via the UE 40 and the UPF 30 is shared to the CNC 60 via the AF 70. When the TSCAI (TSC assistance information), which is traffic characteristics information including period, a burst size, and a burst arrival time, as shown in FIG. 2B, is delivered to the gNB 50, the gNB 50 may reflect the information to use the same for scheduling, and thus may efficiently utilize resources. For example, the gNB 50 allocates resources a burst size to perform transmission at a burst arrival time for each pre-configured time period. In fact, since information coming from the CNC 60 is a pattern of traffic arriving at the UPF 30 in the case of a downlink (DL), the maximum UPF residence time and CN PDB (packet delay budget) need to be corrected in order to change with reference to an input terminal of the gNB 50. Similarly, since information coming from the CNC 60 is a pattern of traffic arriving at the UE 40 in the case of uplink (UL), the UE residence time needs to be corrected in order to change with reference to the input end of the gNB 50. The TSN reference time refers to the time used as a reference for expressing a time on a TSN clock. As an example, the TSN reference time may include a time epoch associated with TSN.

In the case of utilizing a clock synchronization method using the wireless communication network proposed above, the gateway (UPF) 30 and the terminal (UE) 40 of the wireless communication network are aware of the clock (TSC clock) of the wired network while the base station (gNB) 50 is not. Therefore, the base station (gNB) 50 may not be aware of the exact reference clock of TSCAI. In particular, since a burst arrival time is indicated based on the TSN clock, the gNB 50, which is aware only of the 5GS clock, may not utilize the information.

Figure 3A:
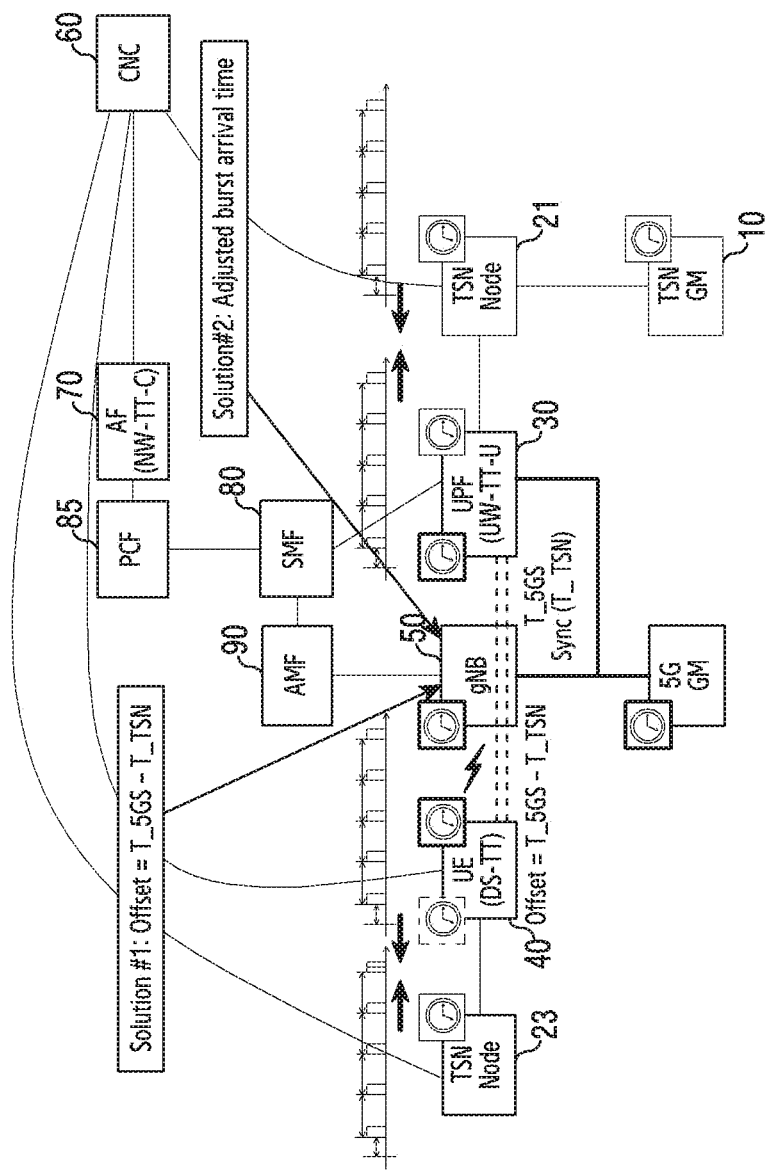
FIG. 3A explains information that needs to be additionally delivered to a gNB in order to solve the problem raised in FIG. 2A according to an embodiment of the disclosure.

FIG. 3A describes information that needs to be additionally delivered to the gNB 50 in order to solve the problem raised in FIG. 2A according to an embodiment of the disclosure.

Figure 3B:
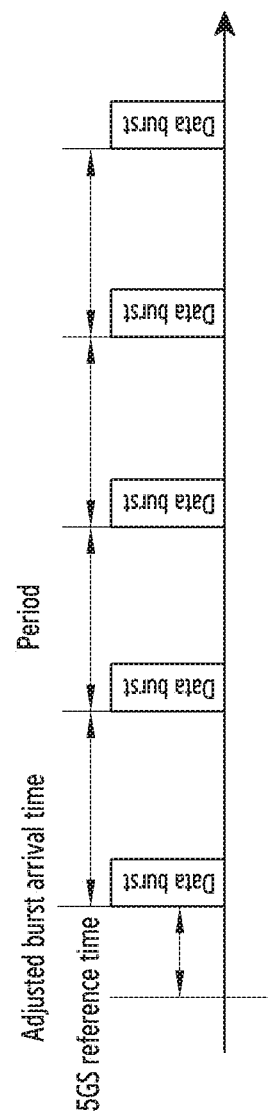
FIG. 3B illustrates an example of a burst arrival time adjusted based on TSCAI according to an embodiment of the disclosure.

FIG. 3B illustrates an example of a burst arrival time, adjusted based on TSCAI. A 5GS reference time refers to the time used as a reference for expressing the time of a 5G clock. As an example, the 5GS reference time may include a time epoch, associated with 5GS according to an embodiment of the disclosure.

In a first solution, the problem may be solved by delivering an offset, which is the difference between the 5GS clock and the TSN clock, to the gNB 50. In one embodiment, the UPF 30 or UE 40 calculates an offset=T_5GS−T_TSN (the difference between the 5GS clock and the TSN clock) and delivers the calculated offset to the gNB 50, and the gNB 50 converts a burst arrival time based on the TSN clock into a time based on the 5GS clock (mapping), so that the converted time can be used for scheduling.

In a second solution, the problem may be solved by delivering a burst arrival time converted based on a 5GS clock, to the gNB 50. The problem may be solved by converting a burst arrival time based on the TSN clock into a time based on the 5GS clock at any node in an information transfer process to the UE 40, the UPF 30, or the gNB 50. The gNB 50 may also convert a burst arrival time based the TSN clock into a time based on the 5GS clock (mapping). In this case, the difference between the first solution and the second solution lies in the entity that manages the burst arrival time based on the TSN clock of the corresponding domain. The gNB 50 manages a list of burst arrival times for each TSN domain in the first solution, and another network function other than the gNB 50 manages the list in the second solution. A TSN domain, which refers to nodes using an identical TSN GM as a reference, may have a plurality of TSN domains existing in a wired network. The current standard of wired network supports up to 256, and the current 5GS standard supports up to 32 at the same time.

Figure 4A:
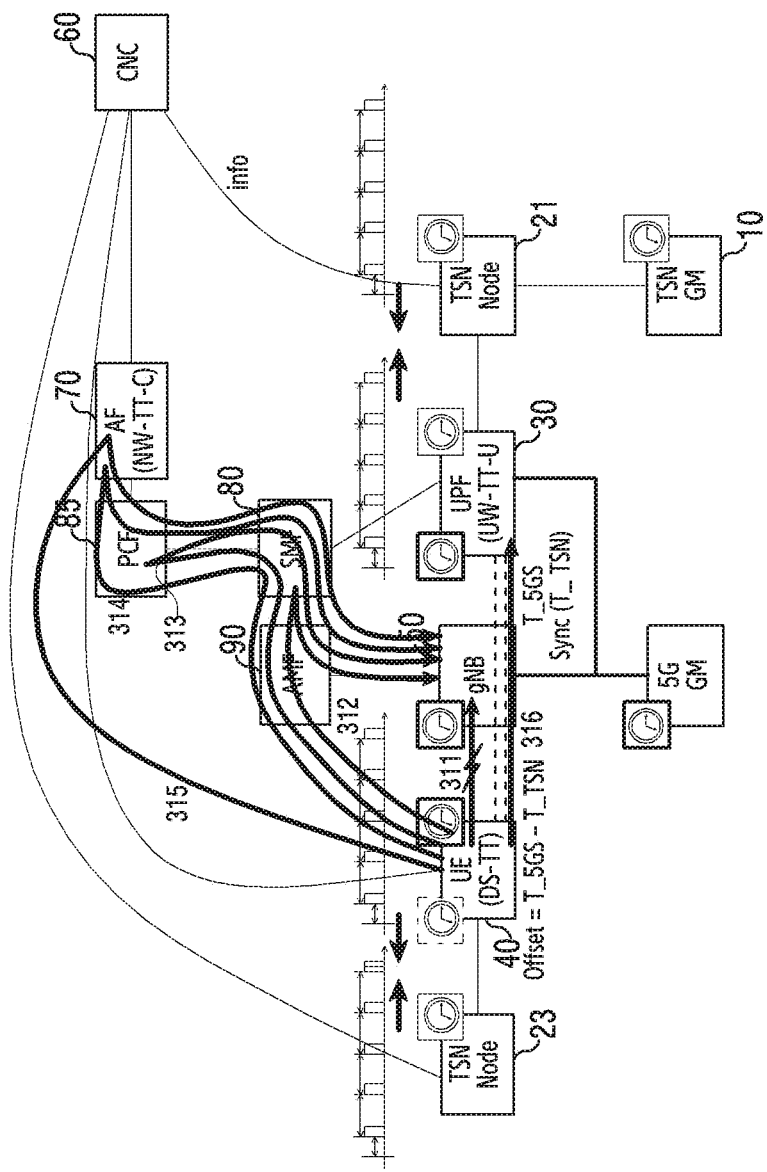
FIG. 4A illustrates an embodiment of the flow of information delivered in order to solve a problem with a TSCAI reference clock using a wireless communication network according to an embodiment of the disclosure.
Figure 4B:
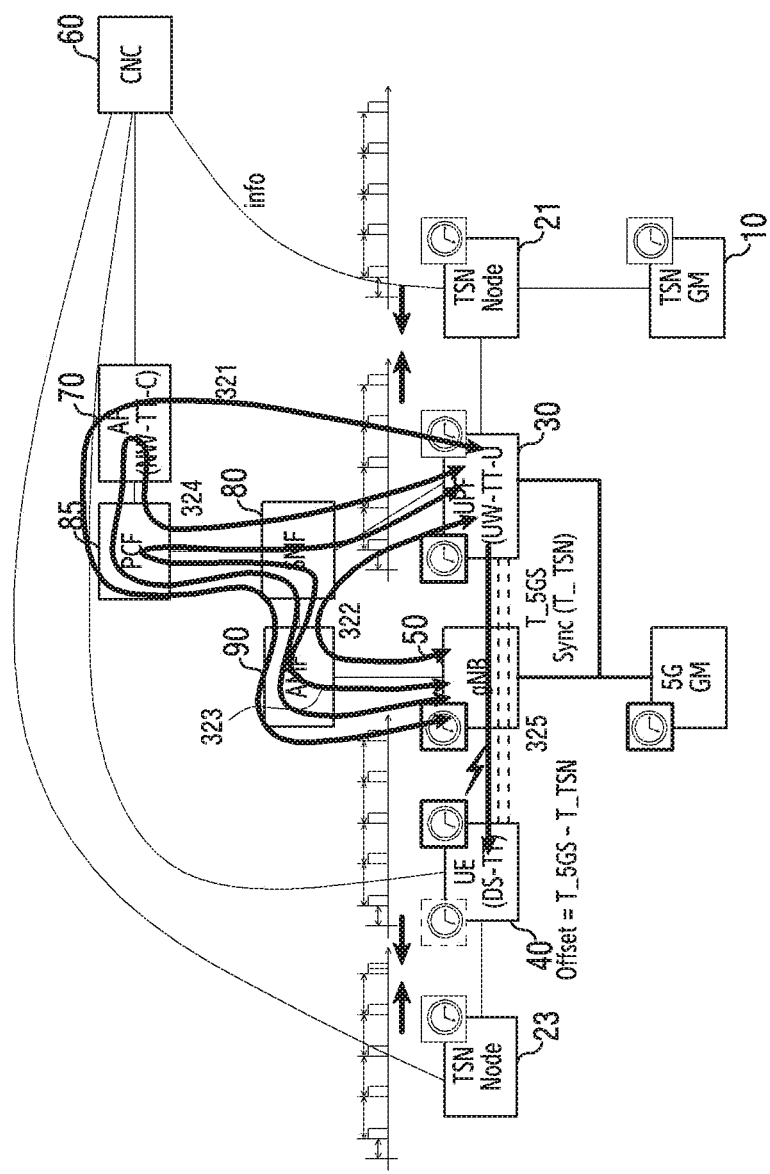
FIG. 4B illustrates an embodiment of the flow of information delivered in order to solve a problem with a TSCAI reference clock using a wireless communication network according to an embodiment of the disclosure.

FIG. 4A illustrates an embodiment of the flow of information delivered in order to solve a problem with a TSCAI reference clock using a wireless communication network according to an embodiment of the disclosure, and FIG. 4B illustrates an embodiment of the flow of information delivered in order to solve a problem with a TSCAI reference clock using a wireless communication network according to an embodiment of the disclosure. A method for delivering an offset or a burst arrival time converted based on the 5GS clock to the gNB 50 includes a method in which the UE 40 starts information flow, and a method in which the UPF 30 starts information flow.

Referring to FIG. 4A, the UE 40 may start an information flow in the following cases.

1.1 With respect to the gNB 50 via a RRC (a newly defined RRC (radio resource control))(operation 311): the UE 40 or gNB 50 may change from a burst arrival time based on the TSN clock to a time based on the 5 GS clock.

1.2 With respect to the SMF 80 via an NAS (PDU (protocol data unit) session modification)(operation 312): the UE 40, SMF 80, or gNB 50 may change from a burst arrival time based on the TSN clock to a time based on the 5GS clock.

1.3 With respect to the SMF 80 via an NAS (PDU session modification)-(notification)-PCF 85 path (operation 313): the UE 40, PCF 85, SMF 80, or gNB 50 may change from a burst arrival time based on the TSN clock to a time based on the 5GS clock.

1.4 With respect to the SMF 80 via an NAS (PDU session modification)-(notification)-PCF 85-(notification)-AF 70 path (operation 314): the UE 40, AF 70, PCF 85, SMF 80, or gNB 50 may change from a burst arrival time based on the TSN clock to a time based on the 5GS clock.

1.5 With respect to the AF 70 via a non-3GPP method (operation 315): the UE 40, AF 70, PCF 85, SMF 80, or gNB 50 may change from a burst arrival time based on the TSN clock to a time based on the 5GS clock.

1.6 With respect to the UPF 30 via piggyback of a synchronization procedure or a new interface (operation 316): adjustment for changing a burst arrival time based on the TSN clock to a time based on the 5GS clock according to a follow-up flow after the UPF 30 may be performed in various NFs (network functions).

Referring to FIG. 4B, the UPF 30 may start an information flow in the following cases.

2.1 To the AF 70 via a non-3GPP method including an AF 70-UPF 30 combination (operation 321): adjustment for changing a burst arrival time based on the TSN clock to a time based on the 5GS clock may be performed by the AF 70, PCF 85, SMF 80, or gNB 50.

2.2 To the SMF 80 via an N4 interface (N4 report/notification) (operation 322): adjustment for changing a burst arrival time based on the TSN clock to a time based on the 5GS clock may be performed by the SMF 80 or gNB 50.

2.3 To the PCF 85 via a UPF 30-N4-SMF 80-(notification)-PCF 85 (operation 323): adjustment for changing a burst arrival time based on the TSN clock to a time based on the 5GS clock may be performed by the PCF 85, SMF 80, or gNB 50.

2.4 To the AF 70 via a UPF 30-(N4)-SMF 80-(notification)-PCF 85-(notification)-AF 70 path (operation 324): adjustment for changing a burst arrival time based on the TSN clock to a time based on the 5GS clock may be performed by the AF 70, PCF 85, SMF 80, or gNB 50.

2.5 To the UE 40 via piggyback of a synchronization procedure or a new interface: adjustment for changing a burst arrival time based on the TSN clock to a time based on the 5GS clock according to a follow-up flow from the UE 40 may be performed by various NFs.

Table 1 shows the corresponding embodiments reflecting synthetic review in terms of information to be additionally delivered in a wireless network, the flow of information delivery, and adjustment of TSCAI in order to solve the problem with a TSCAI reference clock utilizing a wireless communication network. Table 1 collectively shows the contents described above with reference to FIGS. 2A and 2B and FIGS. 3A and 3B and includes drawing numbers of the corresponding embodiments.

TABLE 1

|  | | Adjustment options (related drawing number) | |
| --- | --- | --- | --- |
|  | Flow options | Solution #1. Receiving offset by gNB | Solution #2. Receiving burst arrival times based on 5GS clock by gNB |
| common | Initial flow adjusted by AF | gNB (FIG. 5) | AF (FIG. 19) |
|  | Initial flow adjusted by PCF | gNB (FIG. 6) | PCF (FIG. 20) |
|  | Initial flow adjusted by SMF | gNB (FIG. 7) | SMF (FIG. 21) |

TABLE 1-continued

| | Flow options | Adjustment options (related drawing number) | |
|---|---|---|---|
| | | Solution #1. Receiving offset by gNB | Solution #2. Receiving burst arrival times based on 5GS clock by gNB |
| 1. Transmission of information by UE | 1.1 UE -> gNB | gNB (FIG. 8) | UE, gNB (FIGS. 22 and 23) |
| | 1.2 UE -> SMF | gNB (FIG. 9) | UE, SMF, gNB (FIGS. 24, 25, and 26) |
| | 1.3 UE -> SMF -> PCF | gNB (FIG. 10) | UE, PCF, SMF, gNB (FIGS. 27, 28, 29, and 30) |
| | 1.4 UE -> SMF -> PCF -> AF | gNB (FIG. 11) | UE, AF, PCF, SMF, gNB (FIGS. 31, 32, 33, 34, and 35) |
| | 1.5 UE -> AF | gNB (FIG. 12) | UE, AF, PCF, SMF, gNB (FIGS. 36, 37, 38, 39, and 40) |
| | 1.6 UE -> UPF | gNB (FIG. 13) | UPF~(FIG. 41) |
| 2. Transmission of information by UPF | 2.1 UPF -> AF | gNB (FIG. 14) | AF, PCF, SMF, gNB (FIGS. 42, 43, 44, and 45) |
| | 2.2 UPF -> SMF | gNB (FIG. 15) | SMF, gNB (FIGS. 46 and 47) |
| | 2.3 UPF -> SMF -> PCF | gNB (FIG. 16) | PCF, SMF, gNB (FIGS. 48, 49, and 50) |
| | 2.4 UPF -> SMF -> PCF -> AF | gNB (FIG. 17) | AF, PCF, SMF, gNB (FIGS. 51, 52, 53, and 54) |
| | 2.5 UPF -> UE | gNB (FIG. 18) | UE~(FIG. 55) |

Hereinafter, embodiments of each entity performing operations and each flow of information for application of an offset for delivering an offset or adjusting a time will be described with reference to FIGS. 5 to 55. Meanwhile, the signaling shown in FIGS. 5 to 55 is only examples for embodiments, and signaling (e.g., notification, request, and response) between specific entities is not to be interpreted as limiting the embodiments described in connection with the corresponding drawings.

Hereinafter, the offset between the 5GS clock and the TSN clock mentioned in the disclosure may include at least one of a time offset, which is a time difference, or a frequency offset, which is a speed difference. The time offset may be determined based on a time of a 5GS clock (e.g., 5GS_time)/a time of TSN clock (e.g., TSN_time). For example, the time offset may be determined based on the difference between a time of a TSN clock and a time of a 5GS clock. According to one embodiment, a UPF (NW-TT) may calculate and update a time offset value. The UPF may update a core network entity (e.g., SMF and AF) on the time offset. The time offset may be used to convert a burst arrival time based on the TSN clock into a time based on the 5GS clock (mapping). A network entity (e.g., SMF, AF, PCF, and AMF) associated with the core network (5GC) may map a burst arrival time based on the TSN clock to a time based on the 5GS clock, based on a time offset. The base station (e.g., gNB) may obtain a burst arrival time associated with the 5GS clock via TSCAI.

The frequency offset may be determined based on the frequency of the 5GS clock (e.g., frequency_5GS)/a frequency of TSN clock (e.g., frequency_TSN). For example, the frequency offset may be determined based on the ratio of the frequency of the TSN clock to the frequency of the 5GS clock. According to one embodiment, the UPF (NW-TT) may calculate and update a frequency offset value. The UPF may update a core network entity (e.g., SMF and AF) on the frequency offset. The frequency offset may be used to map period based on the TSN clock to the period based on the 5GS clock. A network entity (e.g., SMF, AF, PCF, and AMF) associated with a core network (5GC) may map a period based on the TSN clock to period based on the 5GS clock, based on a frequency offset. The base station (e.g., gNB) may obtain a period associated with the 5GS clock via TSCAI. The operations and related descriptions of each entity with respect to the time offset may be modified and applied in a manner the same as or similar to that applied for the frequency offset.

Figure 5:
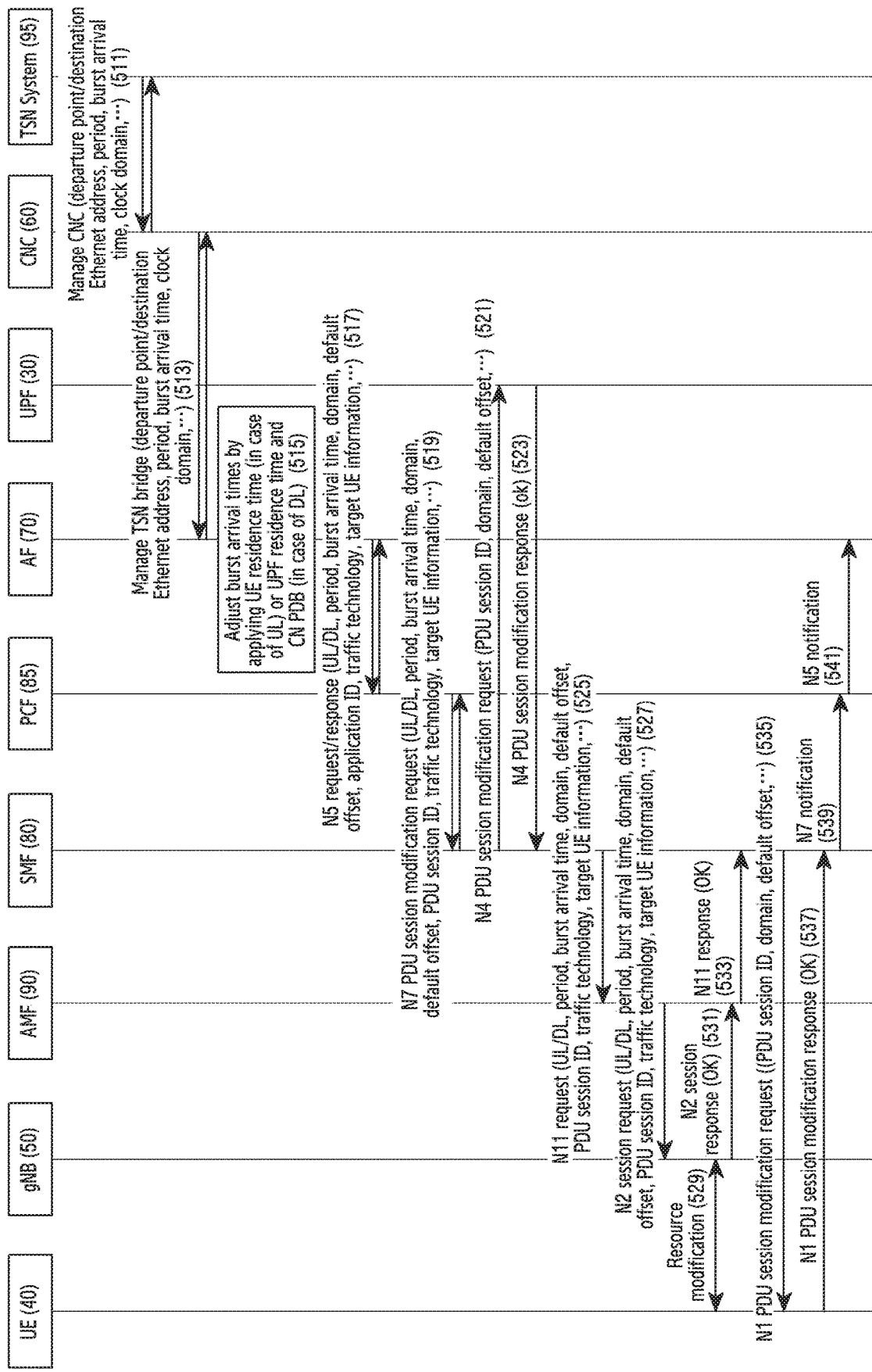
FIG. 5 is a signal flow diagram showing an initial flow in a method a gNB uses an offset and illustrates adjustment performed by AF according to an embodiment of the disclosure.
Figure 6:
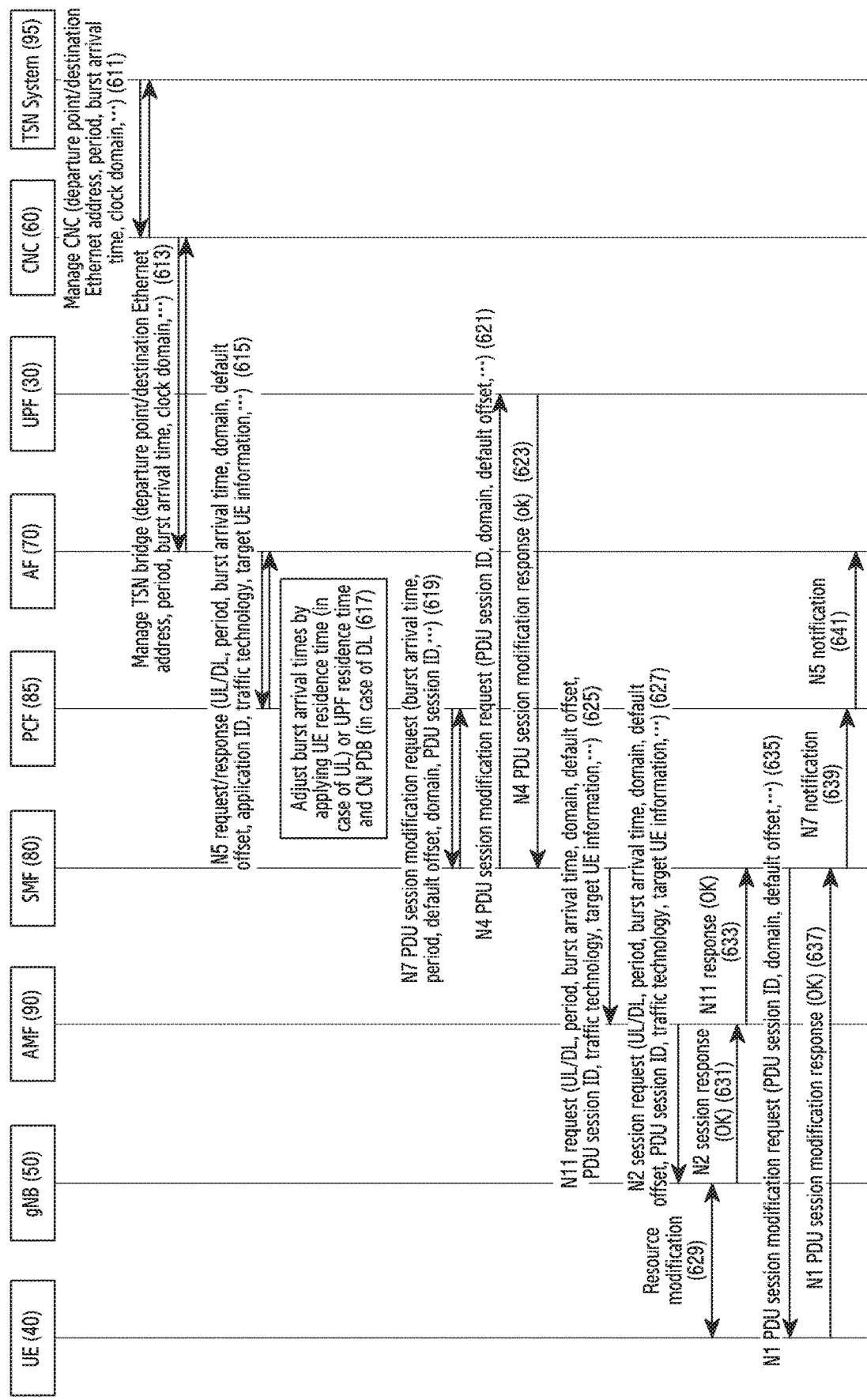
FIG. 6 is a signal flow diagram showing an initial flow in a method a gNB uses an offset and illustrates adjustment performed by policy and charging function (PCF) according to an embodiment of the disclosure.
Figure 7:
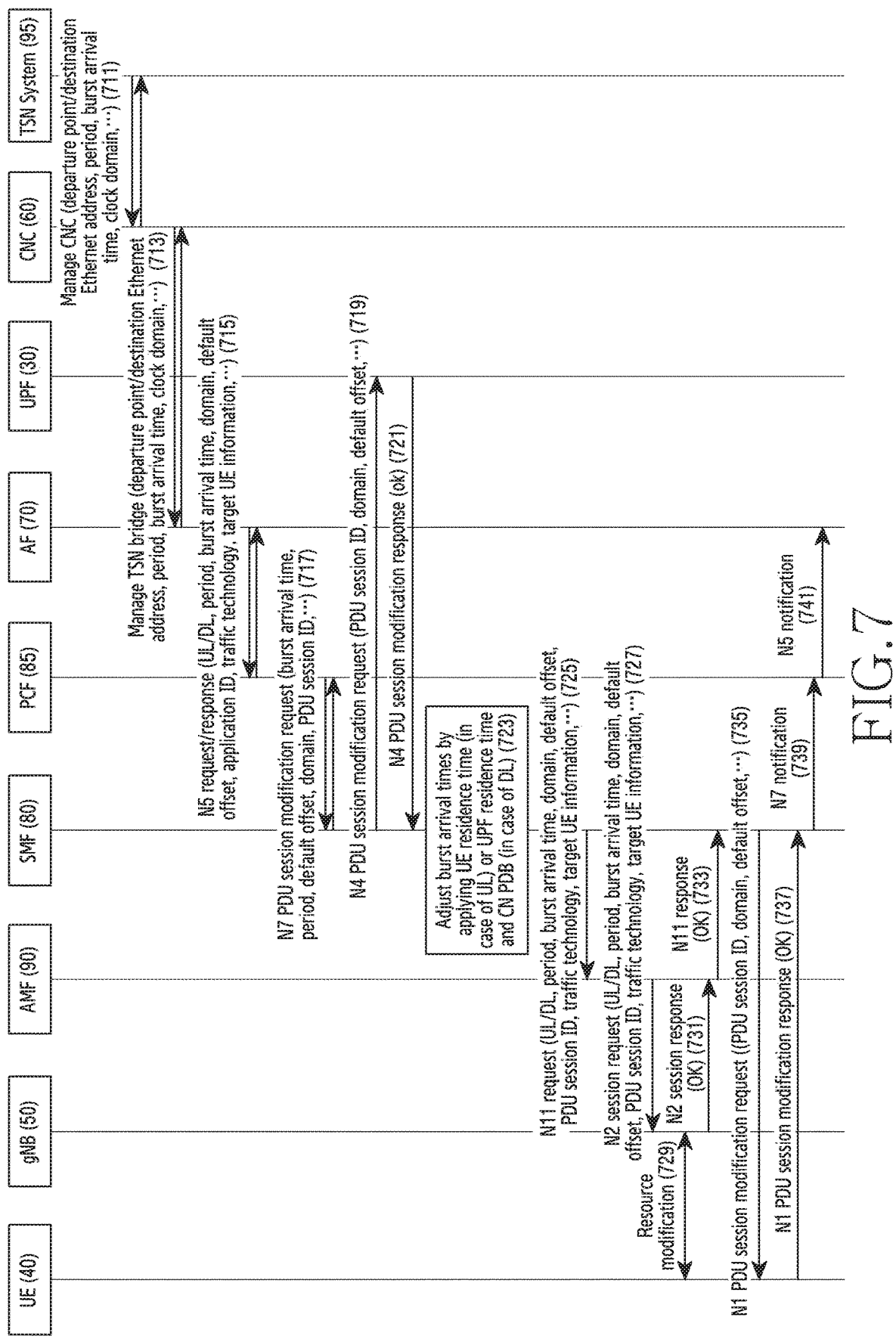
FIG. 7 is a signal flow diagram showing an initial flow in a method the a gNB 50 uses an offset and illustrates adjustment performed by session management function (SMF) according to an embodiment of the disclosure.

FIG. 5 is a signal flow diagram showing an initial flow in a method the gNB 50 uses an offset and illustrates adjustment performed by the AF 70 according to an embodiment of the disclosure, FIG. 6 is a signal flow diagram showing an initial flow in a method the gNB 50 uses an offset and illustrates adjustment performed by the PCF 85 according to an embodiment of the disclosure, and FIG. 7 is a signal flow diagram showing an initial flow in a method in which the gNB 50 uses an offset and illustrates adjustment performed by the SMF 80 according to an embodiment of the disclosure. The signaling illustrated in FIGS. 5, 6, and 7, which corresponds to an initial flow in a method in which the gNB 50 uses an offset, is only examples for the embodiments in which the AF 70, PCF 85, and SMF 80 perform adjustment, and signaling (e.g., notification, request, and response) shown between specific entities is not to be interpreted as limiting the operations of the embodiments to be described in drawings. In this case, a separate stream ID is not required, and TSCAI including a burst arrival time for each domain is delivered to the gNB 50. The UE 40 manages a TSN domain-specific offset for UL traffic, manages TSCAI received from the TSN domain-specific CNC 60, and is aware of the maximum UE residence time. The UPF 30 manages a domain-specific offset for DL traffic, and the AF 70 manages domain-specific TSCAI for DL traffic and is aware of the maximum UPF residence time and CN PDB. The AF 70 may also be responsible for exchanging information with the CNC 60 with respect to UL and DL traffic, and thus is also aware of domain-specific TSCAI for UL and DL traffic, the maximum UE residence time, the maximum UPF residence time, and CN PDB.

Referring to FIG. 5, information may be delivered along the following flow to obtain a burst arrival time by the gNB 50. A TSN system may deliver TSCAI information via CNC 60 and CNC management messages (operation 511), and the CNC 60 may deliver TSCAI information to the AF 70 via TSN bridge management messages (operation 513). The AF 70 may perform adjustment for a burst arrival time by applying a UL residence time in the case of UL or a UPF residence time and CN PDB in the case of DL (operation 515). The initial value of a domain-specific default offset may be applied, apart from this. The AF 70 is aware of this value. Next, the AF 70 may deliver TSCAI information and a default offset to the PCF 85 via an NR request/response message (operation 517), the PCF 85 may deliver the TSCAI information and the default offset to the SMF 80 via N7 PDU session modification Req. (operation 519), the SMF 80 may deliver the default offset to the UPF 30 via N4 PDU session modification Req./Res. (operations 521 and 523), the SMF 80 may deliver the TSCAI information and the default offset to the AMF 90 via N11 Req. message (operation 525), and the AMF 90 may deliver the TSCAI information and the default offset to the gNB 50 via N2 session Req. message (operation 527). The gNB 50 may modify a resource to be used for transmitting data to the terminal 40, based on the received TSCAI information and default offset (operation 529). Further, the gNB 50 may deliver an N2 session Res. message to the AMF 90 (operation 531), and the AMF 90 may transmit an N11 Res. message to the SMF 80 (operation 533). The SMF 80 having received the N11 Res. message may inform the UE 40 the default offset by delivering an N1 PDU session modification Req. message to the UE 40 (operation 535), and the UE 40 may deliver an N1 PDU session modify Res. message in response to the received message to the SMF 80 (operation 537). Thereafter, the SMF 80 may deliver an N7 notification message to the PCF 85 (operation 539), and the PCF 85 may deliver an N5 notification message to the AF 70 (operation 541).

Referring to FIG. 6, when the PCF 85 performs adjustment (operation 617), the PCF 85 uses a domain-specific default offset, which is delivered from the AF 70, and the PCF 85 is aware of the maximum UE residence time, the maximum UPF residence time and CN PDB. Other operations for obtaining a burst arrival time by the gNB 50 are similar to those in FIG. 5. That is operations 611 to 641 shown in FIG. 6 may be similar to operations 511 to 541 shown in FIG. 5.

Referring to FIG. 7, when the SMF 80 performs adjustment (operation 723), the SMF 80 uses a default offset for each domain, which is delivered via the AF 70 and the PCF 85. In this case, the SMF 80 is aware of the maximum UE residence time, the maximum UPF residence time and CN PDB. Other operations for obtaining a burst arrival time by the gNB 50 are similar to those in FIG. 5. Operations 711 to 741 shown in FIG. 7 may be similar to operations 511 to 541 shown in FIG. 5.

Figure 8:
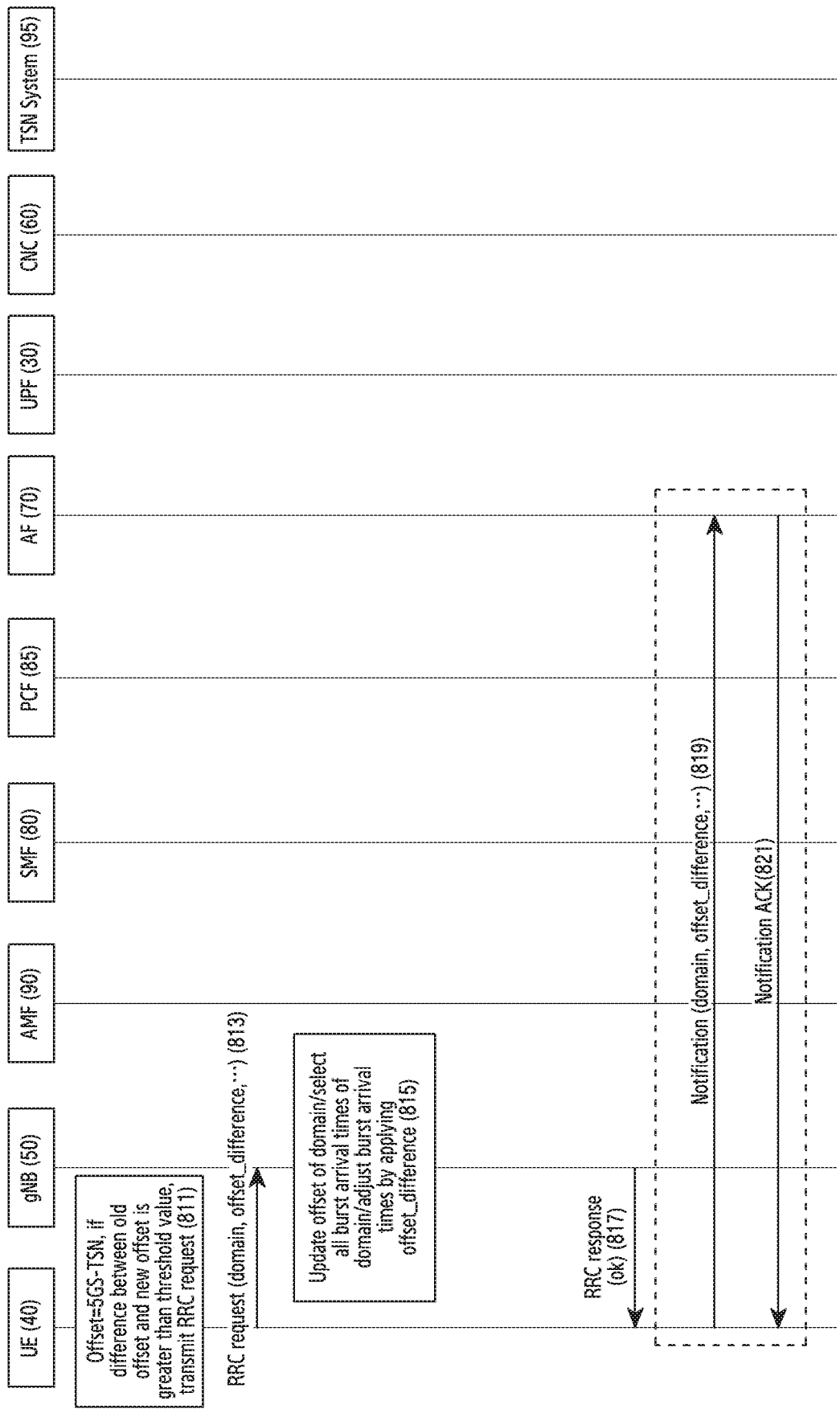
FIG. 8 is a signal flow diagram showing the flow of equipment (UE)→gNB in a method in which a gNB uses an offset according to an embodiment of the disclosure.
Figure 9:
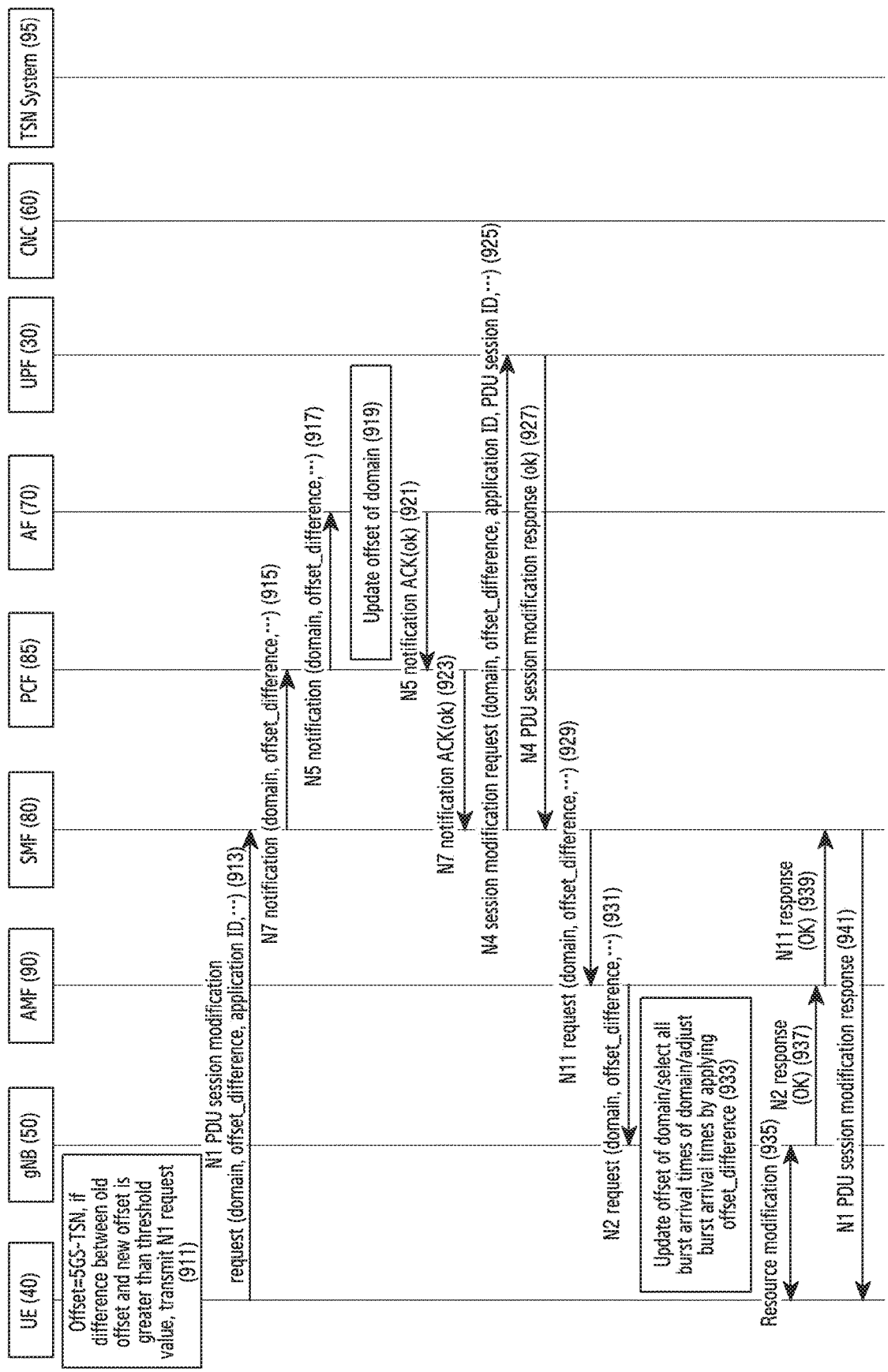
FIG. 9 is a signal flow diagram showing the flow of UE→SMF in the method in which a gNB uses an offset according to an embodiment of the disclosure.
Figure 10:
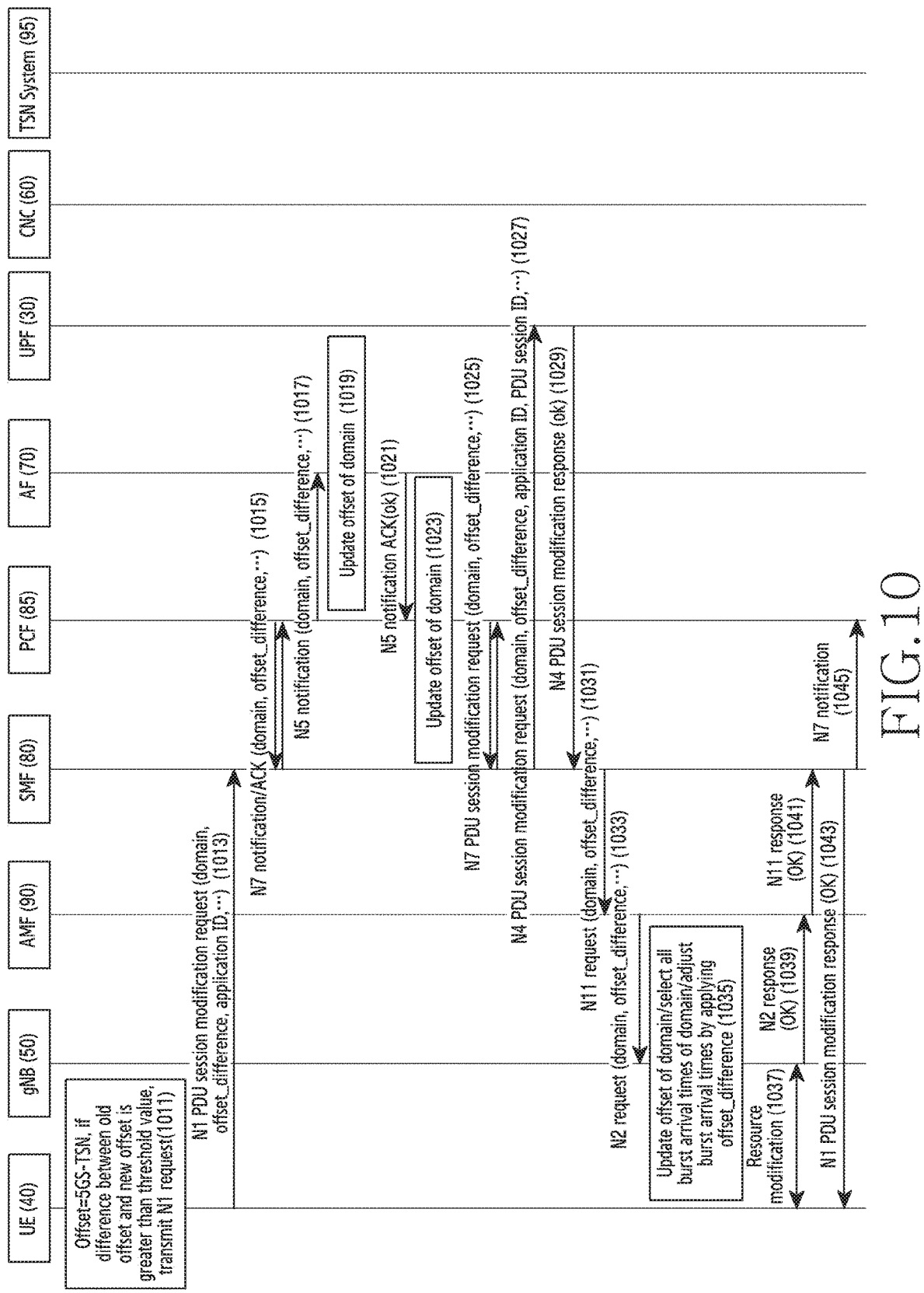
FIG. 10 is a signal flow diagram showing the flow of UE→SMF→PCF in a method in which a gNB uses an offset according to an embodiment of the disclosure.
Figure 11:
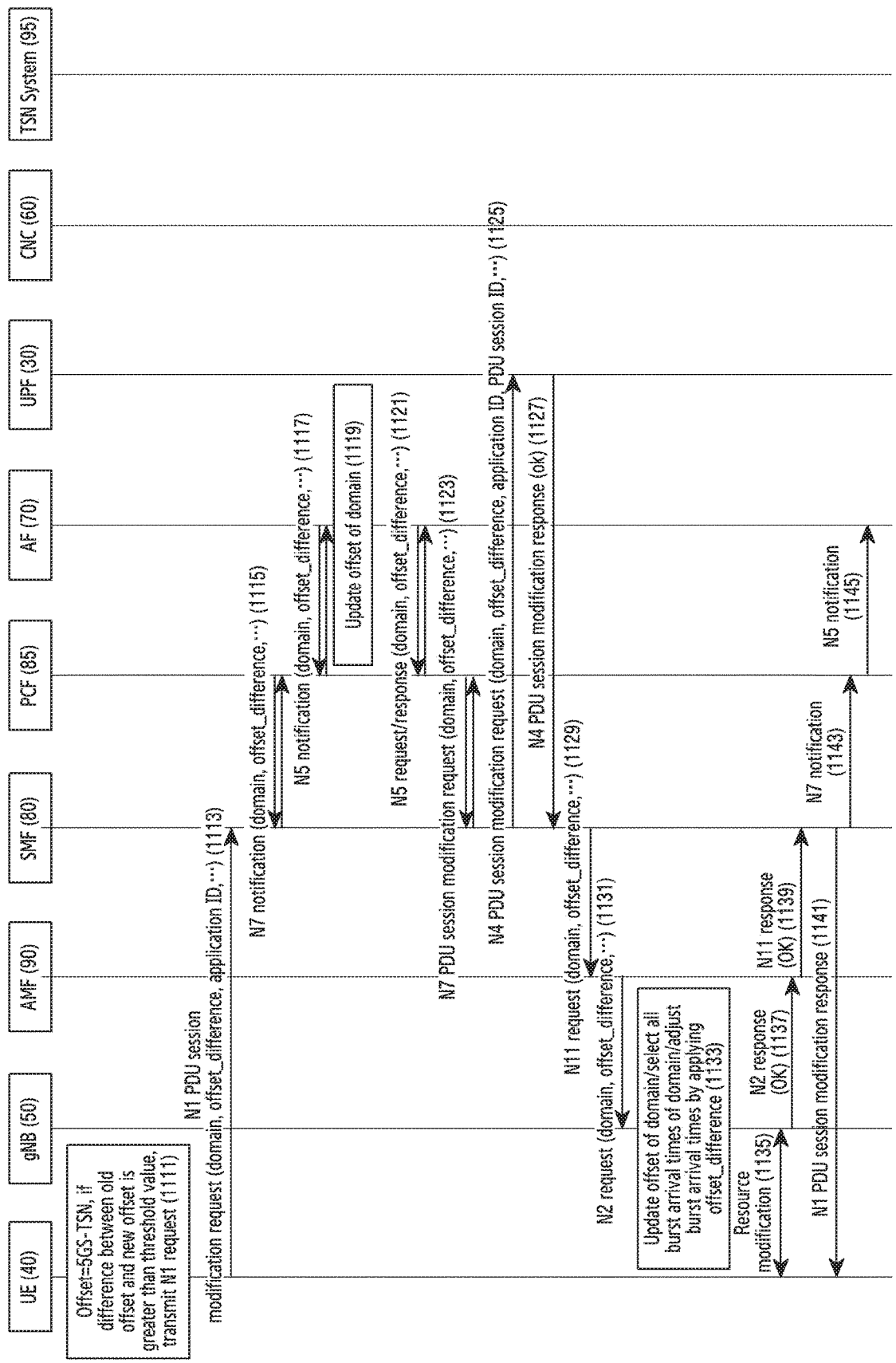
FIG. 11 is a signal flow diagram showing the flow of UE→SMF→PCF→AF in a method in which a gNB uses an offset according to an embodiment of the disclosure.
Figure 12:
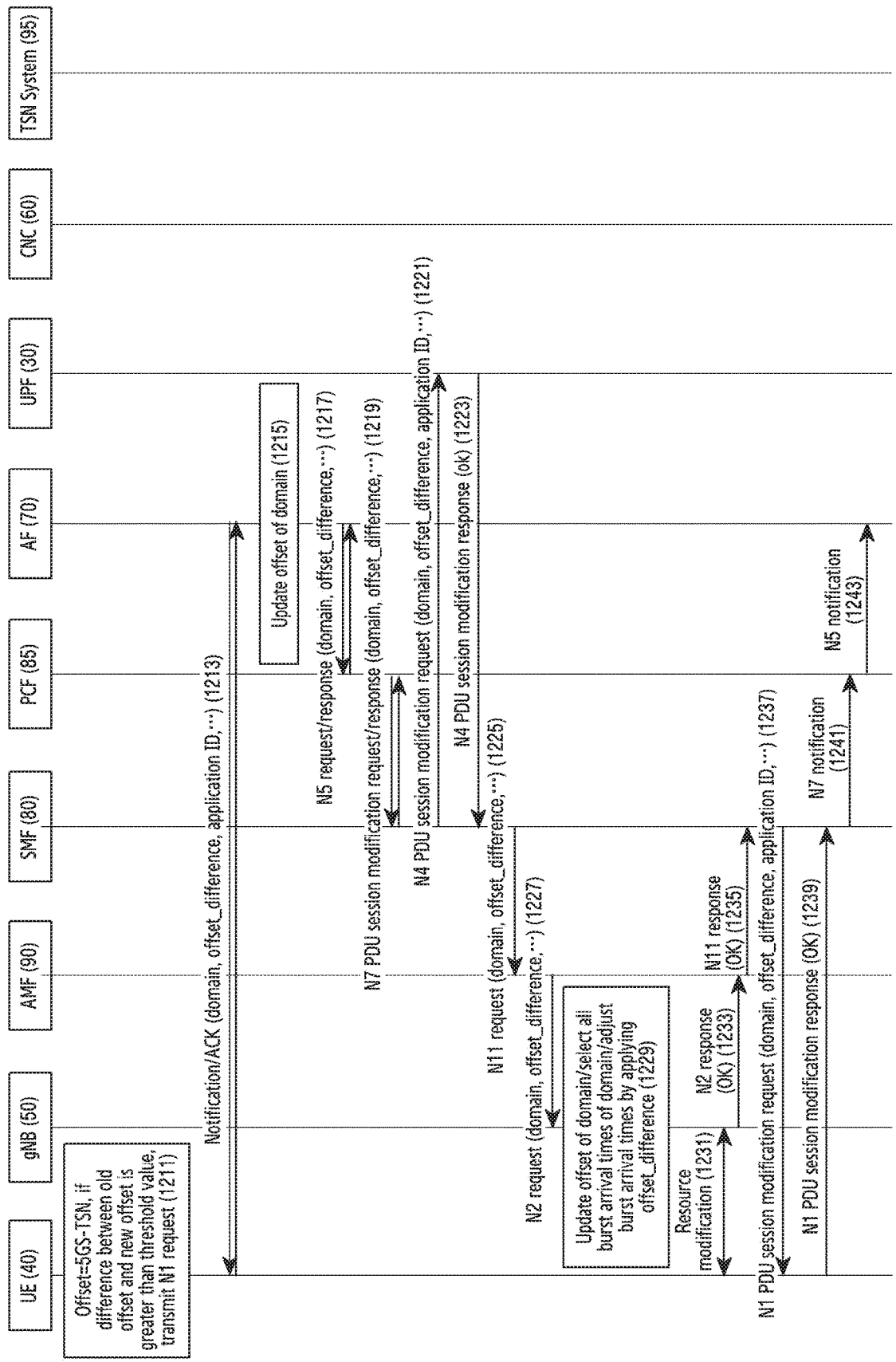
FIG. 12 is a signal flow diagram showing the flow of AF in a method in which the a gNB uses an offset according to an embodiment of the disclosure.
Figure 13:
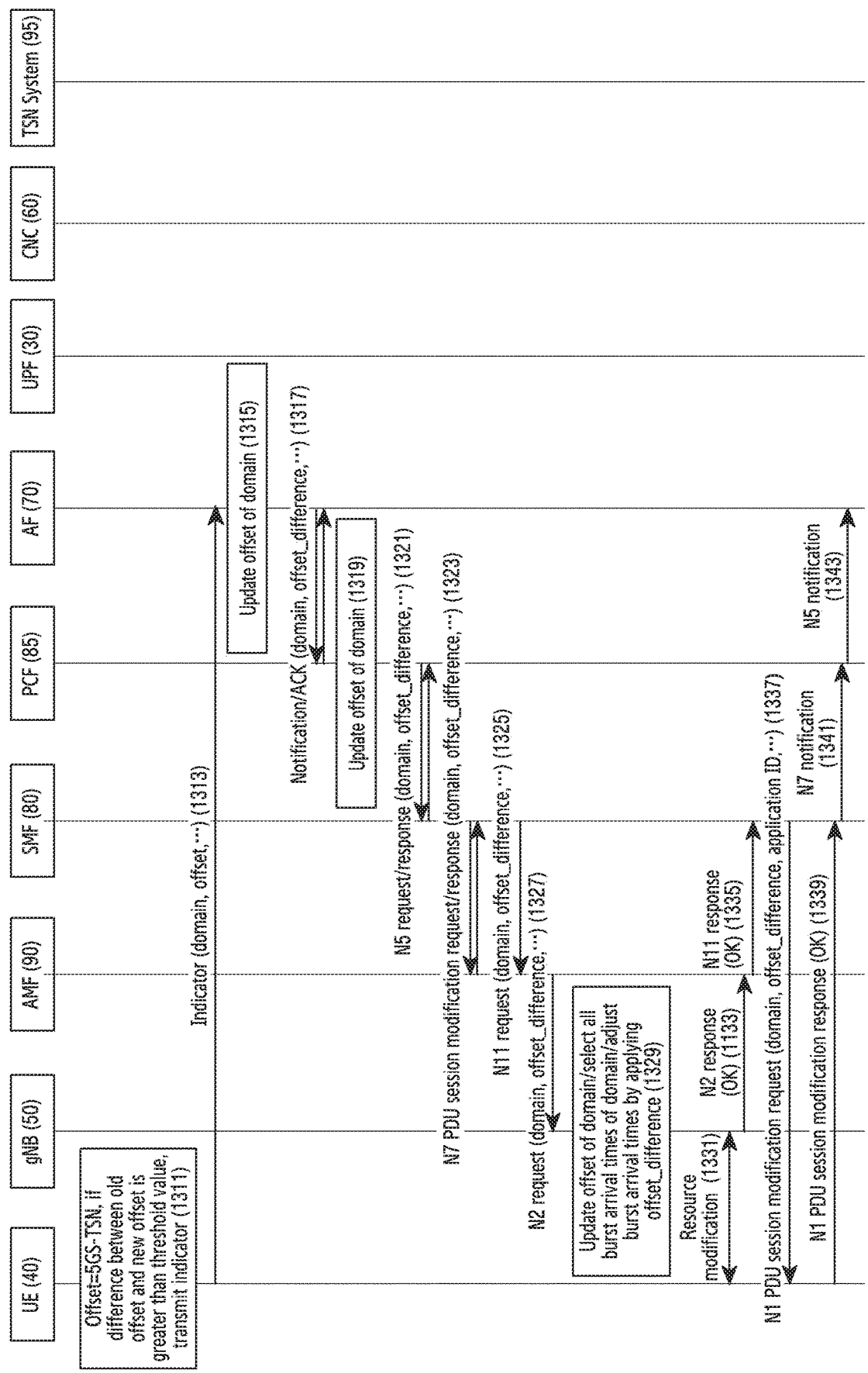
FIG. 13 is a signal flow diagram showing the flow of UE→UPF in a method in which a gNB uses an offset according to an embodiment of the disclosure.

FIG. 8 is a signal flow diagram showing the flow of UE 40→gNB 50 in a method in which the gNB 50 uses an offset according to an embodiment of the disclosure, FIG. 9 is a signal flow diagram showing the flow of UE 40→SMF 80 in the method in which the gNB 50 uses an offset according to an embodiment of the disclosure, FIG. 10 is a signal flow diagram showing the flow of UE 40→SMF 80→PCF 85 in a method in which the gNB 50 uses an offset according to an embodiment of the disclosure, FIG. 11 is a signal flow diagram showing the flow of UE 40→SMF 80→PCF 85→AF 70 in a method in which the gNB 50 uses an offset according to an embodiment of the disclosure, FIG. 12 is a signal flow diagram showing the flow of AF 70 in a method in which the gNB 50 uses an offset according to an embodiment of the disclosure, and FIG. 13 is a signal flow diagram showing the flow of UE 40→UPF 30 in a method in which the gNB 50 uses an offset according to an embodiment of the disclosure. The signaling illustrated in FIGS. 8, 9, 10, 11, 12, and 13, which shows a method in which the gNB 50 uses an offset, is only examples for explaining the flow of UE 40→gNB 50, UE 40→SMF 80, UE 40→SMF 80→PCF 85, UE 40→SMF 80→PCF 85→AF 70, AF 70, and UE 40→UPF 30 in the embodiments, and signaling between specific entities is not to be interpreted as limiting the operations of the embodiments to be described in connection with drawings.

The UE 40 calculates an offset (Example 1: time offset=5GS-TSN (difference between the 5GS clock and the TSN clock), Example 2: frequency offset) (operations 811, 911, 1011, 1111, 1211, and 1311) during a process of transmitting and receiving a sync frame to or from the UPF 30 for TSN clock synchronization with the UPF 30. At this time, if a difference (or change) between an old offset, which is an offset previously used for adjustment, and a newly calculated (measured) new offset, exceeds a certain threshold value, information delivery is triggered. This threshold value is a difference in accuracy between the 5GS clock and the TSN clock or is determined according to the size of the corresponding stream period or the latency request. For example, if the difference in accuracy between the 5GS clock and the TSN clock is too large (i.e. frequent), a threshold value may be large in order to prevent the signaling occurrence. In addition, if the corresponding stream period is large or the latency request is large, a threshold value thereof may be large. With regard to the condition in which information is transmitted by the UE 40, the UE 40 may transmit information at regular intervals or may transmit the information when the signaling load does not exceed a certain level. In this case, since the gNB 50 is aware of a burst arrival time(s) of a stream associated with each domain, when the domain and the offset difference (difference between the old offset and the new offset) is delivered to the gNB 50, the gNB 50 may adjust the burst arrival times of all streams associated with the corresponding domain using offset difference without consideration of a separate stream ID. This process may be implemented such that each domain is synchronized with the 5GS clock and thus has a separate clock having as much difference as the offset. The operation through the comparison of the offset difference and the threshold value may be equally applied to the second solution, as shown in FIGS. 22 to 41, as well as FIGS. 8, 9, 10, 11, 12, and 13.

Referring to FIG. 8, the figure shows the flow of UE 40→gNB 50 in a method in which the gNB 50 uses an offset. The UE 40 delivers only domain and offset difference (a difference between an old offset and a new offset) information to the gNB 50 using the RRC (operation 813). The gNB 50 adjusts the burst arrival times of all streams corresponding to the corresponding domain using an offset (operation 815). At this time, the UE 40 may send the domain and offset to the AF 70 (operation 819) so that a domain-specific offset managed by the AF 70 may be updated, and the AF 70 may send a notification (ACK) to the UE 40 (operation 821). The gNB 50 may send acknowledgment of an RRC response to the UE 40 (operation 817).

Referring to FIG. 9, the figure shows the flow of UE 40→SMF 80 in the method in which the gNB 50 uses an offset. The UE 40 sends a request to the SMF 80 using a PDU session modification message, and the domain and offset difference information is delivered to the gNB 50 via an N2 message (operation 931). The SMF 80 shares the domain and offset difference with the PCF 85 and the AF 70 via a notification process (operations 915 to 923). In addition, the SMF 80 may also share the domain and offset difference with to the UPF 30 via the N4 message (operations 925 and 927). N11 request, N2 request, update offset, resource modification, N2 response, N11 response, and N1 PDU session modification response occur at operations 929 to 941, as shown in FIG. 9.

Referring to FIG. 10, the figure shows the flow of UE 40→SMF 80→PCF 85 in a method in which the gNB 50 uses an offset. The SMF 80 immediately performs a PDU session modification request in FIG. 9, but the PCF 85 performs a determination on a PDU session modification request by a terminal in FIG. 10. Operations 1011 to 1045 are shown in FIG. 10.

Referring to FIG. 11, the figure shows the flow of UE 40→SMF 80→PCF 85→AF 70 in a method in which the gNB 50 uses an offset. The SMF 80 immediately performs the PDU session modification request in FIG. 9, the PCF 85 performs determination on a PDU session modification request by a terminal in FIG. 10, but the AF 70 makes determination on a PDU session modification request by a terminal in FIG. 11. Operations 1111 to 1145 are shown in FIG. 11.

Referring to FIG. 12, the figure shows the flow of UE 40→AF 70 in a method in which the gNB 50 uses an offset. Information is delivered using the message sent by the UE 40 to the SMF 80 in FIG. 11, but direct communication of an application stage between the UE 40 and the AF 70 is used in FIG. 12. Other processes are as shown in FIG. 11. Operations 1211 to 1243 are shown in FIG. 12.

Referring to FIG. 13, the figure shows the flow of UE 40→UPF 30 in a method in which the gNB 50 uses an offset. Whenever the UE 40 receives a TSN synchronization frame, the UE 40 sends an offset to UPF 30 to achieve a TSN synchronization therebetween. Although another method may be employed, the mapping may be achieved by a process in which the offset is logically delivered. At this time, when a criterion in which information delivery needs to be triggered is satisfied, the UE 40 delivers the offset to the UPF 30 by adding a separate indicator indicating that this offset needs to be delivered up to the gNB 50 (operation 1313). Upon receiving the offset having this indicator, the UPF 30 starts a process of delivering the corresponding domain and offset difference to the gNB 50. Reference may be made to FIG. 14, 15, 16, or 17 in connection with the process. Operations 1311 to 1343 are shown in FIG. 13.

Figure 14:
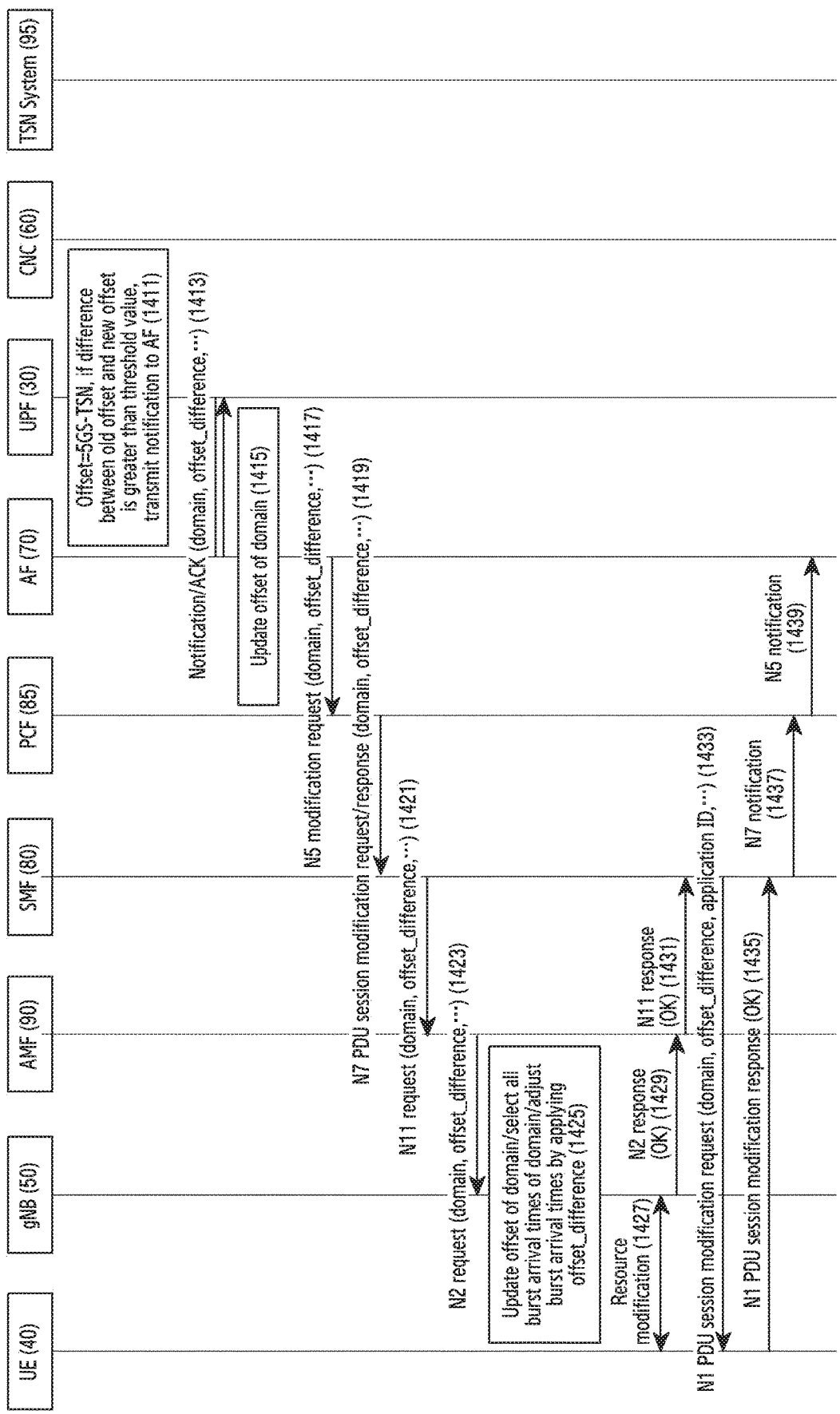
FIG. 14 is a signal flow diagram showing the flow of UPF→AF in a method in which a gNB uses an offset according to an embodiment of the disclosure.
Figure 15:
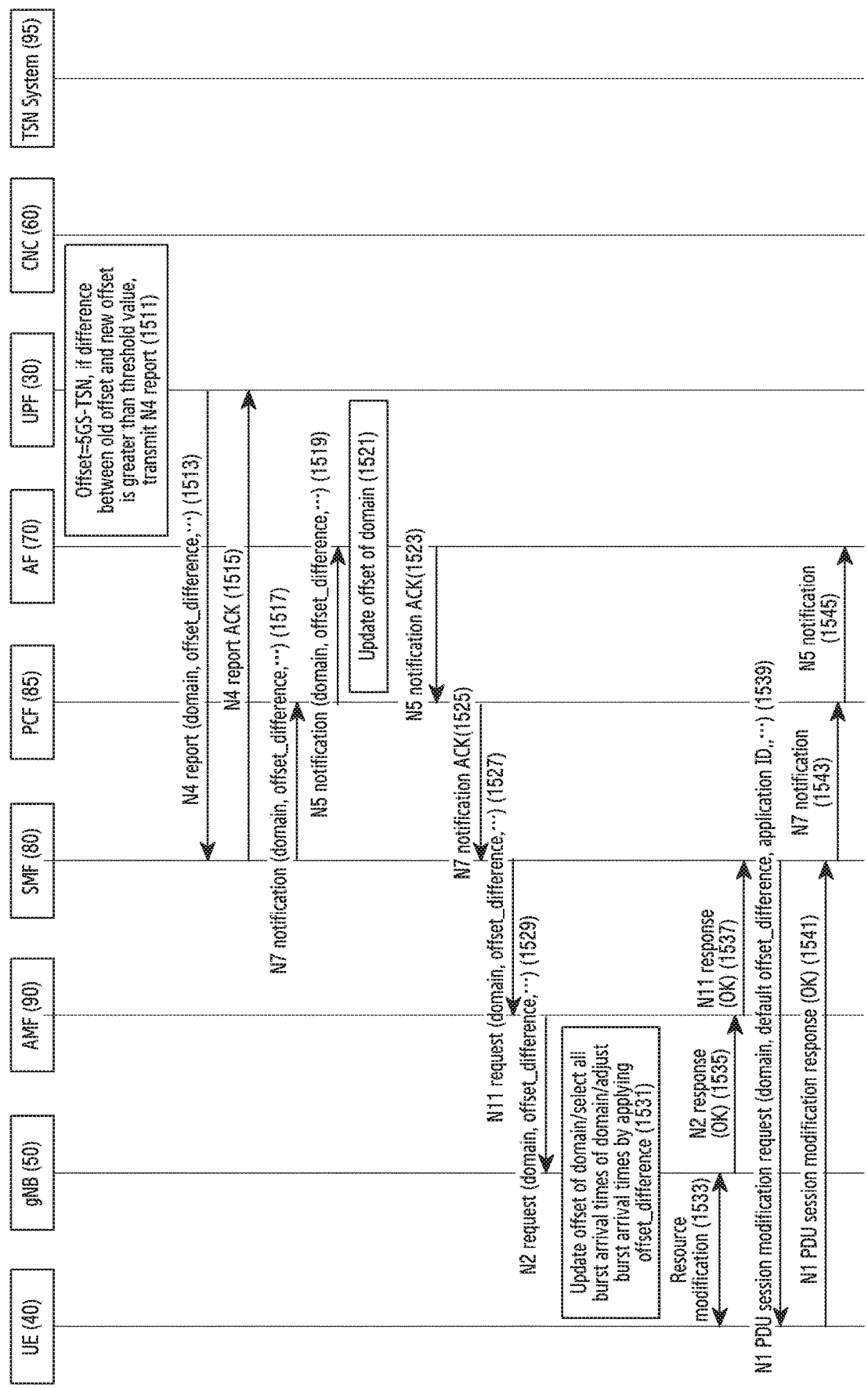
FIG. 15 is a signal flow diagram showing the flow of UPF→SMF in a method in which a gNB uses an offset according to an embodiment of the disclosure.
Figure 16:
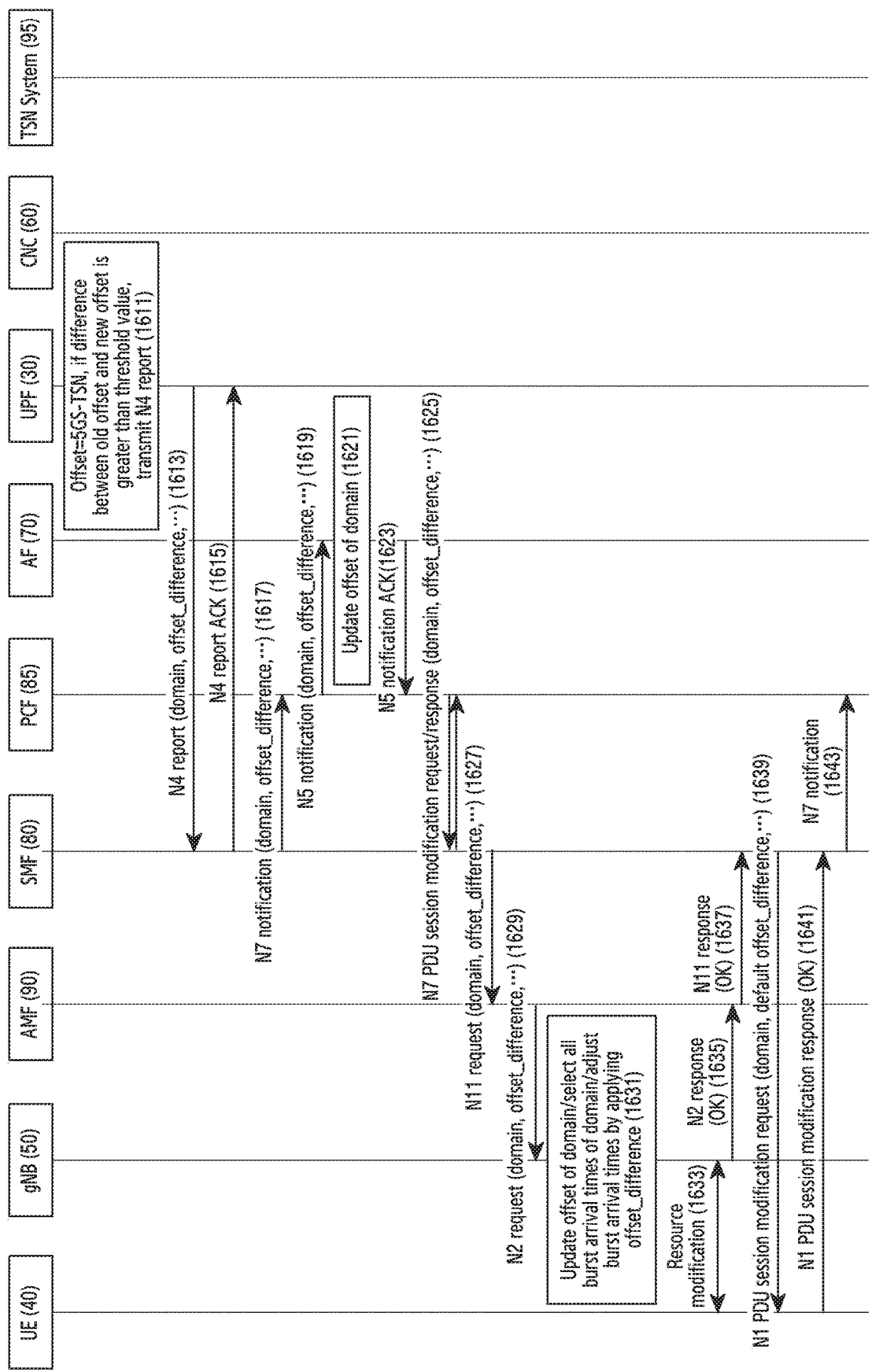
FIG. 16 is a signal flow diagram showing the flow of UPF→SMF→AF in a method in which a gNB uses an offset according to an embodiment of the disclosure.
Figure 17:
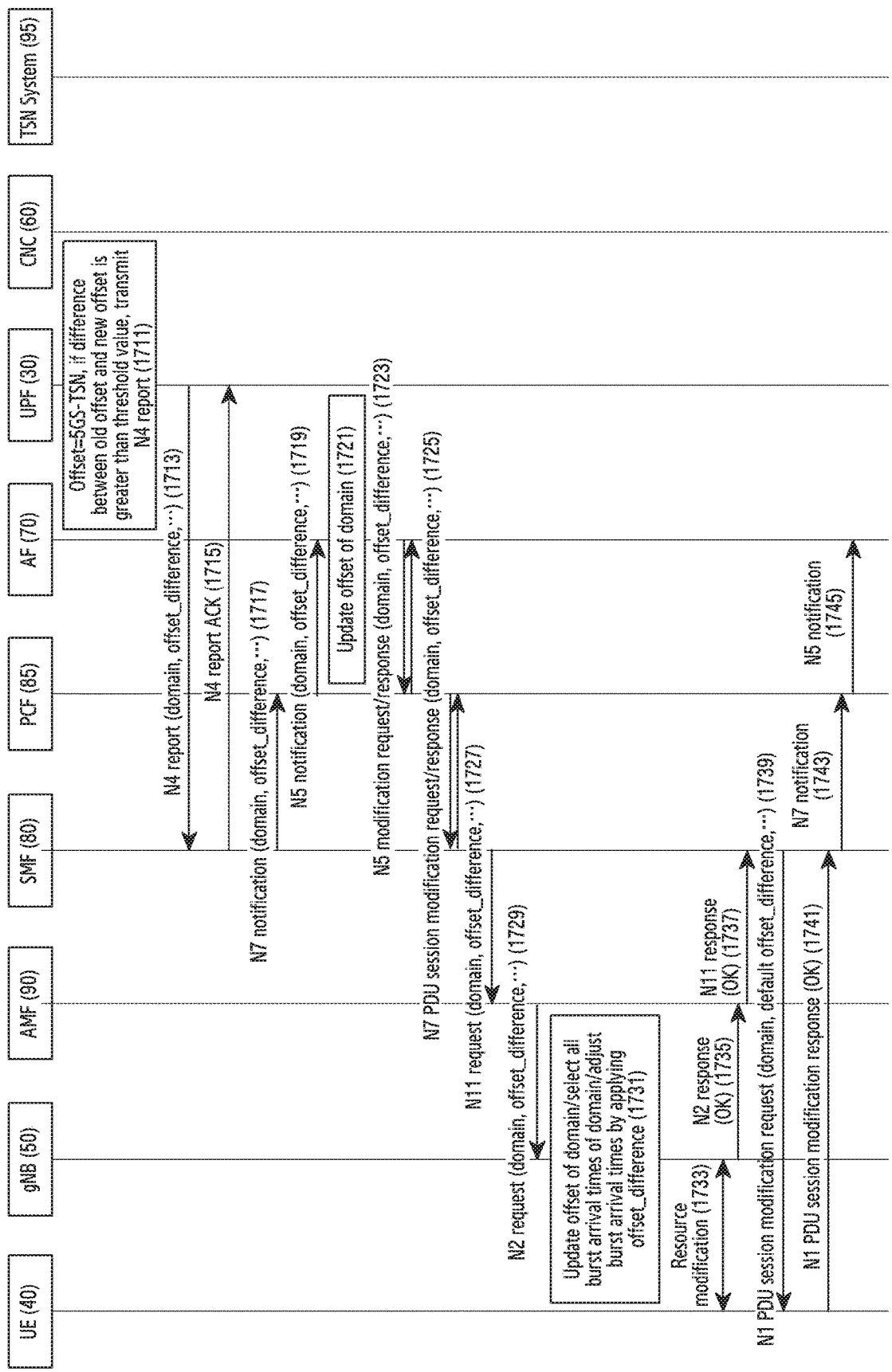
FIG. 17 is a signal flow diagram showing the flow of UPF→SMF→PCF in a method in which a gNB uses an offset according to an embodiment of the disclosure.
Figure 18:
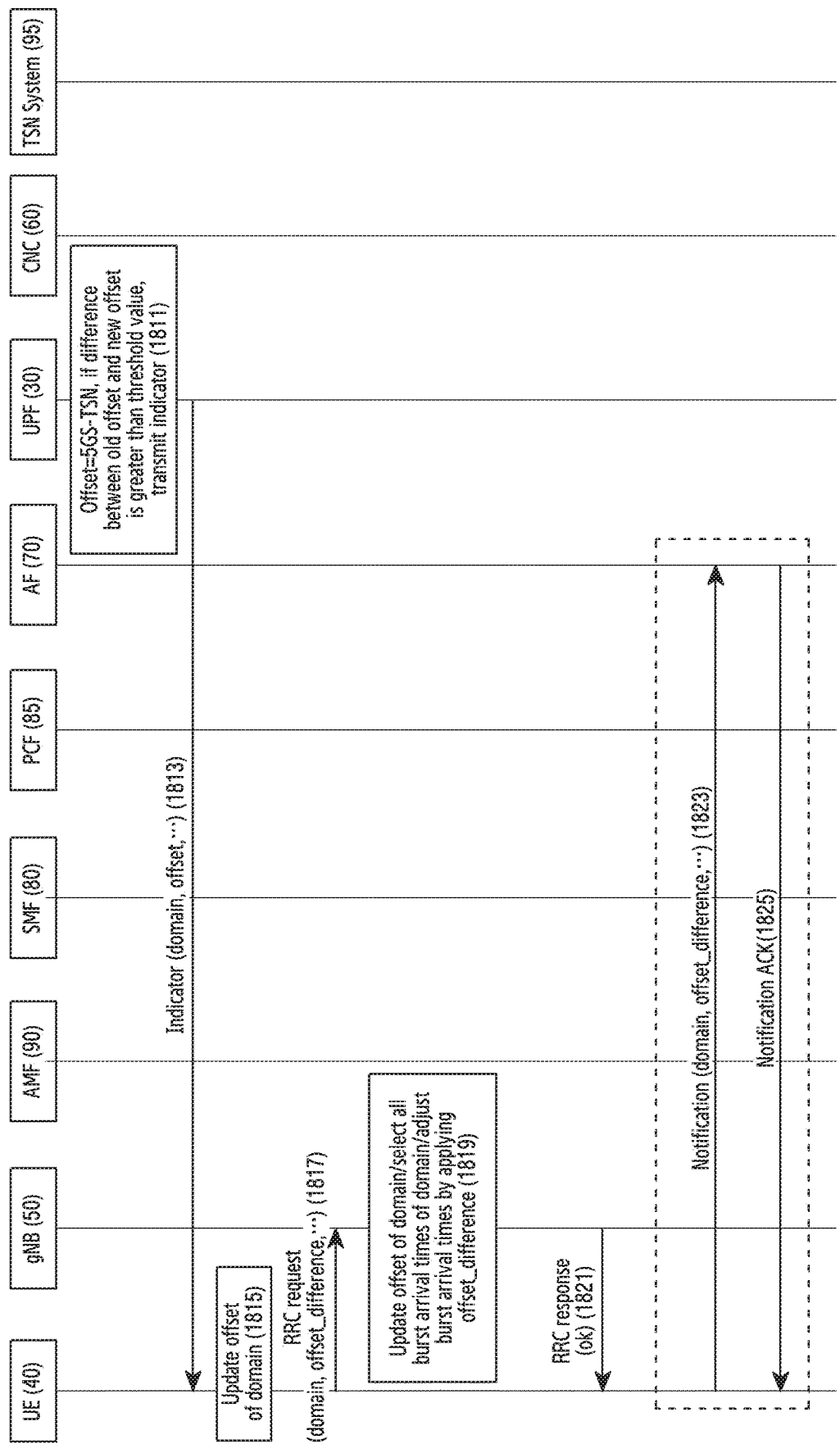
FIG. 18 is a signal flow diagram showing the flow of UPF→UE in a method in which a gNB uses an offset according to an embodiment of the disclosure.

FIG. 14 is a signal flow diagram showing the flow of UPF 30→AF 70 in a method in which the gNB 50 uses an offset according to an embodiment of the disclosure. Operations 1411 to 1439 are shown in FIG. 14. FIG. 15 is a signal flow diagram showing the flow of UPF 30→SMF 80 in a method in which the gNB 50 uses an offset according to an embodiment of the disclosure. Operations 1511 to 1545 are shown in FIG. 15. FIG. 16 is a signal flow diagram showing the flow of UPF 30→SMF 80→AF 70 in a method in which the gNB 50 uses an offset according to an embodiment of the disclosure. Operations 1611 to 1643 are shown in FIG. 16. FIG. 17 is a signal flow diagram showing the flow of UPF 30→SMF 80→PCF 85 in a method in which the gNB 50 uses an offset according to an embodiment of the disclosure. Operations 1711 to 1745 are shown in FIG. 17. FIG. 18 is a signal flow diagram showing the flow of UPF 30→UE 40 in a method in which the gNB 50 uses an offset according to an embodiment of the disclosure. Operations 1811 to 1829 are shown in FIG. 18. The signaling in FIGS. 14, 15, 16, 17, and 18, which shows a method in which the gNB 50 uses an offset, is only examples for explaining the flow of UPF 30→AF 70, UPF 30→SMF 80, UPF 30→SMF 80→AF 70, UPF 30→SMF 80→PCF 85, and UPF 30→UE 40, and signaling between specific entities is not to be interpreted as limiting the operations of the embodiments to be described in connection with the drawings.

The UPF 30 calculates an offset (Example 1: time offset=5GS-TSN (difference between the 5GS clock and the TSN clock), Example 2: frequency offset) (operations 1411, 1511, 1611, 1711, and 1811), during a process of transmitting and receiving a sync frame to or from the UE 40 for TSN clock synchronization. At this time, if a difference (or change) between an old offset, which is an offset previously used for adjustment, and a newly calculated (measured) new offset exceeds a certain threshold value, information delivery is triggered. This threshold value is a difference in accuracy between the 5GS clock and the TSN clock, or is determined according to the size of the corresponding stream period or a latency request. For example, if the difference in accuracy between the 5GS clock and the TSN clock is too large (i.e. frequent), a threshold value may be large in order to prevent the signaling occurrence. In addition, if the corresponding stream period is large or the latency request is large, a threshold value thereof may be large. With regard to the condition in which information is transmitted by the UPF 30, the UPF 30 may transmit information at regular intervals or may transmit the information when the signaling load does not exceed a certain level. In this case, since the gNB 50 manages a domain-specific stream, no ID for identifying a stream needs to be delivered separately. The gNB 50, which has received the domain and offset difference information, selects all burst arrival time(s) associated with the corresponding domain and performs adjustment by the offset_difference. This process may be implemented such that each domain is synchronized with the 5GS clock and thus has a separate clock having as much difference as the offset. The operation through the comparison of the threshold value and the difference between a previous offset and a current offset may be equally applied to the second solution, as shown in FIGS. 42 to 55, as well as FIGS. 14, 15, 16, 17, and 18.

Referring to FIG. 14, the figure shows the flow of UPF 30→AF 70 in a method in which the gNB 50 uses an offset. Operation (1413) in which the UPF 30 is directly connected to the AF 70 via an application process does not exist in the prior art, and thus needs to be separately defined. At this time, the UPF 30 needs to deliver information including the domain and offset difference to the AF 70. When the information delivery request triggered by the AF 70 is delivered to the SMF 80 via the PCF 85 (operations 1417 and 1419), the SMF 80 delivers this information to the gNB 50 via an N2 message (operations 1421 and 1423).

Referring to FIG. 15, the figure shows the flow of UPF 30→SMF 80 in a method in which the gNB 50 uses an offset. If the UPF 30 delivers domain-specific offset difference using an N4 Report message or the like (operation 1513 and 1515), the SMF 80 uses a PDU session modification procedure based on the difference in order to deliver domain and offset difference information to the gNB 50 using an N2 message. During this process, the SMF 80 and the PCF 85 deliver the domain and offset difference to the PCF 85 and the AF 70, respectively, using a notification message (operations 1517, 1519, 1523, and 1525).

Referring to FIG. 16, the figure shows the flow of UPF 30→SMF 80→PCF 85 in a method in which the gNB 50 uses an offset. The SMF 80 determines PDU session modification in FIG. 15 but the PCF 85 determines whether to modify PDU session in FIG. 16.

Referring to FIG. 17, the figure shows the flow of UPF 30→SMF 80→PCF 85→AF 70 in a method in which the gNB 50 uses an offset. The SMF 80 determines PDU session modification in FIG. 15, the PCF 85 determines whether to modify PDU session in FIG. 16, and the AF 70 determines PDU session modification in FIG. 17.

Referring to FIG. 18, the figure shows the flow of UPF 30→UE 40 in a method in which the gNB 50 uses an offset. Whenever the UPF 30 receives a TSN synchronization frame from an external TSN node, the UPF 30 sends an offset to the UE 40 to achieve TSN synchronization with the UE 40. Although another method may be employed, the mapping may be achieved by a process in which the offset is logically delivered. At this time, when a criterion in which information delivery needs to be triggered is satisfied, the UPF 30 delivers the offset to the UE 40 by adding a separate indicator indicating that this offset needs to be delivered up to the gNB 50. Upon receiving the offset having this indicator, the UE 40 starts a process of delivering the corresponding domain and offset difference to the gNB 50. Reference may be made to FIG. 8, 9, 10, 11, or 12 in connection with this process.

Figure 19:
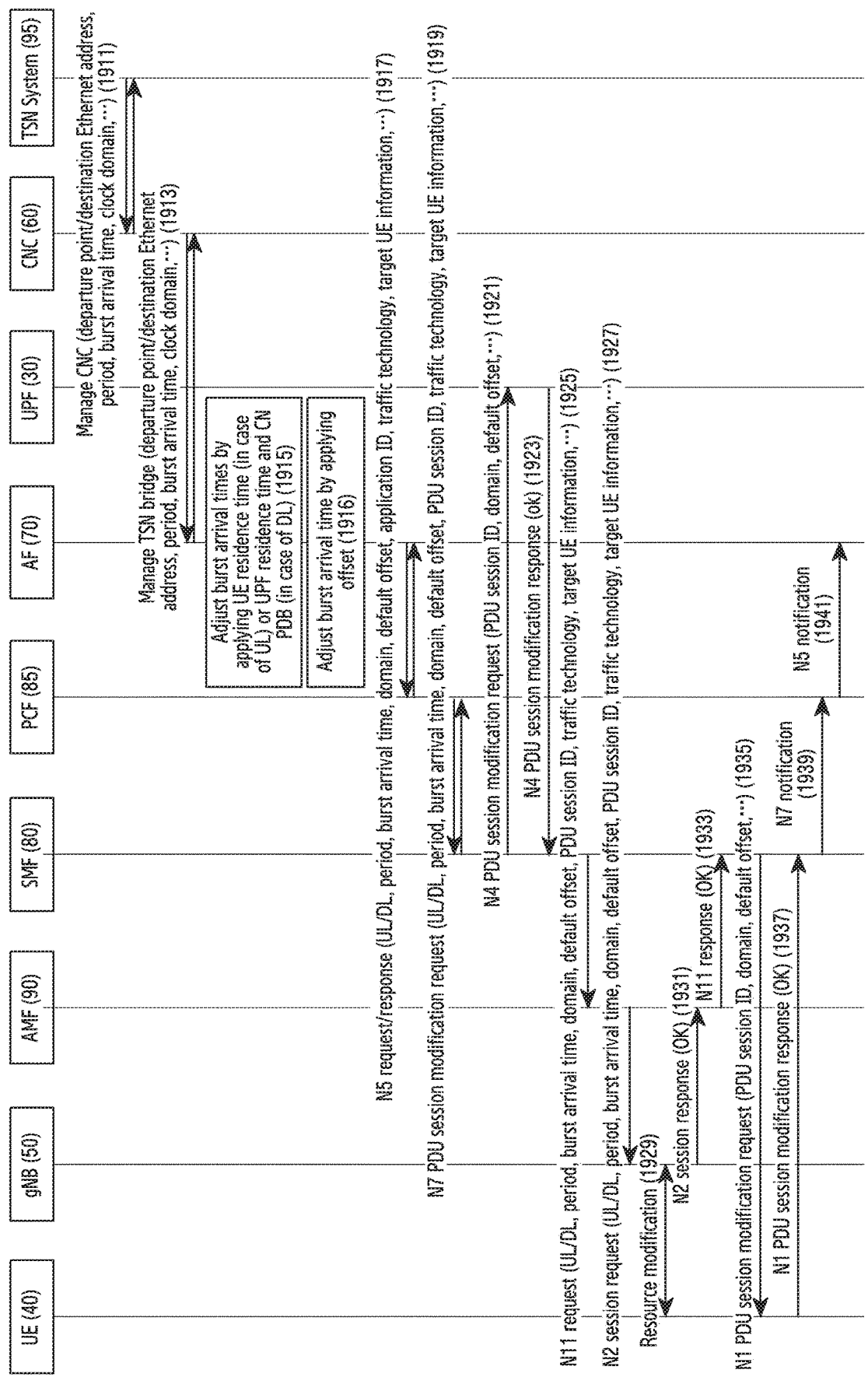
FIG. 19 is a signal flow diagram showing an initial flow in a method in which a gNB uses an adjusted burst arrival time and illustrates adjustment performed by an AF according to an embodiment of the disclosure.
Figure 20:
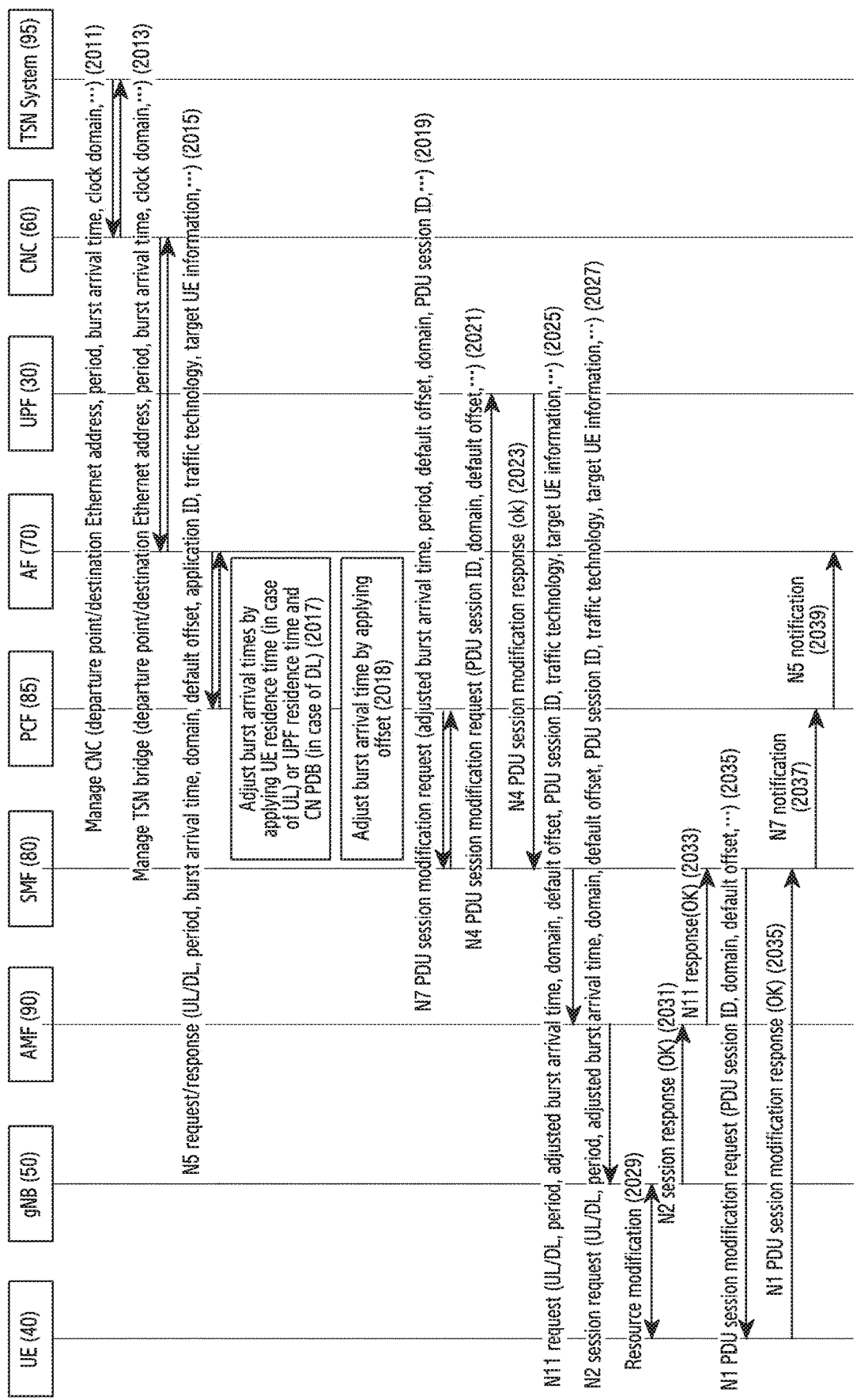
FIG. 20 is a signal flow diagram showing an initial flow in a method in which a gNB uses an adjusted burst arrival time and illustrates adjustment performed by a PCF according to an embodiment of the disclosure.
Figure 21:
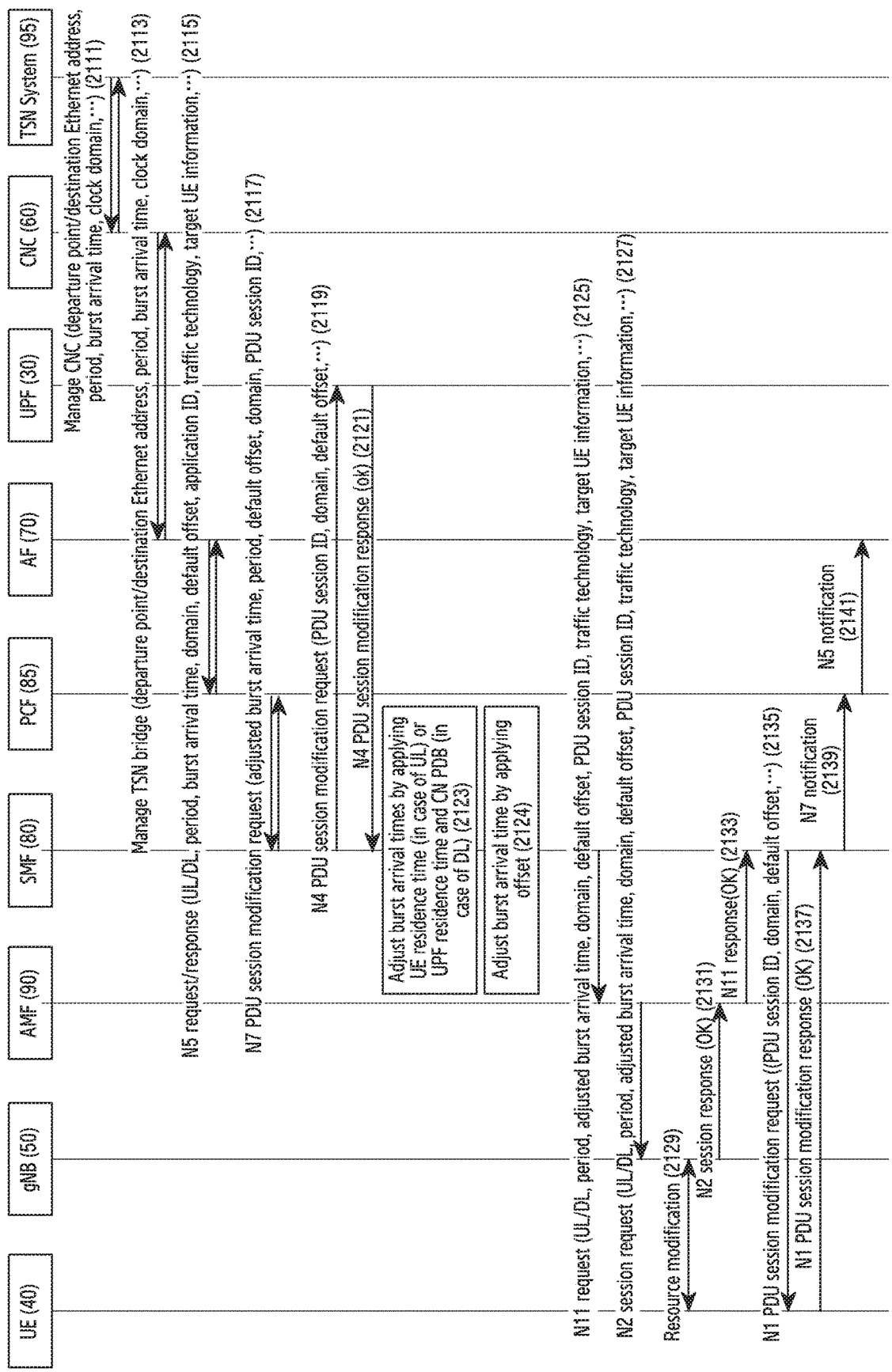
FIG. 21 is a signal flow diagram showing an initial flow in a method in which a gNB uses an adjusted burst arrival time and illustrates adjustment performed by an SMF according to an embodiment of the disclosure.

FIG. 19 is a signal flow diagram showing an initial flow in a method in which the gNB 50 uses an adjusted burst arrival time and illustrates adjustment performed by the AF 70 according to an embodiment of the disclosure. Operations 1911 to 1945 are shown in FIG. 19. FIG. 20 is a signal flow diagram showing an initial flow in a method in which the gNB 50 uses an adjusted burst arrival time and illustrates adjustment performed by the PCF 85 according to an embodiment of the disclosure. Operations 2011 to 2039 are shown in FIG. 20. FIG. 21 is a signal flow diagram showing an initial flow in a method in which the gNB 50 uses an adjusted burst arrival time and illustrates adjustment performed by the SMF 80 according to an embodiment of the disclosure. Operations 2111 to 2141 are shown in FIG. 21. The signaling in FIGS. 19, 20, and 21, which corresponds to an initial flow in a method in which the gNB 50 uses an adjusted burst arrival time, is only examples for explaining embodiments performed by AF 70, PCF 85, and SMF 80, respectively, and signaling between specific entities is not to be interpreted as limiting the operation of the embodiments to be described in connection with drawings. In this case, a separate stream ID is not required, and TSCAI including a domain-specific burst arrival time is delivered to the gNB 50. The UE 40 manages TSN domain-specific offset for UL traffic, manages TSCAI received from the CNC 60 for each TSN domain, and is aware of the maximum UE residence time. The UPF 30 manages a domain-specific offset for DL traffic, and the AF 70 manages domain-specific TSCAI for DL traffic, and is aware of the maximum UPF residence time and CN PDB. The AF 70 is also responsible for exchanging information with CNC 60 with respect to UL and DL traffic, and thus is aware of domain-specific TSCAI for UL and DL traffic, and is aware of the maximum UE residence time, maximum UPF residence time, and CN PDB. In FIGS. 5, 6, and 7, if the gNB 50 receives domain and offset as an input, the gNB 50 receives an adjusted burst arrival time as an input in FIGS. 19, 20, and 21.

Referring to FIG. 19, the figure corresponds to an initial flow in a method in which the gNB 50 uses an adjusted burst arrival time and shows adjustment performed by the AF 70 (operation 1915). A burst arrival time included in the flow after the adjustment is performed by the AF 70 means an adjusted burst arrival time.

Referring to FIG. 20, the figure corresponds to an initial flow in a method in which the gNB 50 uses an adjusted burst arrival time and shows adjustment performed by the PCF 85 (operation 2017). From the AF 70 to the PCF 85, a burst arrival time that has not been adjusted is delivered. A burst arrival time included in the flow after adjustment is performed by the PCF 85 is an adjusted burst arrival time.

Referring to FIG. 21, the figure corresponds to an initial flow in a method in which the gNB 50 uses an adjusted burst arrival time, and the SMF 80 performs adjustment therein (operation 2123). A burst arrival time that has not been adjusted is delivered from the AF 70 to the SMF 80, and a burst arrival time included in the flow after adjustment is performed by the SMF 80 is an adjusted burst arrival time.

As described in FIGS. 19 to 21, the main entity that performs a mapping operation and delivers TSCAI may be the same or different. According to one embodiment (e.g., FIG. 21), an SMF may perform a mapping operation and transmit TSCAI, based on the mapping result. For example, the SMF may determine the delivery of TSCAI. That is, the SMF may trigger the transmission of TSCAI. The SMF may generate TSCAI. The SMF may transmit the generated TSCAI to 5G-AN, that is, to a base station. Further, according to one embodiment (e.g., FIG. 19), a node other than the SMF (e.g., AF) may determine the delivery of TSCAI. That is, another node may trigger the delivery of TSCAI. At this time, the SMF of 5GC may transmit the TSCAI via another node to the 5G-AN, that is, the base station. This is because the SMF, as a main entity that manages the PDU session, may be responsible for configuration/update on QoS flow in the PDU session. Since TSCAI is delivered through a QoS update procedure, the SMF may finally transmit TSCAI to the 5G-AN, that is, to the base station.

Figure 22:
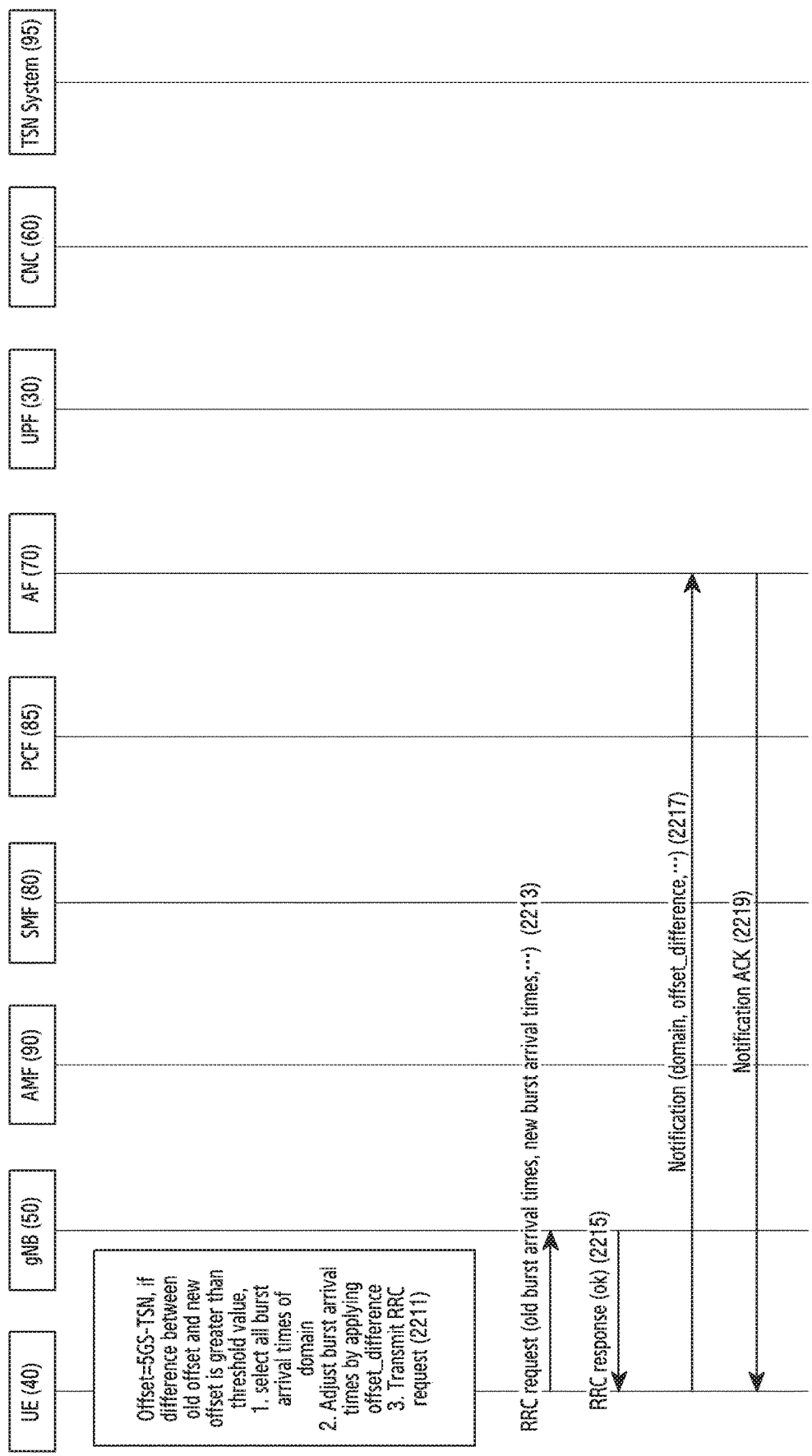
FIG. 22 is a signal flow diagram showing the flow of UE→gNB utilized in a method in which a gNB uses an adjusted burst arrival time and illustrates adjustment performed by the UE according to an embodiment of the disclosure.
Figure 23:
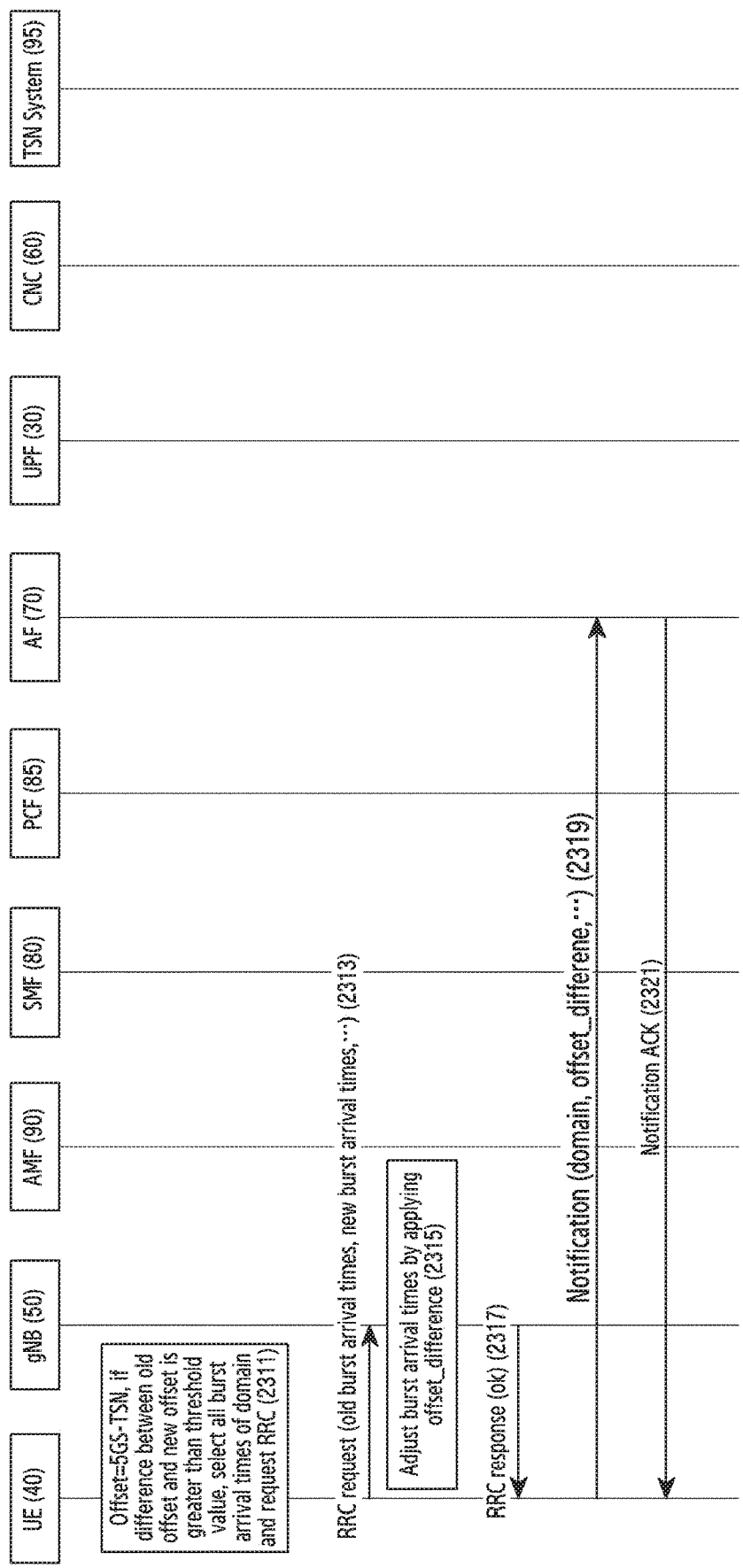
FIG. 23 is a signal flow diagram showing the flow of UE→gNB utilized in a method in which a gNB uses an adjusted burst arrival time and illustrates adjustment performed by the gNB according to an embodiment of the disclosure.

FIG. 22 is a signal flow diagram showing the flow of UE 40→gNB 50 utilized in a method in which the gNB 50 uses an adjusted burst arrival time and illustrates adjustment performed by the UE (operation 2211) according to an embodiment of the disclosure. Operations 2211 to 2219 are shown in FIG. 22. FIG. 23 is a signal flow diagram showing the flow of UE 40→gNB 50 utilized in a method in which the gNB 50 uses an adjusted burst arrival time and illustrates adjustment performed by the gNB 50 (operation 2315) according to an embodiment of the disclosure. Operations 2311 to 2321 are shown in FIG. 23. The signaling shown in FIGS. 22 and 23, which utilizes the flow of UE 40→gNB 50 in a method in which an adjusted burst arrival time is used, is only an example for explaining the embodiment of adjustment performed by the UE 40 (operation 2211) or the gNB 50 (operation 2315), and signaling between specific entities is not to be interpreted as limiting operations of the embodiments to be described in connection with the drawings. The criterion for triggering information delivery by the UE 40 is the same as in FIGS. 8, 9, 10, 11, 12, and 13. In this case, since a domain-specific stream is not managed by the gNB 50, an old burst arrival time is used as an ID for identifying streams.

FIG. 22, which shows the flow of UE 40→gNB 50, utilized in a method in which the gNB 50 uses an adjusted burst arrival time, illustrates the case of adjustment performed by the UE 40. In the case of satisfying information delivery condition, the UE 40 selects all streams associated with the corresponding domain and performs adjustment by using offset difference (operation 2211). When a burst arrival time that has not been adjusted is indicated as an old burst arrival time and a burst arrival time that has been adjusted is indicated as a new burst arrival time, the UE 40 delivers both of these pieces information to the gNB 50 (operation 2213). The gNB 50 replaces the old burst arrival time with the new burst arrival time.

FIG. 23, which shows the flow of UE 40→gNB 50, utilized in a method in which the gNB 50 uses an adjusted burst arrival time, illustrates the case of adjustment performed by the gNB 50. In the case of satisfying information delivery condition, the UE 40 selects all streams associated with the corresponding domain, and delivers the streams along with offset difference to the gNB 50 by specifying the streams as old burst arrival times (operation 2313). The gNB 50 applies the offset difference to an old burst arrival time to adjust the old burst arrival time to the new burst arrival time (operation 2315).

Figure 24:
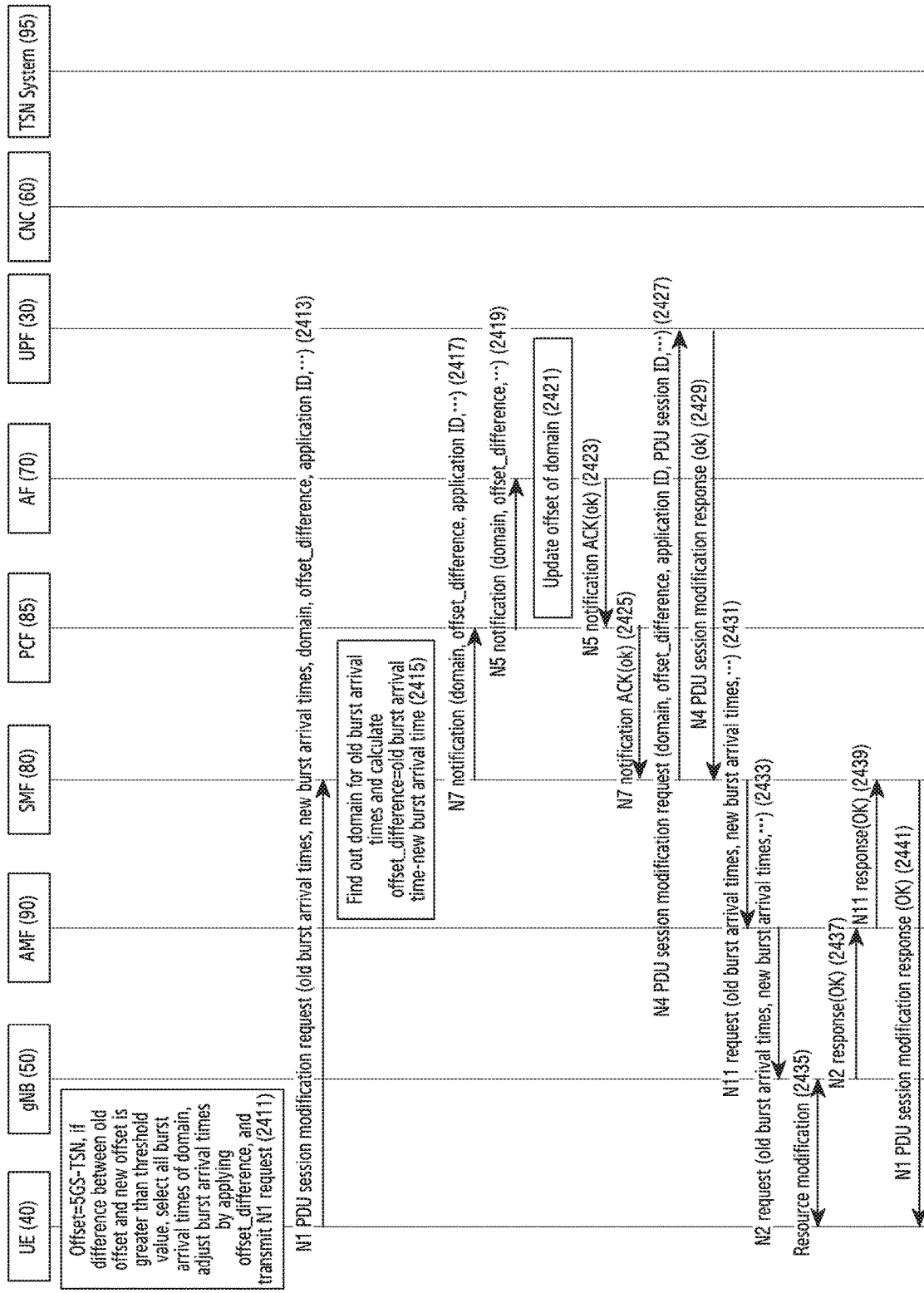
FIG. 24 is a signal flow diagram showing the flow of UE→SMF utilized in a method in which a gNB uses an adjusted burst arrival time and illustrates adjustment performed by the UE according to an embodiment of the disclosure.
Figure 25:
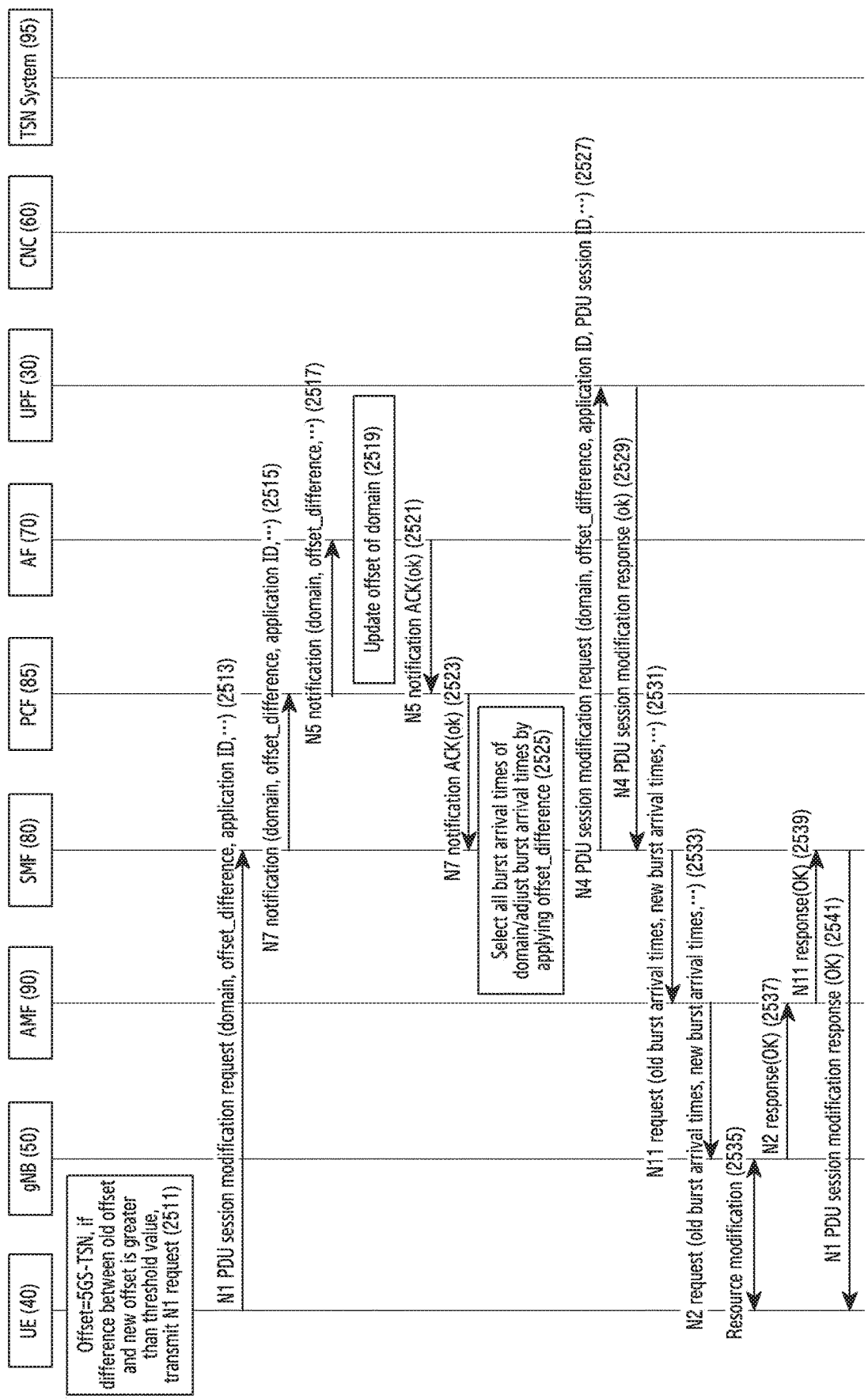
FIG. 25 is a signal flow diagram showing the flow of UE→SMF utilized in a method in which a gNB uses an adjusted burst arrival time and illustrates adjustment performed by the SMF according to an embodiment of the disclosure.
Figure 26:
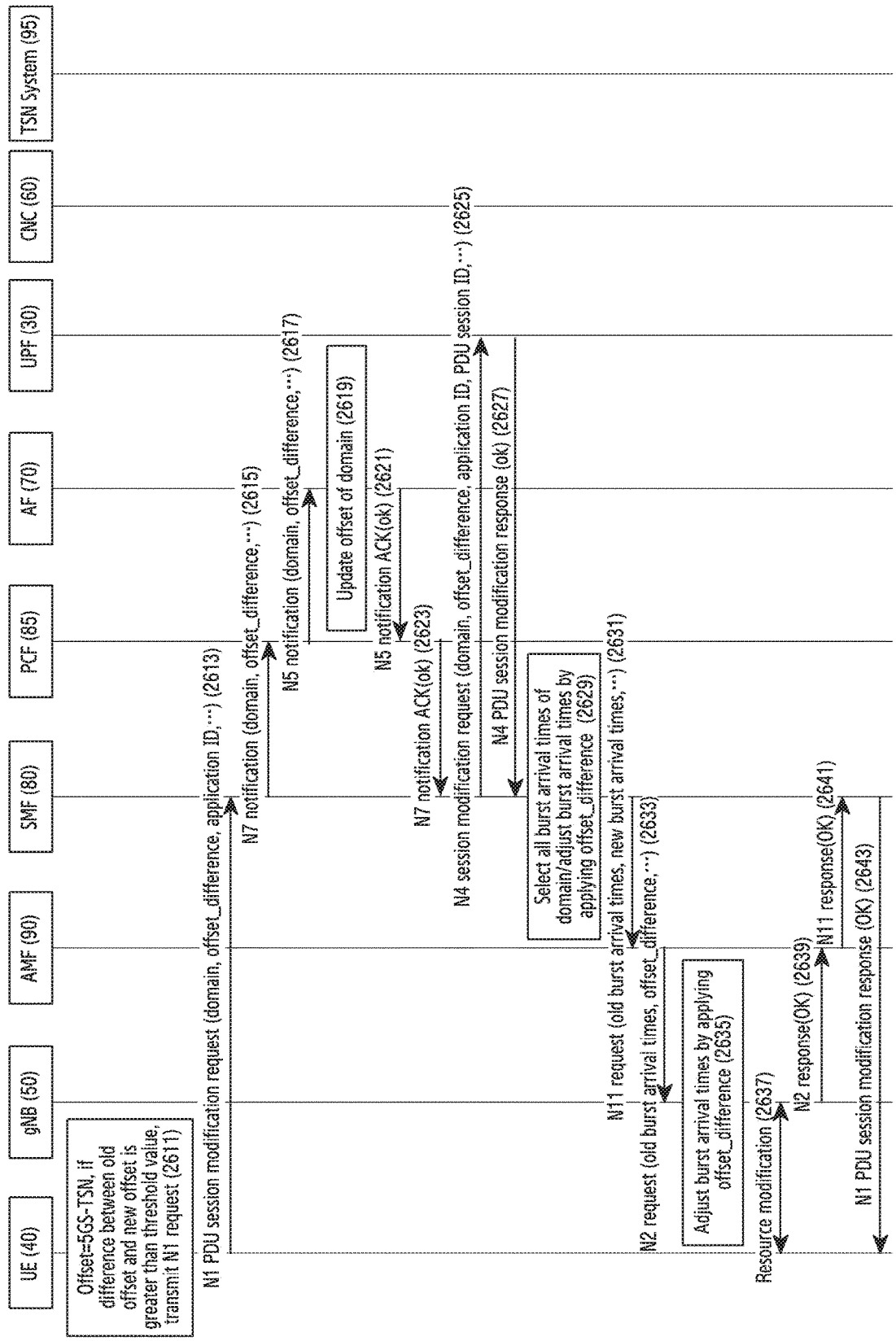
FIG. 26 is a signal flow diagram showing the flow of UE→SMF utilized in a method in which a gNB uses an adjusted burst arrival time and illustrates adjustment performed by the gNB according to an embodiment of the disclosure.

FIG. 24 is a signal flow diagram showing the flow of UE 40→SMF 80 utilized in a method in which the gNB 50 uses an adjusted burst arrival time and illustrates adjustment performed by the UE 40 (operation 2411) according to an embodiment of the disclosure. Operations 2411 to 2441 are shown in FIG. 24. FIG. 25 is a signal flow diagram showing the flow of UE 40→SMF 80 utilized in a method in which the gNB 50 uses an adjusted burst arrival time and illustrates adjustment performed by the SMF 80 (operation 2525) according to an embodiment of the disclosure. Operations 2511 to 2541 are shown in FIG. 25. FIG. 26 is a signal flow diagram showing the flow of UE 40→SMF 80 utilized in a method in which the gNB 50 uses an adjusted burst arrival time and illustrates adjustment performed by the gNB 50 (operation 2635) according to an embodiment of the disclosure. Operations 2611 to 2643 are shown in FIG. 26. The signaling shown in FIGS. 24, 25, and 26, which utilizes the flow of UE 40→SMF 80 in a method in which the gNB 50 uses an adjusted burst arrival time, is only examples for explaining the embodiments of the adjustments performed by the UE 40, SMF 80, and gNB 50 (operations 2411, 2525, and 2635), respectively, and signaling between specific entities is not to be interpreted as limiting the operations of the embodiments to be described in connection with the drawings.

The criterion for triggering information delivery by the UE 40 is identical to that in the other flowcharts described above. The UE 40 selects all the domain-specific streams and uses a stream ID instead as an old burst arrival time in FIG. 24, and the SMF 80 selects all of the domain-specific streams and uses a stream ID instead as an old burst arrival time in FIGS. 25 and 26.

Figure 27:
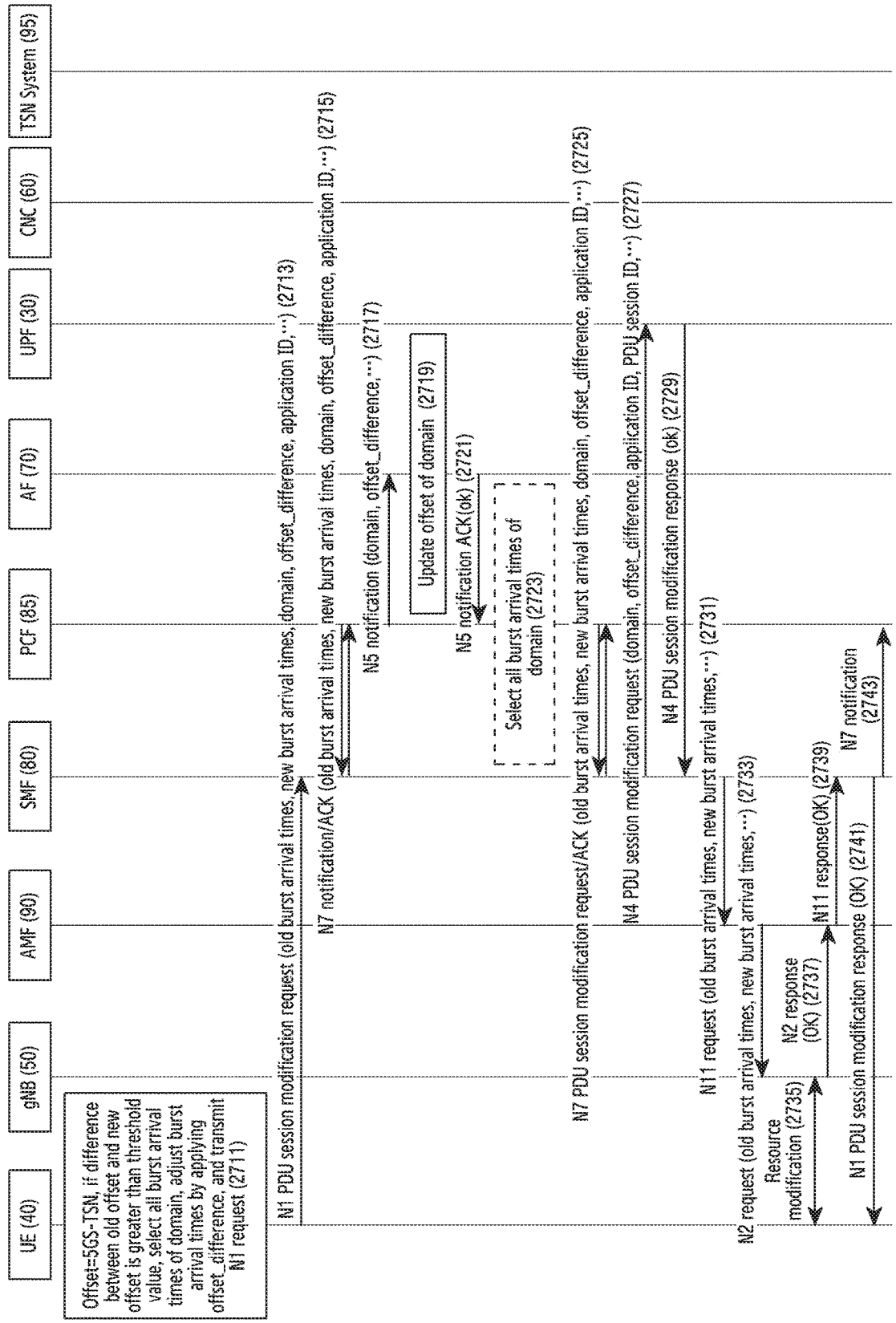
FIG. 27 is a signal flow diagram showing the flow of UE→SMF→PCF utilized in a method in which a gNB uses an adjusted burst arrival time and illustrates adjustment performed by the UE according to an embodiment of the disclosure.
Figure 28:
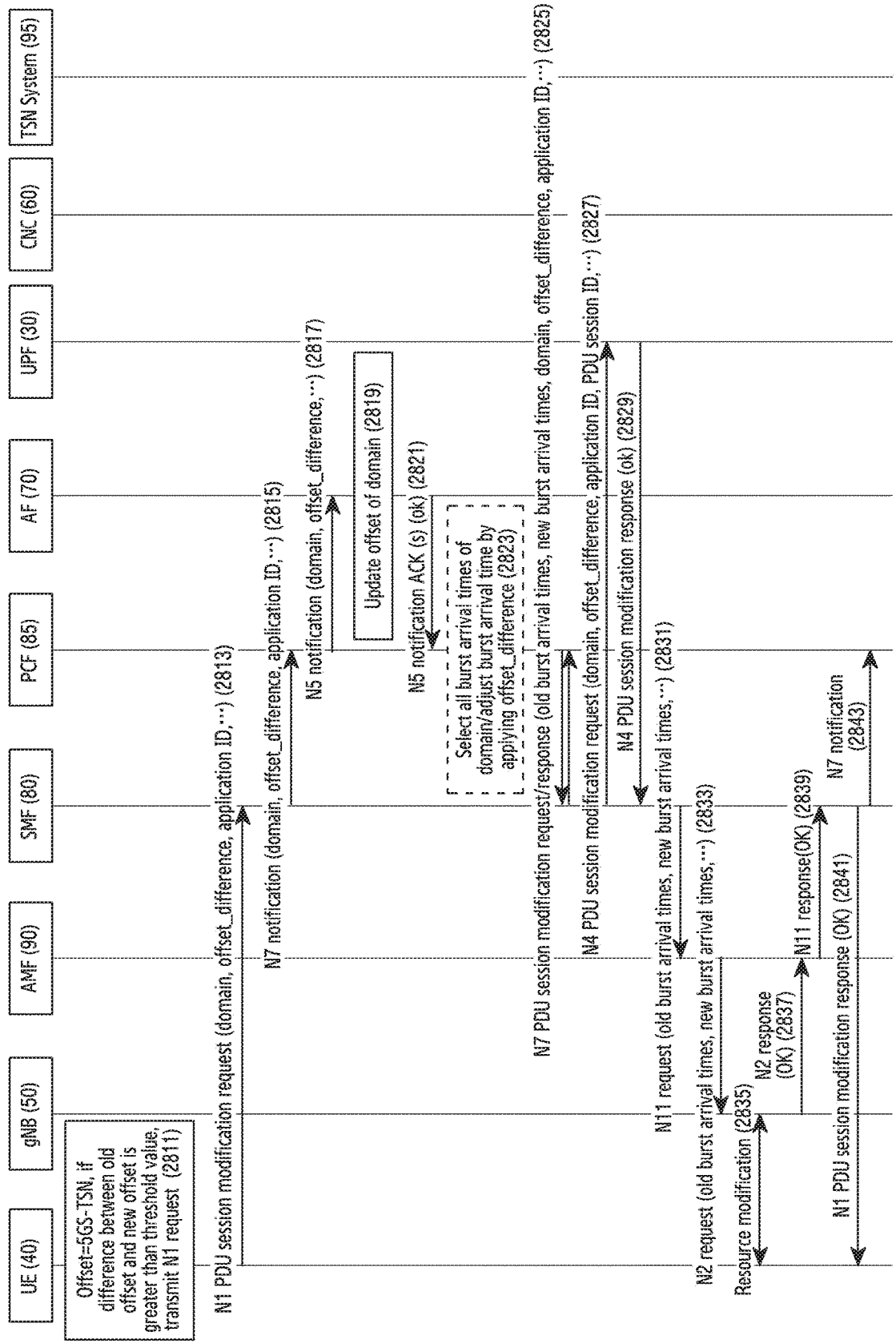
FIG. 28 is a signal flow diagram showing the flow of UE→SMF→PCF utilized in a method in which a gNB uses an adjusted burst arrival time and illustrates adjustment performed by the PCF according to an embodiment of the disclosure.
Figure 29:
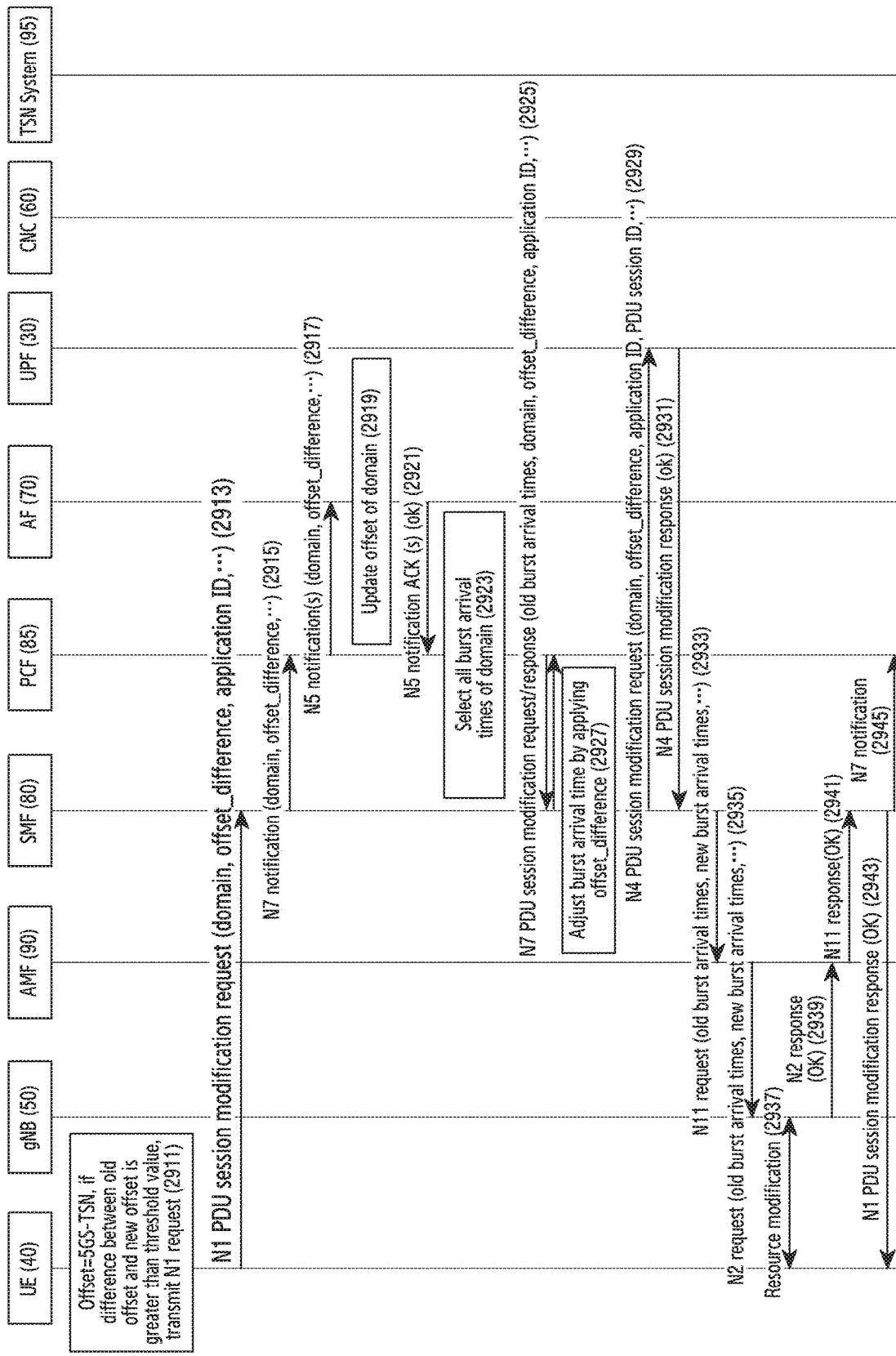
FIG. 29 is a signal flow diagram showing the flow of UE→SMF→PCF utilized in a method in which a gNB uses an adjusted burst arrival time and illustrates adjustment performed by the SMF according to an embodiment of the disclosure.
Figure 30:
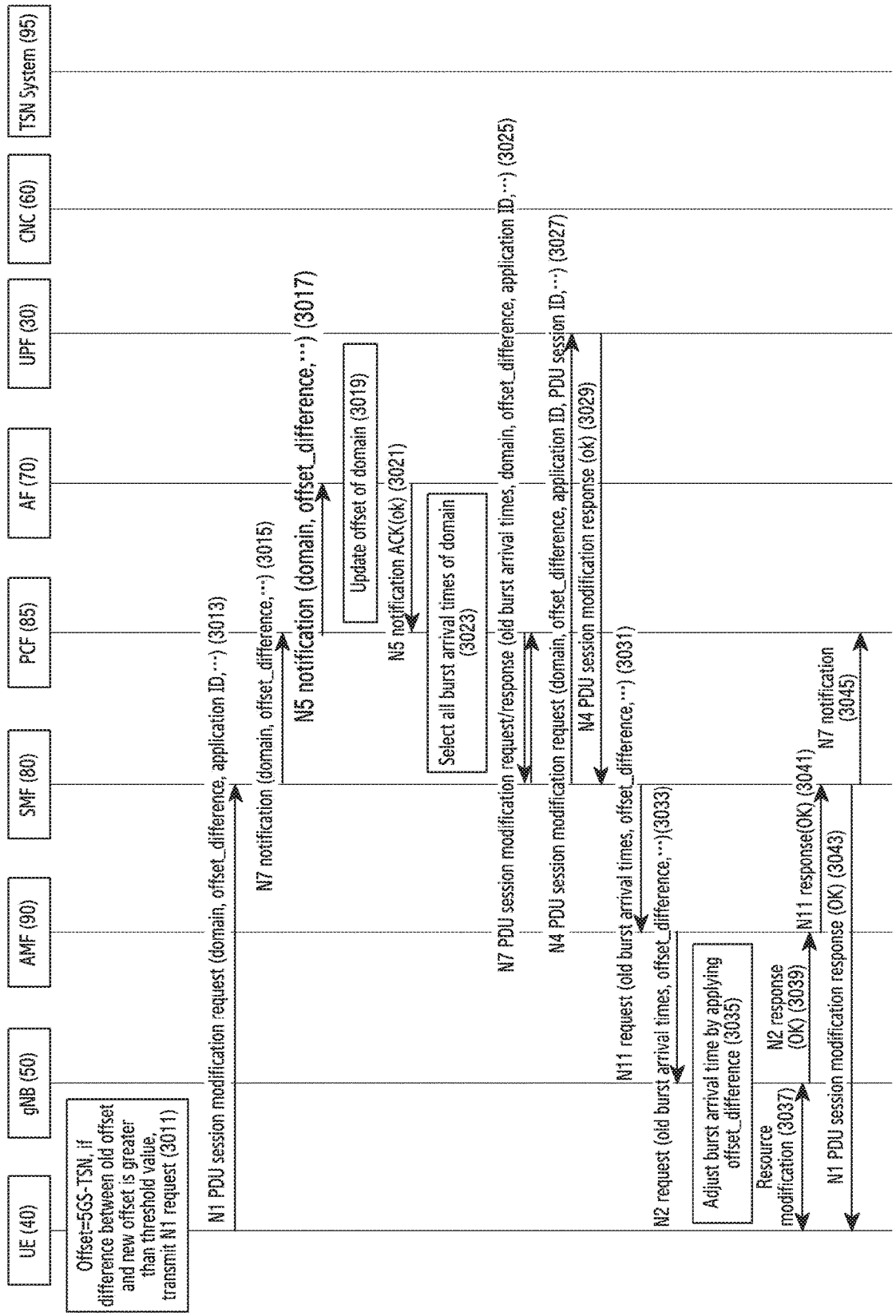
FIG. 30 is a signal flow diagram showing the flow of UE→SMF→PCF utilized in a method in which a gNB uses an adjusted burst arrival time and illustrates adjustment performed by the gNB according to an embodiment of the disclosure.

FIG. 27 is a signal flow diagram showing the flow of UE 40→SMF 80→PCF 85 utilized in a method in which the gNB 50 uses an adjusted burst arrival time and illustrates adjustment performed by the UE 40 according to an embodiment of the disclosure. Operations 2711 to 2743 are shown in FIG. 27. FIG. 28 is a signal flow diagram showing the flow of UE 40→SMF 80→PCF 85 utilized in a method in which the gNB 50 uses an adjusted burst arrival time and illustrates adjustment performed by the PCF 85 according to an embodiment of the disclosure. Operations 2911 to 2945 are shown in FIG. 28. FIG. 29 is a signal flow diagram showing the flow of UE 40→SMF 80→PCF 85 utilized in a method in which the gNB 50 uses an adjusted burst arrival time and illustrates adjustment performed by the SMF 80 according to an embodiment of the disclosure. Operations 2911 to 2945 are shown in FIG. 29. FIG. 30 is a signal flow diagram showing the flow of UE 40→SMF 80→PCF 85 utilized in a method in which the gNB 50 uses an adjusted burst arrival time and illustrates adjustment performed by the gNB 50 according to an embodiment of the disclosure. Operations 3011 to 3045 are shown in FIG. 30. The signaling shown in FIGS. 27, 28, 29, and 30, which utilizes the flow of UE 40→SMF 80→PCF 85 in a method in which the gNB 50 uses an adjusted burst arrival time, is only examples for explaining the embodiments of the adjustments performed by the UE 40, PCF 85, SMF 80, and gNB 50, respectively, and signaling between specific entities is not to be interpreted as limiting the operations of the embodiments to be described in connection with the drawings. The SMF 80 determines PDU session modification in FIGS. 24, 25, and 26, but the PCF 85 determines PDU session modification in FIGS. 27, 28, 29, and 30. The UE 40 selects all of the domain-specific streams and uses a stream ID instead as an old burst arrival time in FIG. 27, and the PCF 85 selects all the domain-specific streams and uses a stream ID instead as an old burst arrival time in FIGS. 28, 29, and 30.

Figure 31:
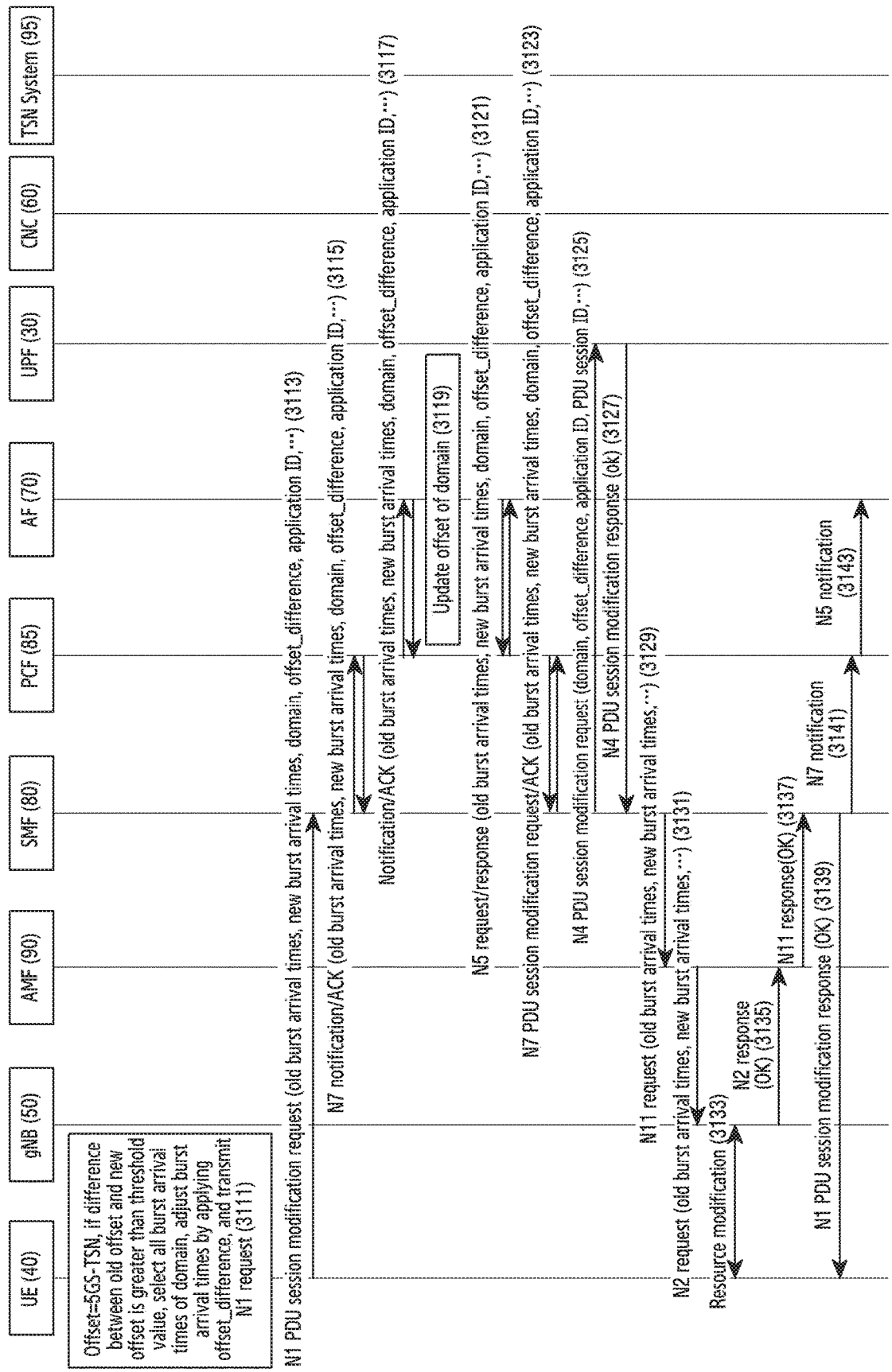
FIG. 31 is a signal flow diagram showing the flow of UE→SMF→PCF→AF utilized in a method in which a gNB uses an adjusted burst arrival time and illustrates adjustment performed by the UE according to an embodiment of the disclosure.
Figure 32:
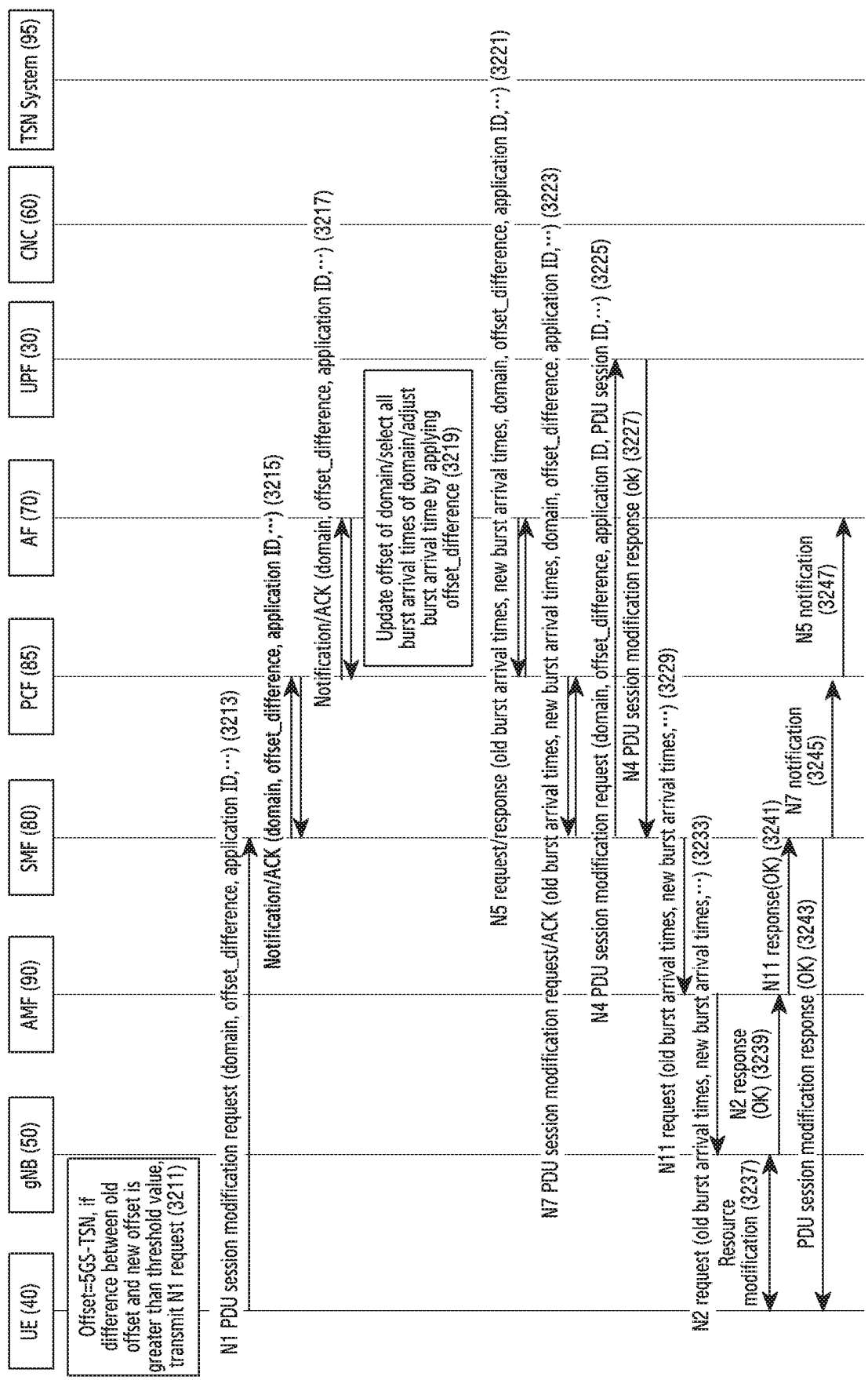
FIG. 32 is a signal flow diagram showing the flow of UE→SMF→PCF→AF utilized in a method in which a gNB uses an adjusted burst arrival time and illustrates adjustment performed by the AF according to an embodiment of the disclosure.
Figure 33:
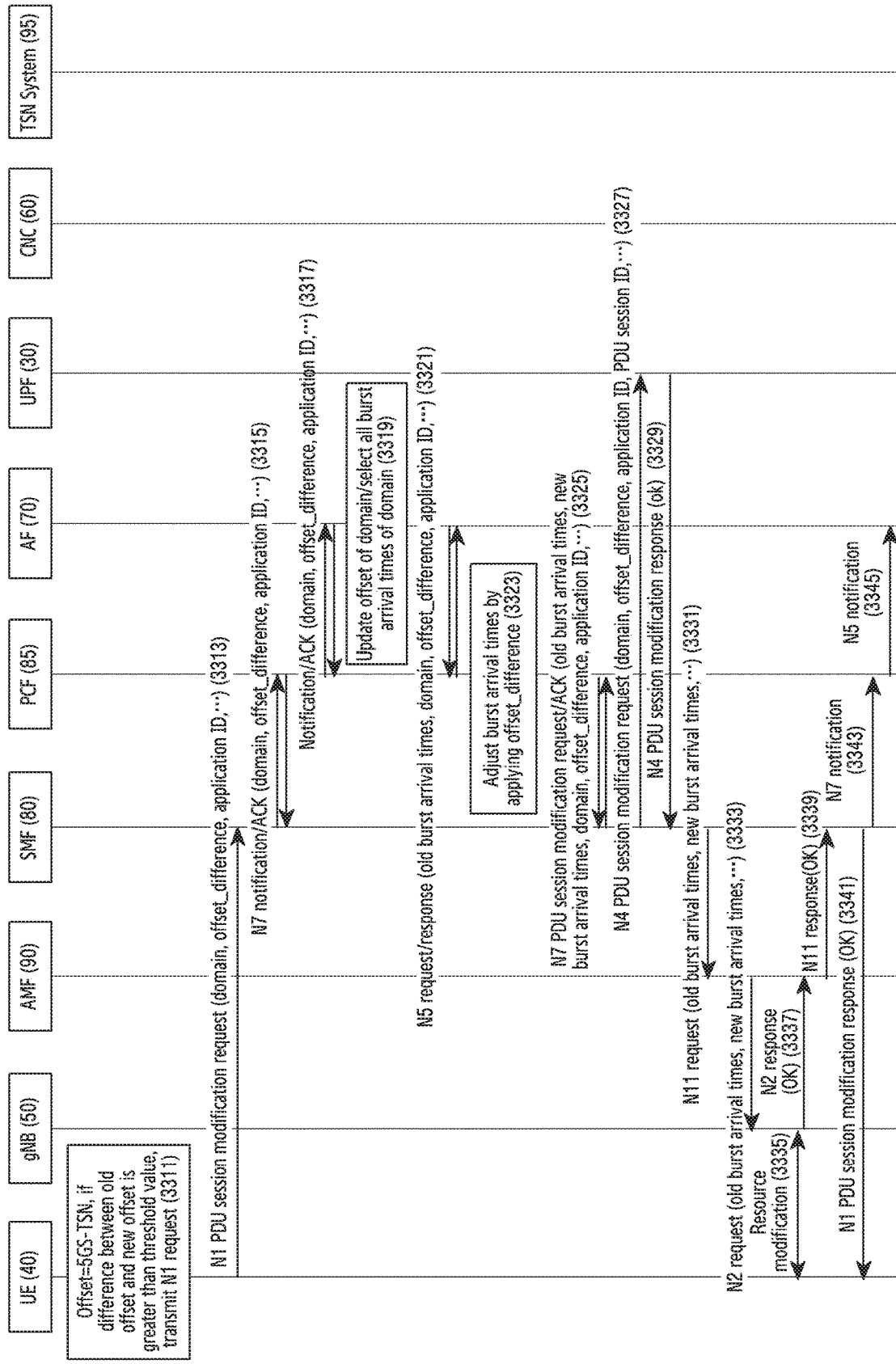
FIG. 33 is a signal flow diagram showing the flow of UE→SMF→PCF→AF utilized in a method in which a gNB uses an adjusted burst arrival time and illustrates adjustment performed by the PCF according to an embodiment of the disclosure.
Figure 34:
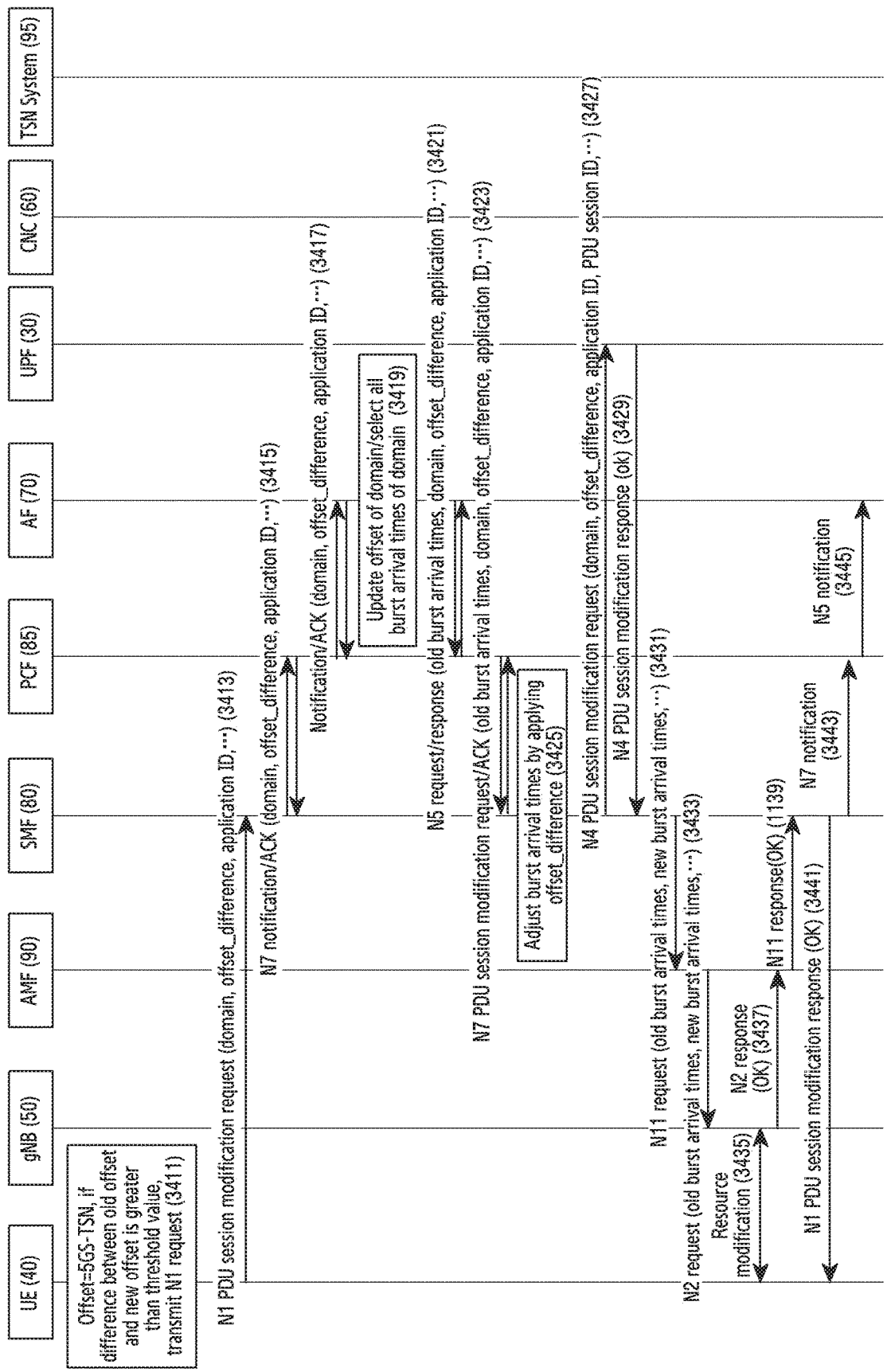
FIG. 34 is a signal flow diagram showing the flow of UE→SMF→PCF→AF utilized in a method in which a gNB uses an adjusted burst arrival time and illustrates adjustment performed by the SMF according to an embodiment of the disclosure.
Figure 35:
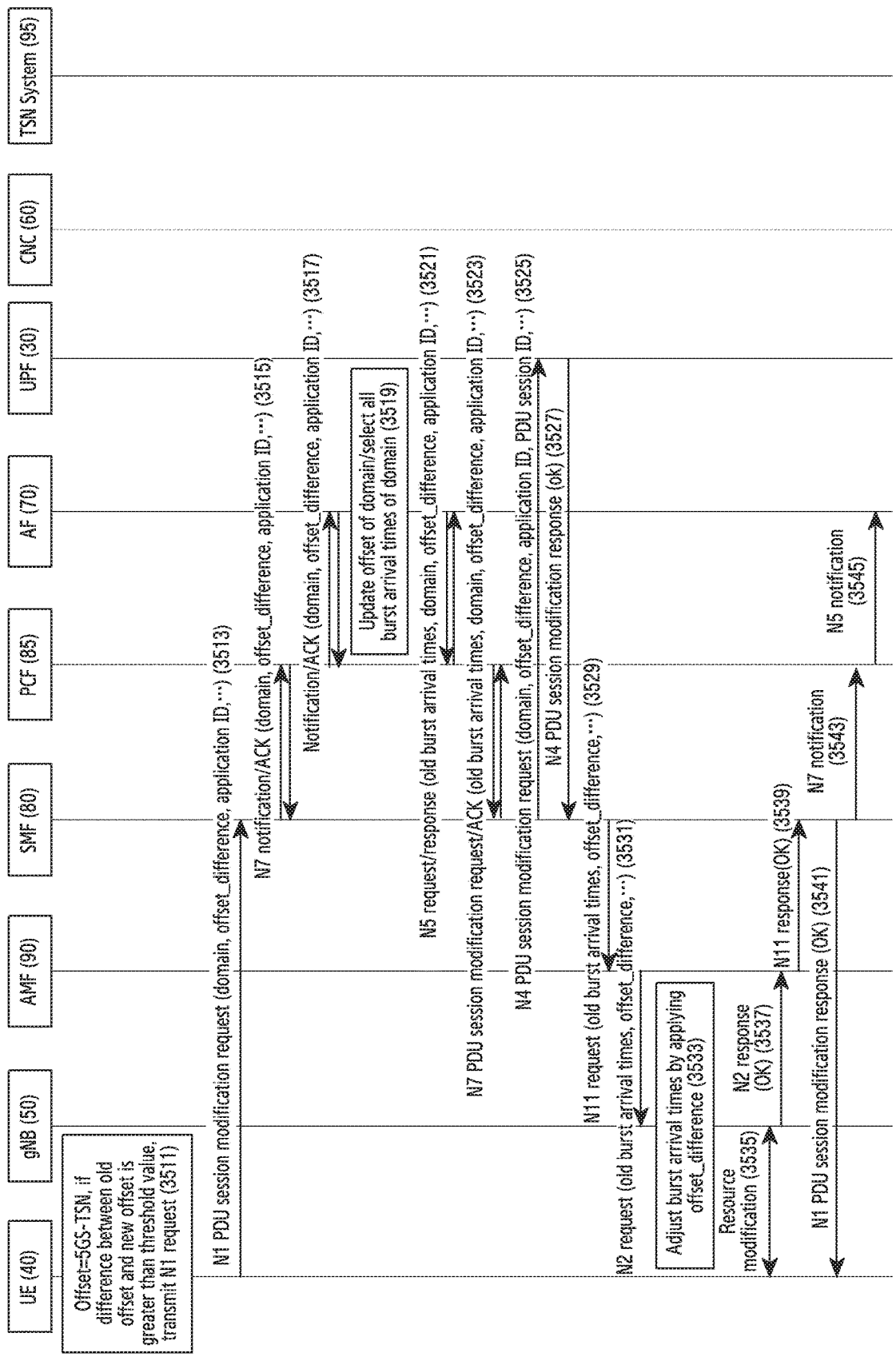
FIG. 35 is a signal flow diagram showing the flow of UE→SMF→PCF→AF utilized in a method in which a gNB uses an adjusted burst arrival time and illustrates adjustment performed by the gNB according to an embodiment of the disclosure.

FIG. 31 is a signal flow diagram showing the flow of UE 40→SMF 80→PCF 85→AF 70 utilized in a method in which the gNB 50 uses an adjusted burst arrival time and illustrates adjustment performed by the UE 40 according to an embodiment of the disclosure. Operations 3111 to 3143 are shown in FIG. 31. FIG. 32 is a signal flow diagram showing the flow of UE 40→SMF 80→PCF 85→AF 70 utilized in a method in which the gNB 50 uses an adjusted burst arrival time and illustrates adjustment performed by the AF 70 according to an embodiment of the disclosure. Operations 3211 to 3247 are shown in FIG. 32. FIG. 33 is a signal flow diagram showing the flow of UE 40→SMF 80→PCF 85→AF 70 utilized in a method in which the gNB 50 uses an adjusted burst arrival time and illustrates adjustment performed by the PCF 85. Operations 3311 to 3345 are shown in FIG. 33. FIG. 34 is a signal flow diagram showing the flow of UE 40→SMF 80→PCF 85→AF 70 utilized in a method in which the gNB 50 uses an adjusted burst arrival time and illustrates adjustment performed by the SMF 80 according to an embodiment of the disclosure. Operations 3411 to 3445 are shown in FIG. 34. FIG. 35 is a signal flow diagram showing the flow of UE 40→SMF 80→PCF 85→AF 70 utilized in a method in which the gNB 50 uses an adjusted burst arrival time and illustrates adjustment performed by the gNB 50 according to an embodiment of the disclosure. Operations 3511 to 3545 are shown in FIG. 35.

The signaling shown in FIGS. 31, 32, 33, 34, and 35, which utilizes the flow of UE 40→SMF 80→PCF 85→AF 70 in a method in which the gNB 50 uses an adjusted burst arrival time, is only examples for explaining the embodiments of the adjustments performed by the UE 40, AF 70, PCF 85, SMF 80, and gNB 50, respectively, and signaling between specific entities is not interpreted as limiting the operations of the embodiments to be described in connection with the drawings. The SMF 80 determines PDU session modification in FIGS. 24, 25, and 26, the PCF 85 determines PDU session modification in FIGS. 27, 28, 29, and 30, but the AF 70 determines PDU session modification in FIGS. 31, 32, 33, 34, and 35. The UE 40 selects all of the domain-specific streams and uses a stream ID instead as an old burst arrival time in FIG. 31, and the AF 70 selects all of the domain-specific streams and uses a stream ID instead as an old burst arrival time in FIGS. 32, 33, 34, and 35.

Figure 36:
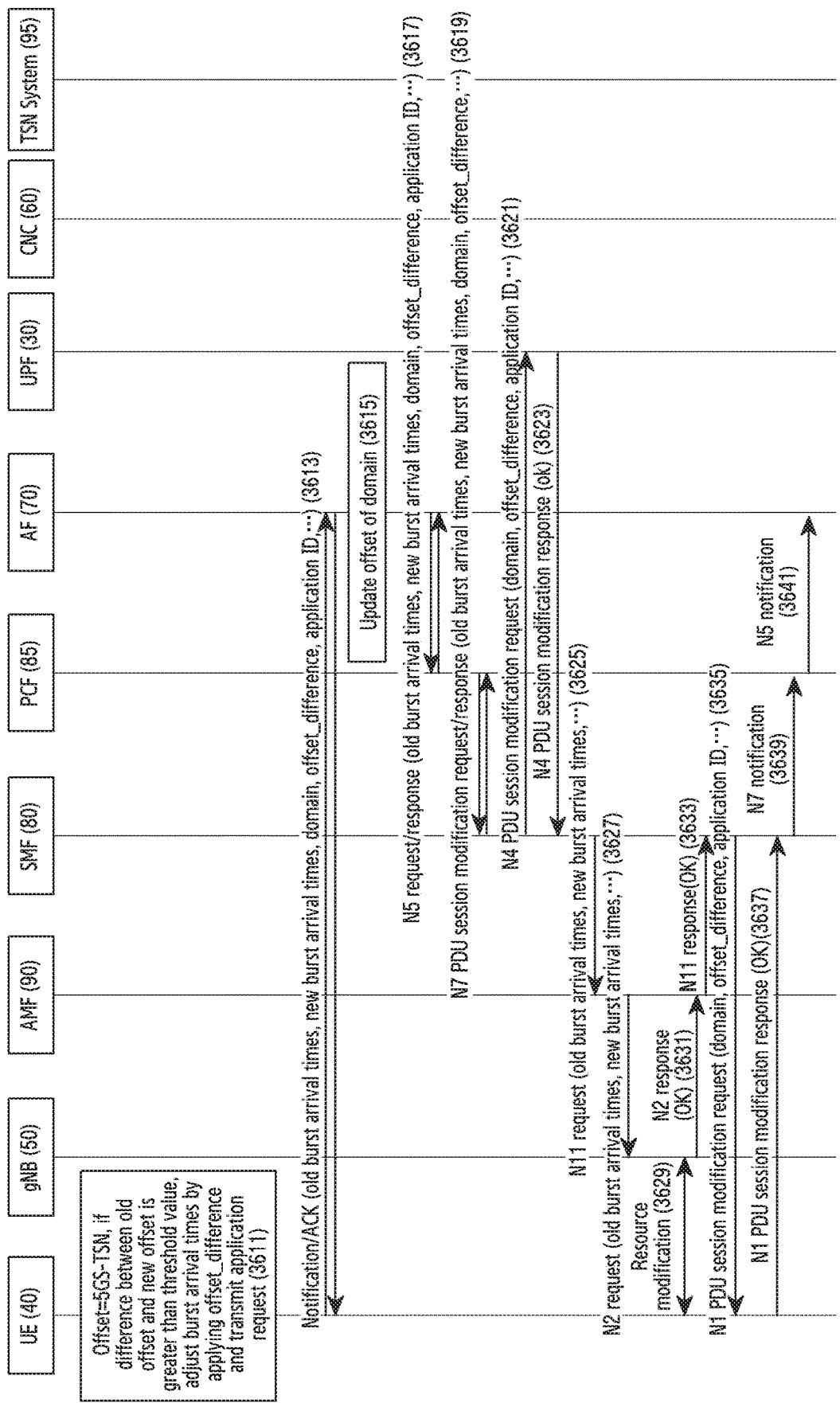
FIG. 36 is a signal flow diagram showing the flow of UE→AF utilized in a method in which a gNB uses an adjusted burst arrival time and illustrates showing adjustment performed by the UE according to an embodiment of the disclosure.
Figure 37:
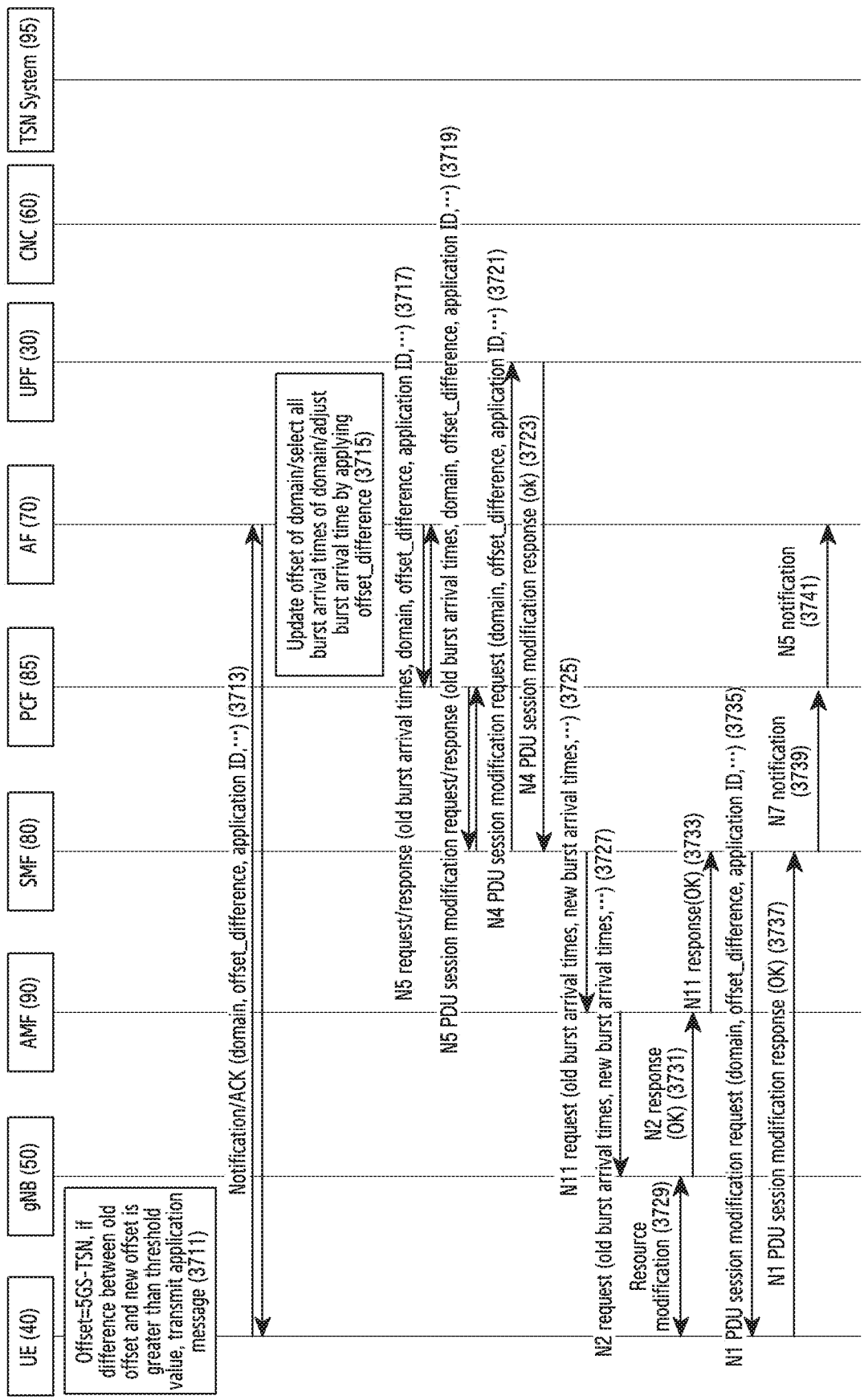
FIG. 37 is a signal flow diagram showing the flow of UE→AF utilized in a method in which a gNB uses an adjusted burst arrival time and illustrates adjustment performed by the AF according to an embodiment of the disclosure.
Figure 38:
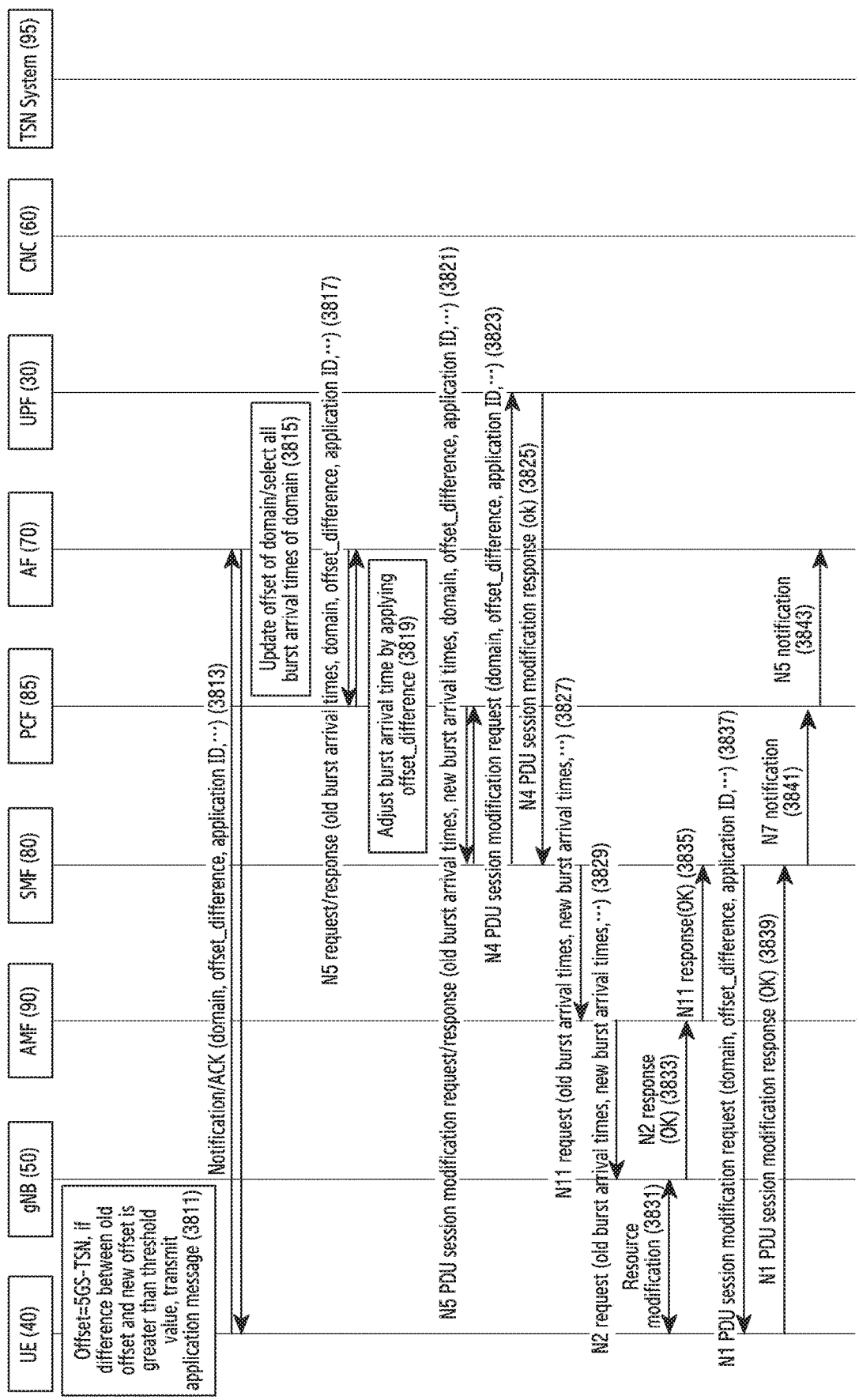
FIG. 38 is a signal flow diagram showing the flow of UE→AF utilized in a method in which a gNB uses an adjusted burst arrival time and illustrates adjustment performed by a PCF, according to an embodiment of the disclosure.
Figure 39:
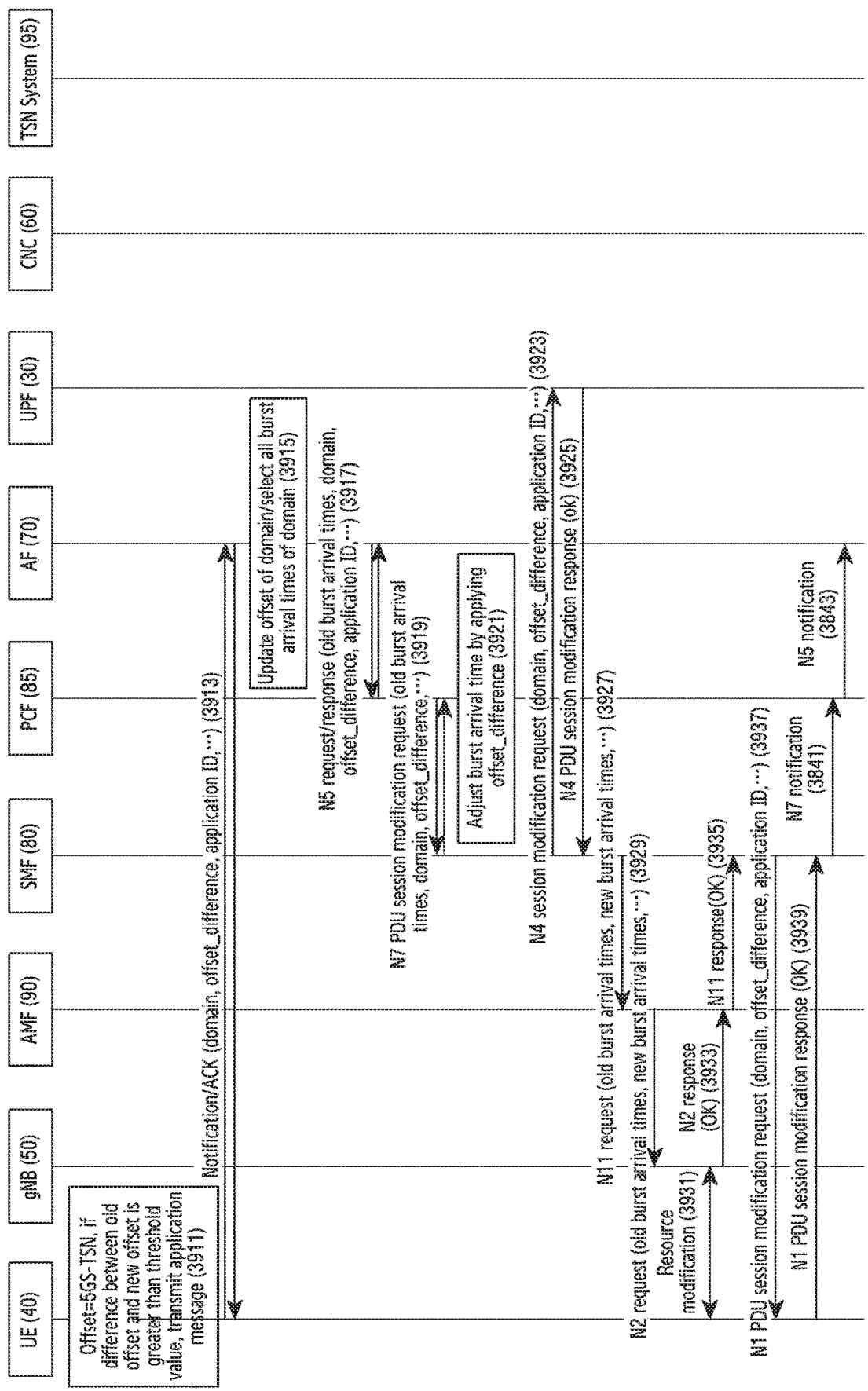
FIG. 39 is a signal flow diagram showing the flow of UE→AF utilized in a method in which a gNB uses an adjusted burst arrival time and illustrates adjustment performed by an SMF according to an embodiment of the disclosure.
Figure 40:
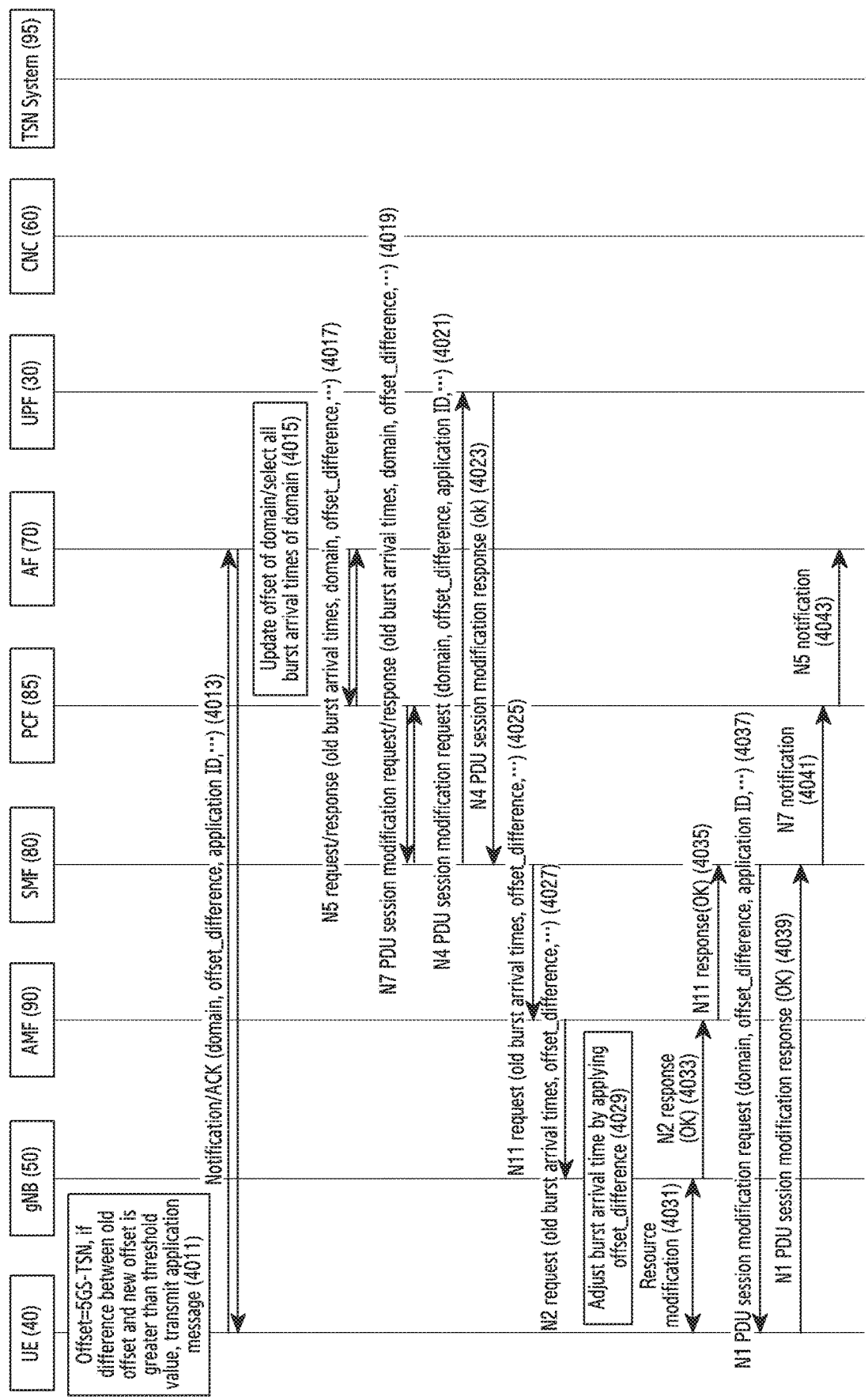
FIG. 40 is a signal flow diagram showing the flow of UE→AF utilized in a method in which a gNB uses an adjusted burst arrival time and illustrates adjustment performed by the gNB according to an embodiment of the disclosure.

FIG. 36 is a signal flow diagram showing the flow of UE 40→AF 70 utilized in a method in which the gNB 50 uses an adjusted burst arrival time and illustrates showing adjustment performed by the UE 40 according to an embodiment of the disclosure. Operations 3611 to 3641 are shown in FIG. 36. FIG. 37 is a signal flow diagram showing the flow of UE 40→AF 70 utilized in a method in which the gNB 50 uses an adjusted burst arrival time and illustrates adjustment performed by the AF 70 according to an embodiment of the disclosure. Operations 3711 to 3741 are shown in FIG. 37. FIG. 38 is a signal flow diagram showing the flow of UE 40→AF 70 utilized in a method in which the gNB 50 uses an adjusted burst arrival time and illustrates adjustment performed by a PCF 85 according to an embodiment of the disclosure. Operations 3811 to 3843 are shown in FIG. 38. FIG. 39 is a signal flow diagram showing the flow of UE 40→AF 70 utilized in a method in which the gNB 50 uses an adjusted burst arrival time and illustrates adjustment performed by an SMF 80 according to an embodiment of the disclosure. Operations 3911 to 3943 are shown in FIG. 39. FIG. 40 is a signal flow diagram showing the flow of UE 40→AF 70 utilized in a method in which the gNB 50 uses an adjusted burst arrival time and illustrates adjustment performed by the gNB 50 according to an embodiment of the disclosure. Operations 4011 to 4043 are shown in FIG. 40.

The signaling shown in FIGS. 36, 37, 38, 39, and 40, which utilizes the flow of UE 40→AF 70 in a method in which the gNB 50 uses an adjusted burst arrival time, is only examples for explaining the embodiments of the adjustments performed by the UE 40, AF 70, PCF 85, SMF 80, and gNB 50, respectively, and signaling between specific entities is not interpreted as limiting the operations of the embodiments to be described in connection with the drawings. While the UE 40 delivers information to the AF 70 using an application-level message in FIGS. 36, 37, 38, 39, and 40, information delivered by the UE 40 to the SMF 80 via an NAS message is delivered to the AF 70 via the PCF 85 using a notification function in FIGS. 31, 32, 33, 34, and 35.

Figure 41:
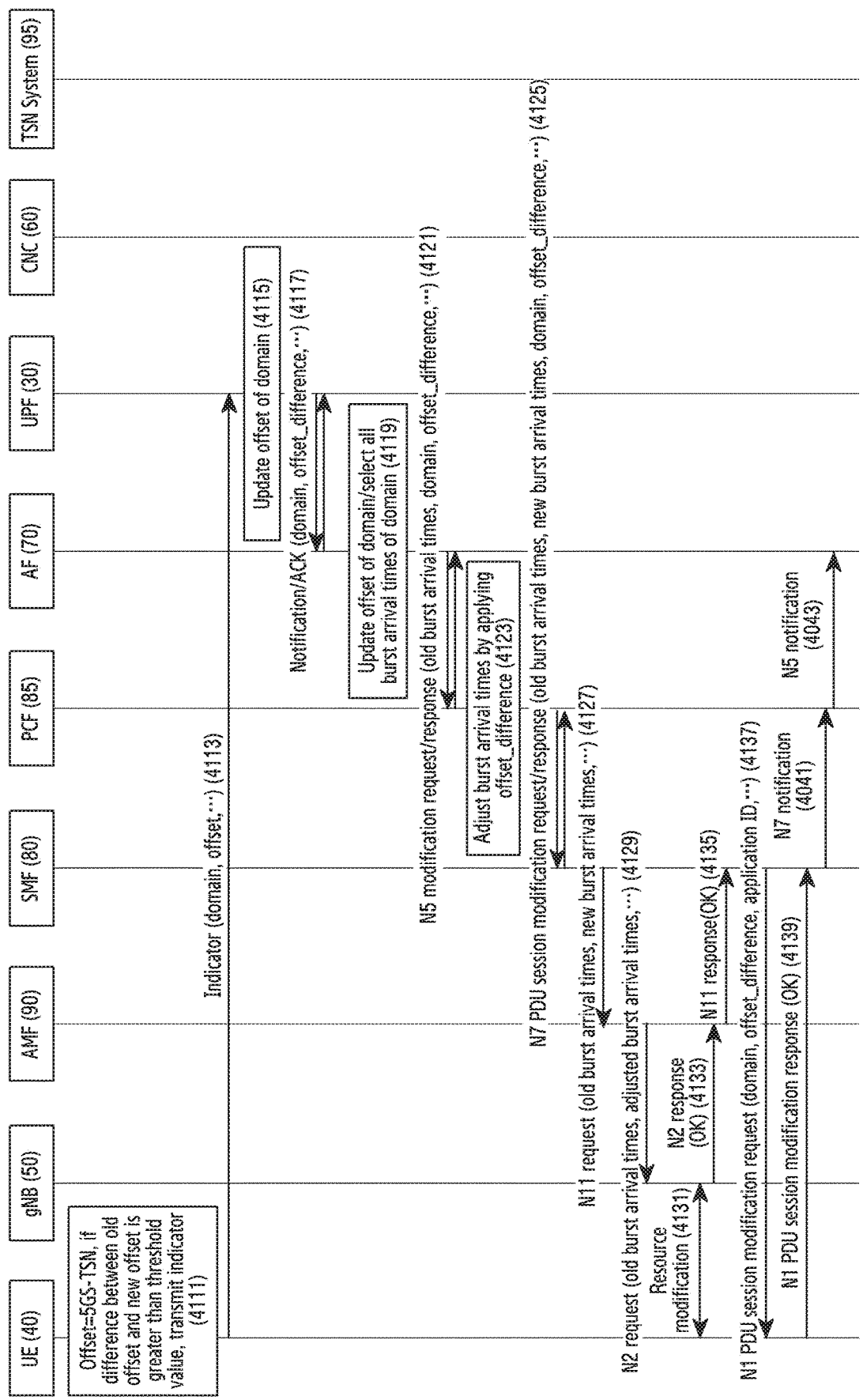
FIG. 41 is a signal flow diagram showing the flow of UE→UPF utilized in a method in which a gNB uses an adjusted burst arrival time according to an embodiment of the disclosure.

FIG. 41 is a signal flow diagram showing the flow of UE 40→UPF 30, utilized in a method in which the gNB 50 uses an adjusted burst arrival time according to an embodiment of the disclosure. Operations 4111 to 4143 are shown in FIG. 41. The signaling in FIG. 41 is only an example for explaining an embodiment utilizing the flow of UE 40→UPF 30 in a method in which an adjusted burst arrival time is used, and signaling between specific entities is not to be interpreted as limiting the operation of the embodiments to be described in connection with the drawings. Adjustment represents the case in which the flow of UPF 30→AF 70 among various subsequent flows from the UPF 30 is combined, and the adjustment is performed by the PCF 85 (operation 4123). Reference may be made to FIGS. 42 to 54 in connection with other processes of delivering information from the UPF 30.

Figure 42:
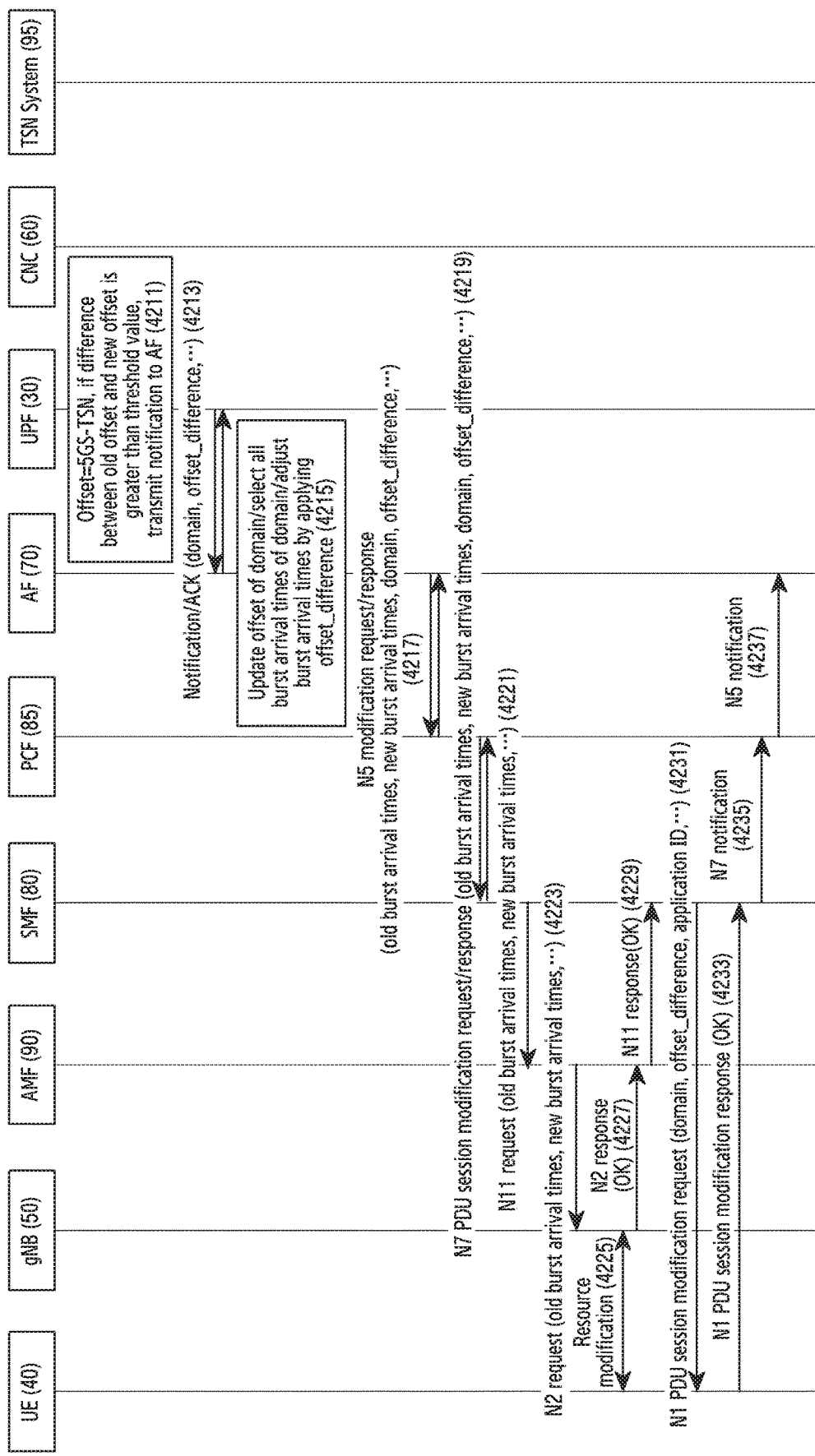
FIG. 42 is a signal flow diagram showing the flow of UPF→AF utilized in a method in which a gNB uses an adjusted burst arrival time and illustrates adjustment performed by the AF according to an embodiment of the disclosure.
Figure 43:
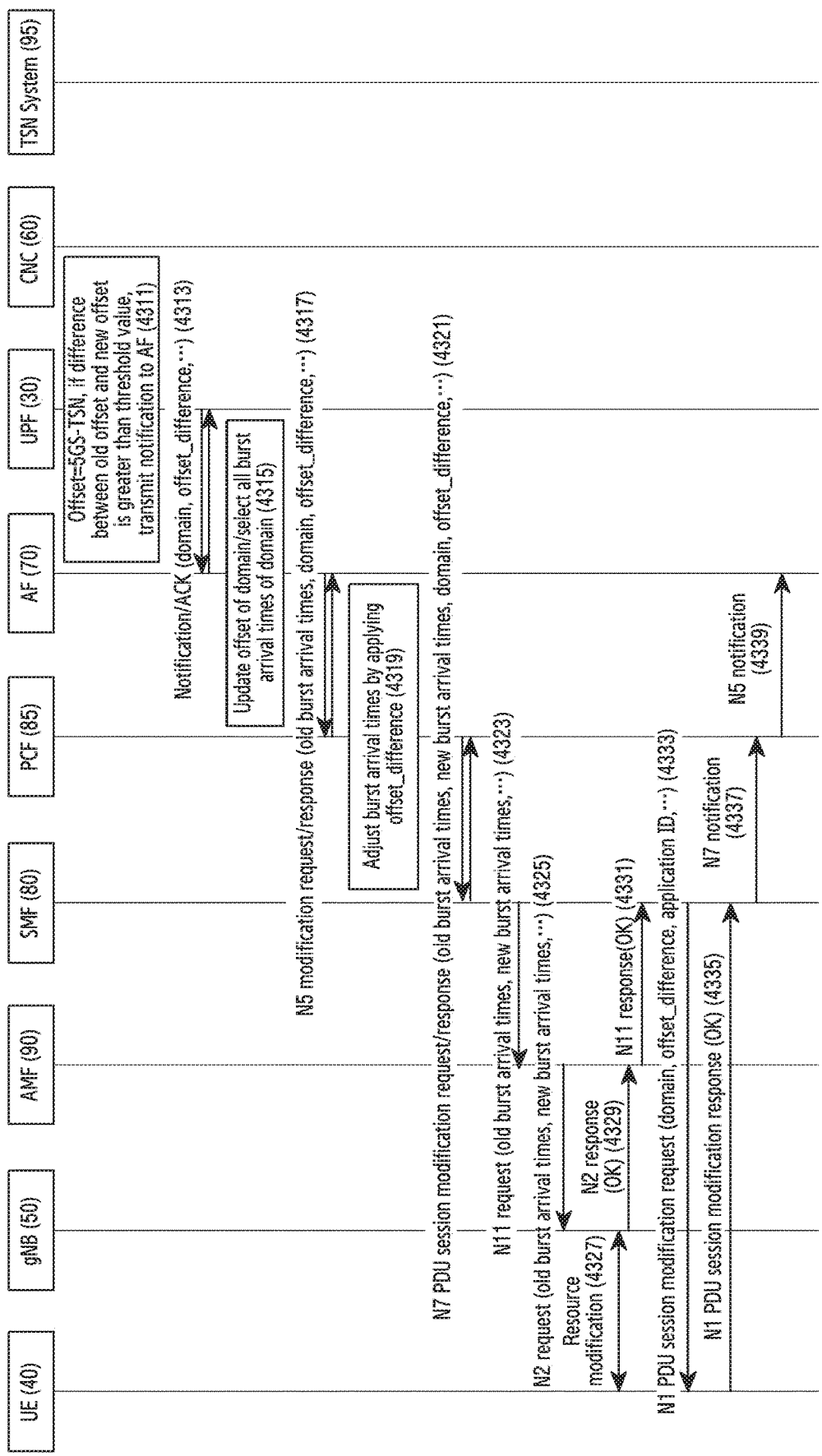
FIG. 43 is a signal flow diagram showing the flow of UPF→AF utilized in a method in which a gNB uses an adjusted burst arrival time and illustrates adjustment performed by a PCF according to an embodiment of the disclosure.
Figure 44:
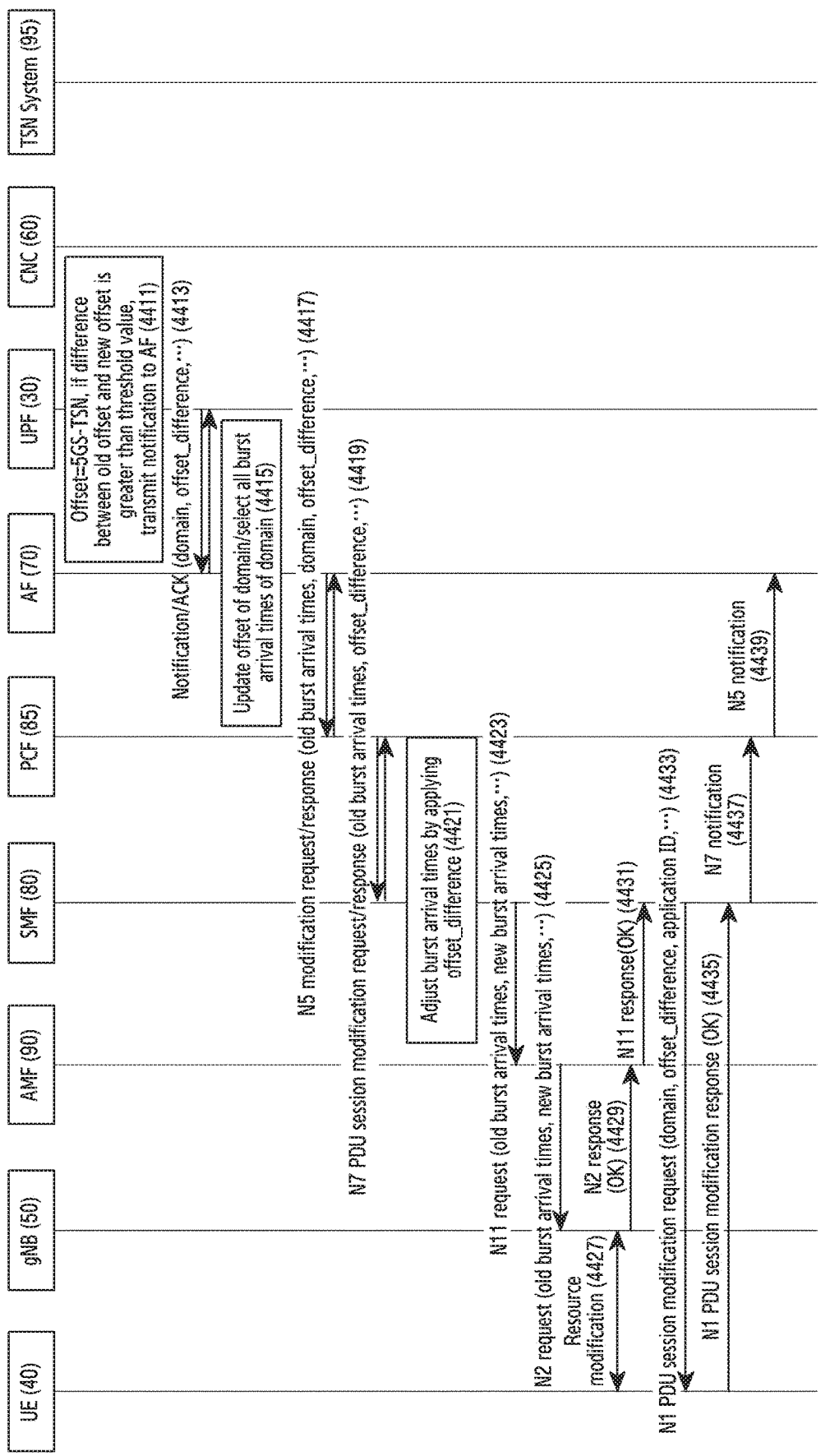
FIG. 44 is a signal flow diagram showing the flow of UPF→AF utilized in a method in which a gNB uses an adjusted burst arrival time and illustrates adjustment performed by an SMF according to an embodiment of the disclosure.
Figure 45:
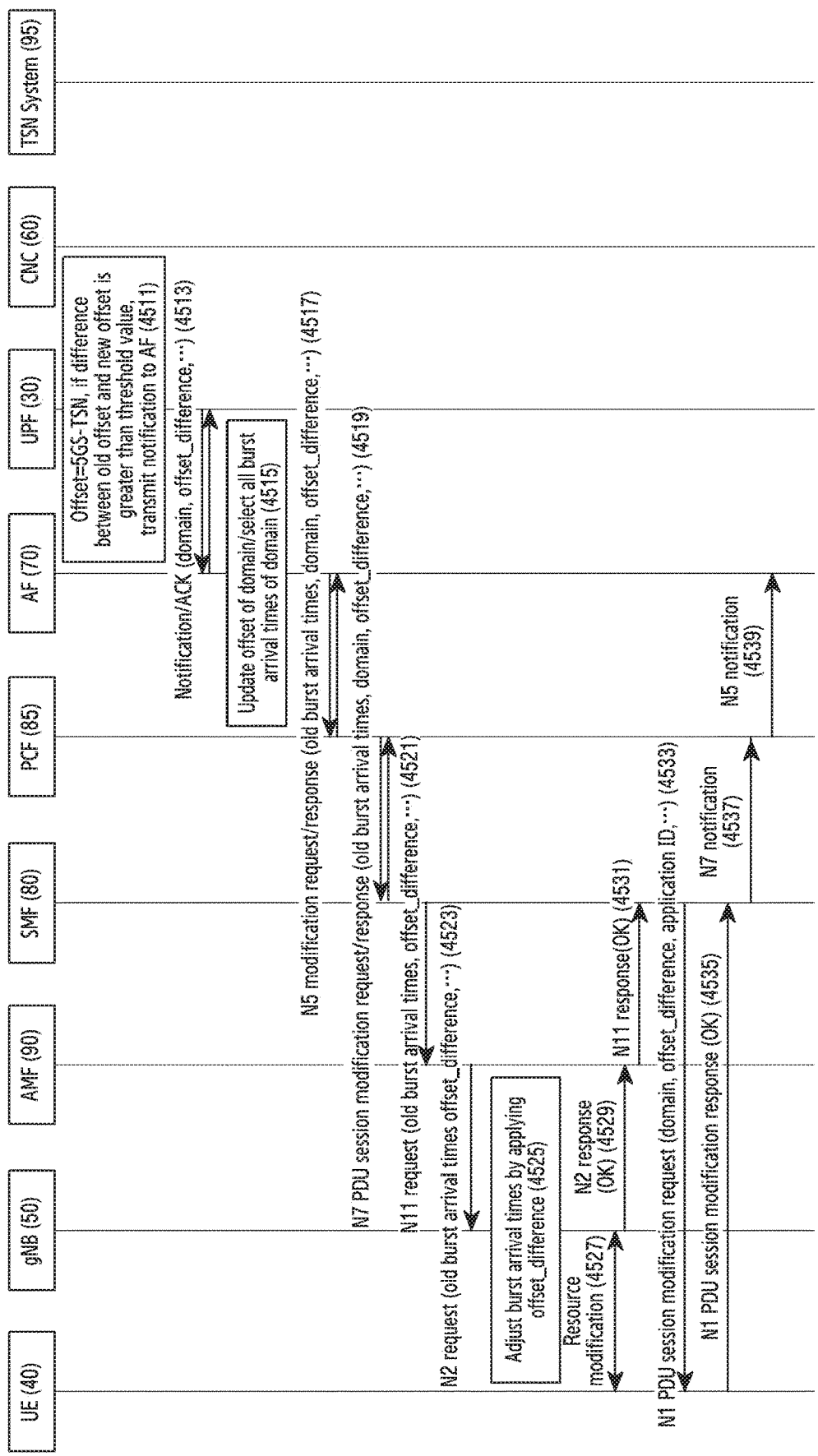
FIG. 45 is a signal flow diagram showing the flow of UPF→AF utilized in a method in which a gNB uses an adjusted burst arrival time and illustrates adjustment performed by the gNB according to an embodiment of the disclosure.

FIG. 42 is a signal flow diagram showing the flow of UPF 30→AF 70 utilized in a method in which the gNB 50 uses an adjusted burst arrival time and illustrates adjustment performed by the AF 70 according to an embodiment of the disclosure. Operations 4211 to 4237 are shown in FIG. 42. FIG. 43 is a signal flow diagram showing the flow of UPF 30→AF 70 utilized in a method in which the gNB 50 uses an adjusted burst arrival time and illustrates adjustment performed by the PCF 85 according to an embodiment of the disclosure. Operations 4311 to 4339 are shown in FIG. 43. FIG. 44 is a signal flow diagram showing the flow of UPF 30→AF 70 utilized in a method in which the gNB 50 uses an adjusted burst arrival time and illustrates adjustment performed by an SMF 80 according to an embodiment of the disclosure. Operations 4411 to 4439 are shown in FIG. 44. FIG. 45 is a signal flow diagram showing the flow of UPF 30→AF 70 utilized in a method in which the gNB 50 uses an adjusted burst arrival time and illustrates adjustment performed by the gNB 50 according to an embodiment of the disclosure. Operations 4511 to 4539 are shown in FIG. 45.

The signaling shown in FIGS. 42, 43, 44, and 45, which utilizes the flow of UPF 30→AF 70 in a method in which the gNB 50 uses an adjusted burst arrival time, is only examples for explaining the embodiments of the adjustments performed by the AF 70, PCF 85, SMF 80, and gNB 50, respectively, and signaling between specific entities is not to be interpreted as limiting the operations of the embodiments to be described in connection with the drawings. The criterion for triggering information delivery is the same as in FIGS. 14 to 18. After adjustment is performed, an old burst arrival time is used as a stream ID.

Figure 46:
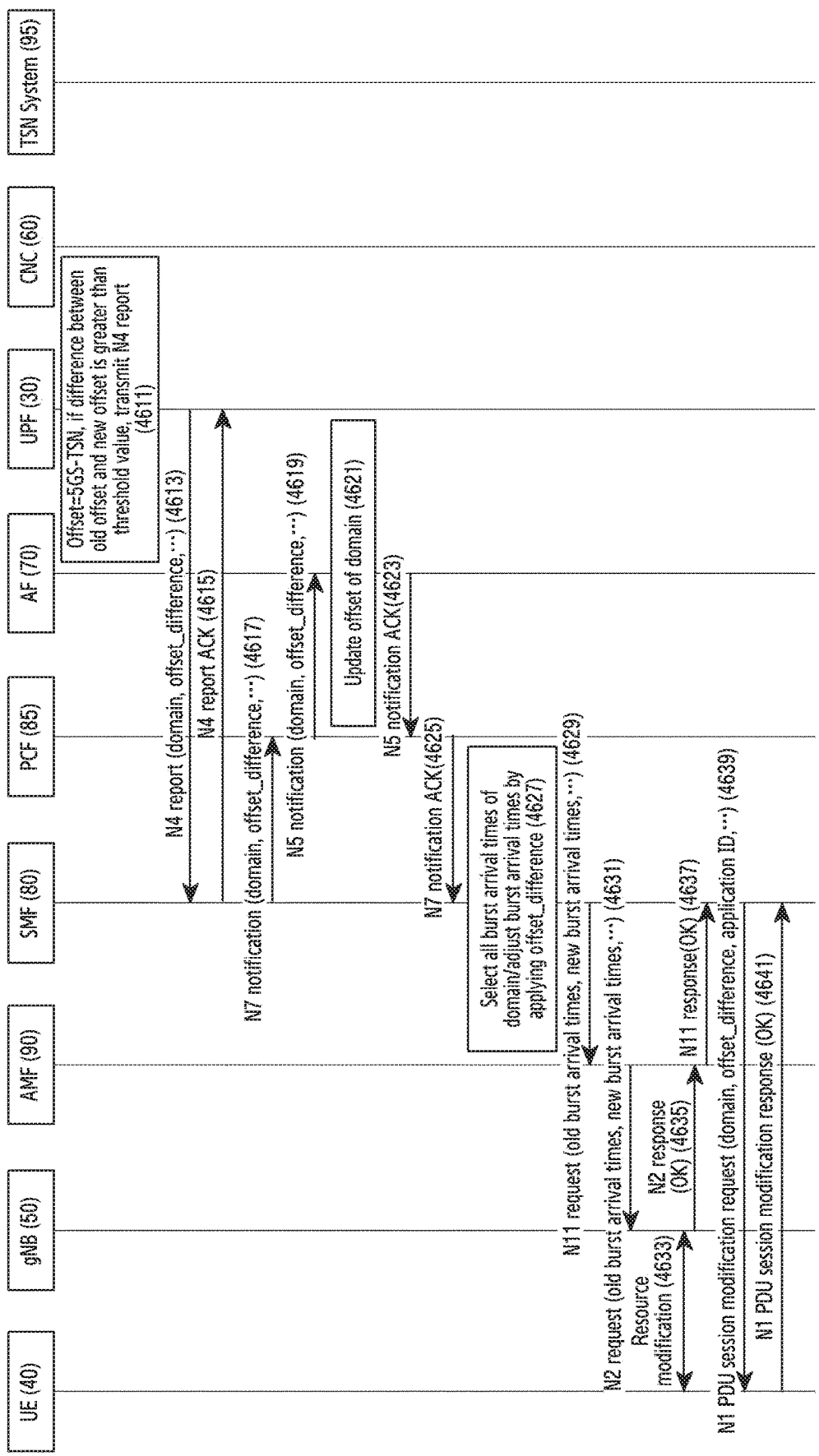
FIG. 46 is a signal flow diagram showing the flow of UPF→SMF utilized in a method in which a gNB uses an adjusted burst arrival time and illustrates adjustment performed by the SMF according to an embodiment of the disclosure.
Figure 47:
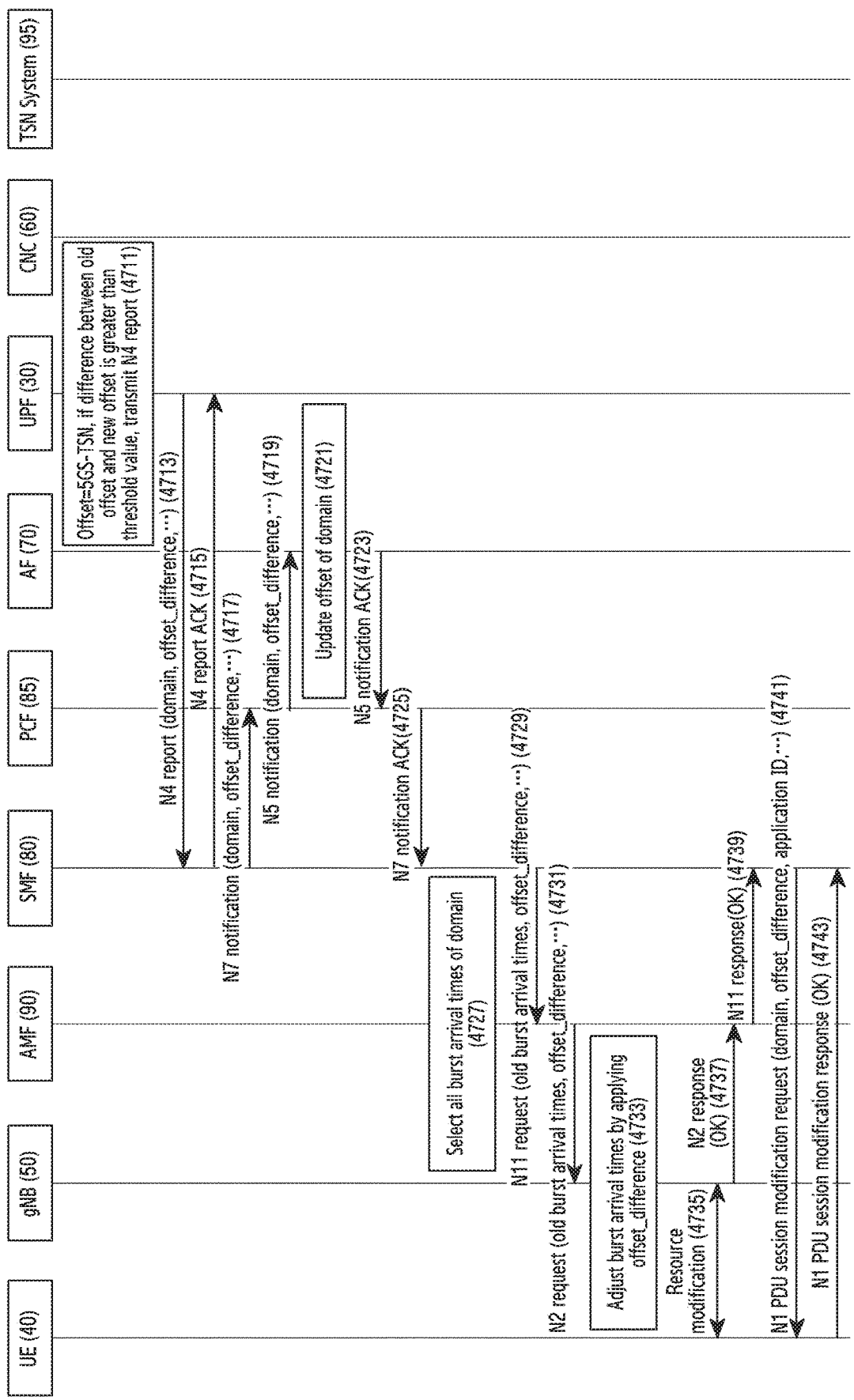
FIG. 47 is a signal flow diagram showing the flow of UPF→SMF utilized in a method in which a gNB uses an adjusted burst arrival time and illustrates adjustment performed by the gNB according to an embodiment of the disclosure.

FIG. 46 is a signal flow diagram showing the flow of UPF 30→SMF 80 utilized in a method in which the gNB 50 uses an adjusted burst arrival time and illustrates adjustment performed by the SMF 80 according to an embodiment of the disclosure. Operations 4611 to 4641 are shown in FIG. 46. FIG. 47 is a signal flow diagram showing the flow of UPF 30→SMF 80 utilized in a method in which the gNB 50 uses an adjusted burst arrival time and illustrates adjustment performed by the gNB 50 according to an embodiment of the disclosure. Operations 4711 to 4743 are shown in FIG. 47.

The signaling shown in FIGS. 46, and 47, which utilizes the flow of UPF 30→SMF 80 in a method in which the gNB 50 uses an adjusted burst arrival time, is only an example for explaining the embodiment of the adjustment performed by the SMF 80 or gNB 50, and signaling between specific entities is not to be interpreted as limiting the operation of the embodiment to be described in connection with the drawings. The criterion for triggering information delivery is the same as in FIGS. 14 to 18. After adjustment is performed, an old burst arrival time is used as a stream ID.

Figure 48:
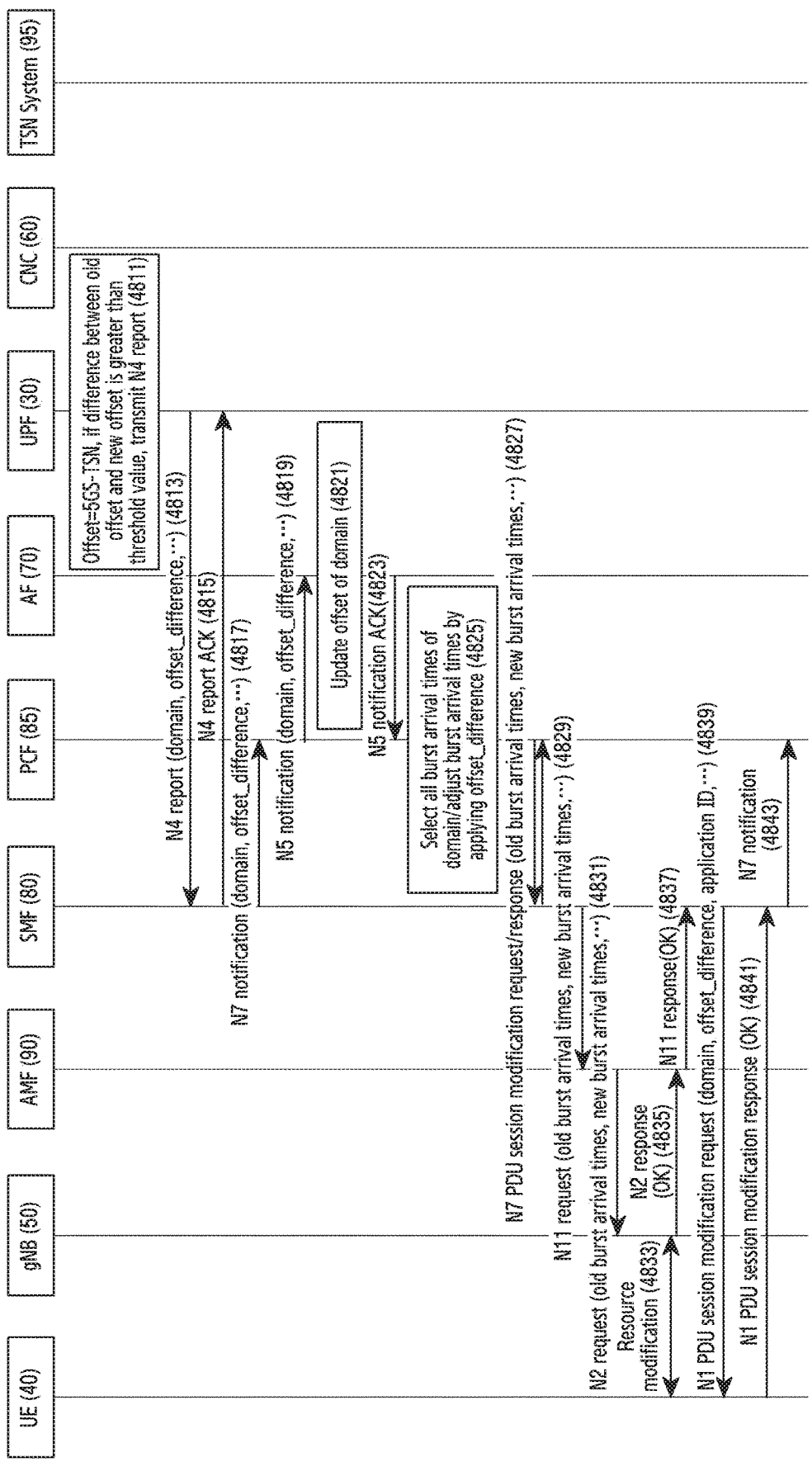
FIG. 48 is a signal flow diagram showing the flow of UPF→SMF→PCF utilized in a method in which a gNB uses an adjusted burst arrival time and illustrates adjustment performed by the PCF according to an embodiment of the disclosure.
Figure 49:
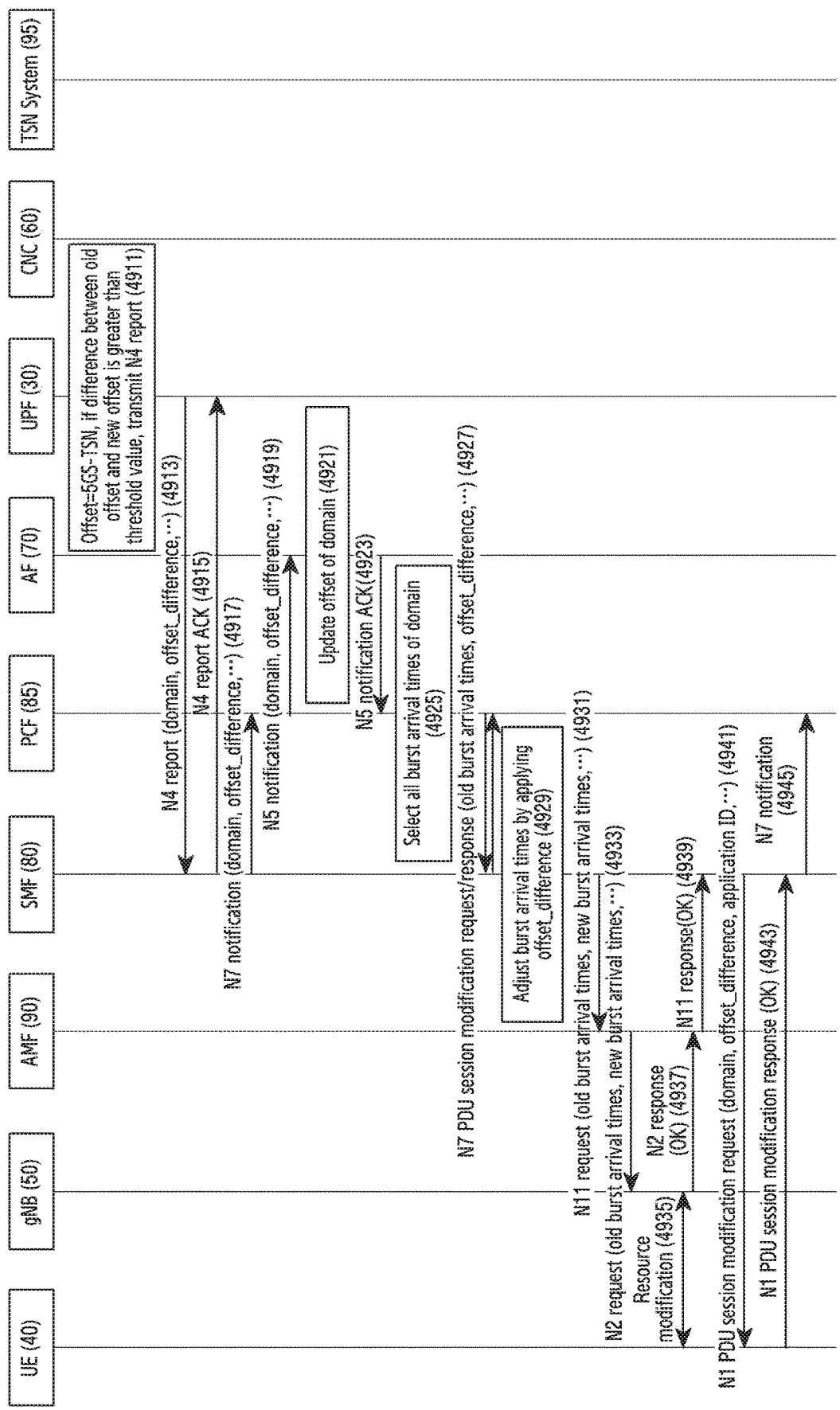
FIG. 49 is a signal flow diagram showing the flow of UPF→SMF→PCF utilized in a method in which a gNB uses an adjusted burst arrival time and illustrates adjustment performed by the SMF according to an embodiment of the disclosure.
Figure 50:
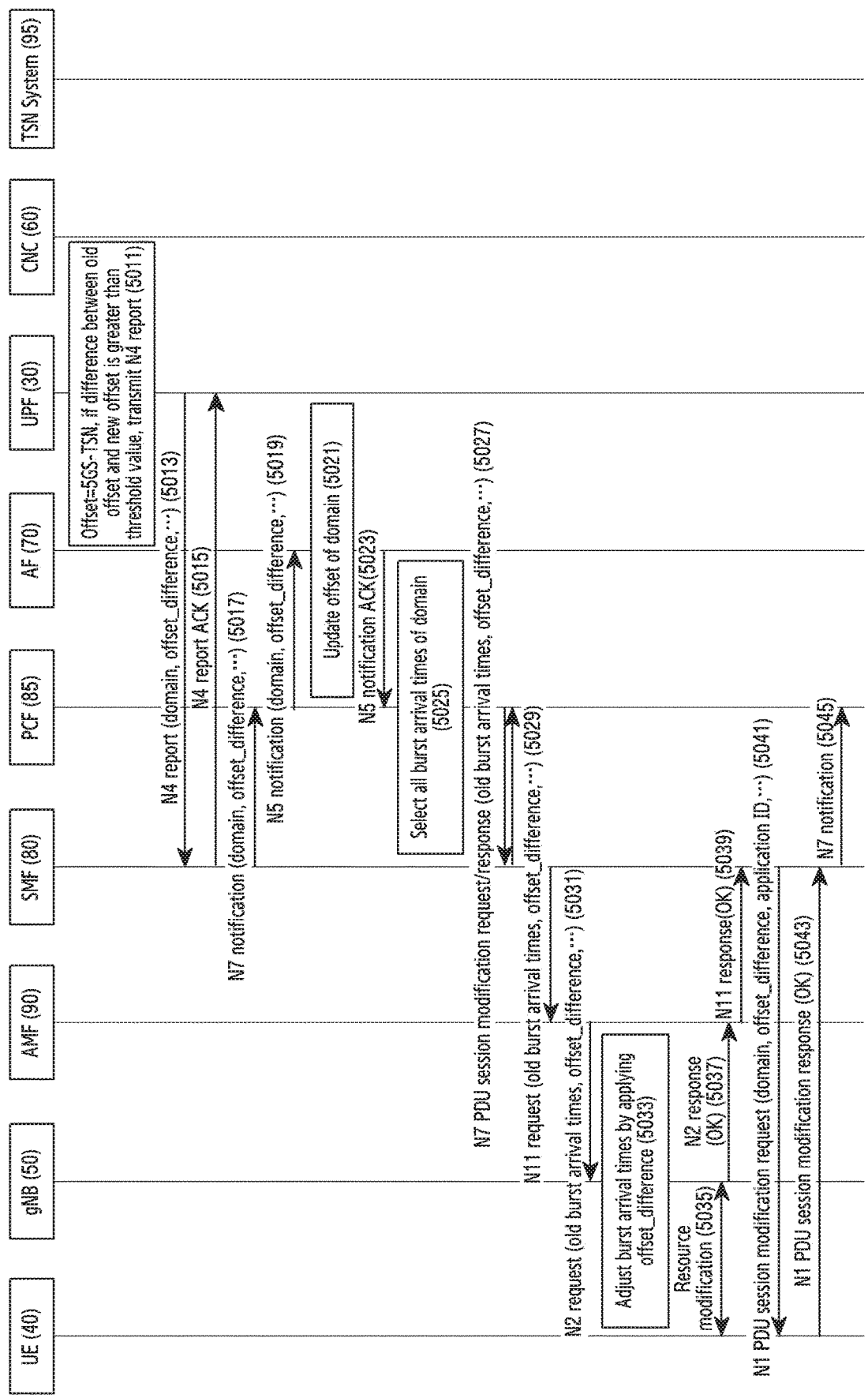
FIG. 50 is a signal flow diagram showing the flow of UPF→SMF→PCF utilized in a method in which a gNB uses an adjusted burst arrival time and illustrates adjustment performed by the gNB according to an embodiment of the disclosure.

FIG. 48 is a signal flow diagram showing the flow of UPF 30→SMF 80→PCF 85 utilized in a method in which the gNB 50 uses an adjusted burst arrival time and illustrates adjustment performed by the PCF 85 according to an embodiment of the disclosure. Operations 4811 to 4843 are shown in FIG. 48. FIG. 49 is a signal flow diagram showing the flow of UPF 30→SMF 80→PCF 85 utilized in a method in which the gNB 50 uses an adjusted burst arrival time and illustrates adjustment performed by the SMF according to an embodiment of the disclosure. Operations 4911 to 4945 are shown in FIG. 49. FIG. 50 is a signal flow diagram showing the flow of UPF 30→SMF 80→PCF 85 utilized in a method in which the gNB 50 uses an adjusted burst arrival time and illustrates adjustment performed by the gNB 50 according to an embodiment of the disclosure. Operations 5011 to 5045 are shown in FIG. 50.

The signaling shown in FIGS. 48, 49, and 50, which utilizes the flow of UPF 30→SMF 80→PCF 85 in a method in which the gNB 50 uses an adjusted burst arrival time, is only an example for explaining the embodiment of the adjustment performed by the PCF 85, SMF 80 or gNB 50, and signaling between specific entities is not to be interpreted as limiting the operation of the embodiment to be described in connection with the drawings. The criterion for triggering information delivery is the same as in FIGS. 14 to 18. After adjustment is performed, the old burst arrival time is used as a stream ID.

Figure 51:
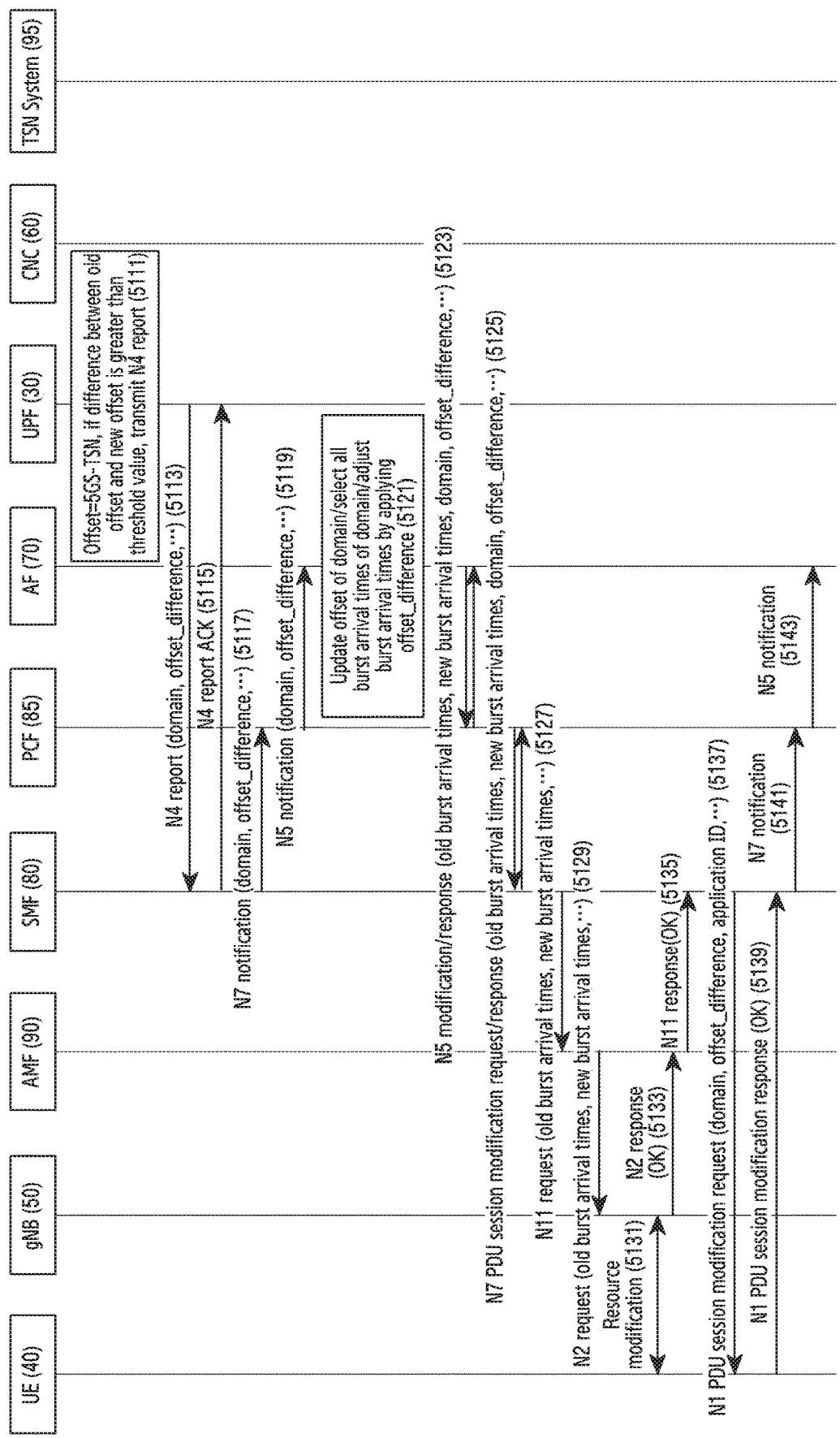
FIG. 51 is a signal flow diagram showing the flow of UPF→SMF→PCF→AF utilized in a method in which a gNB uses an adjusted burst arrival time and illustrates adjustment performed by the AF according to an embodiment of the disclosure.
Figure 52:
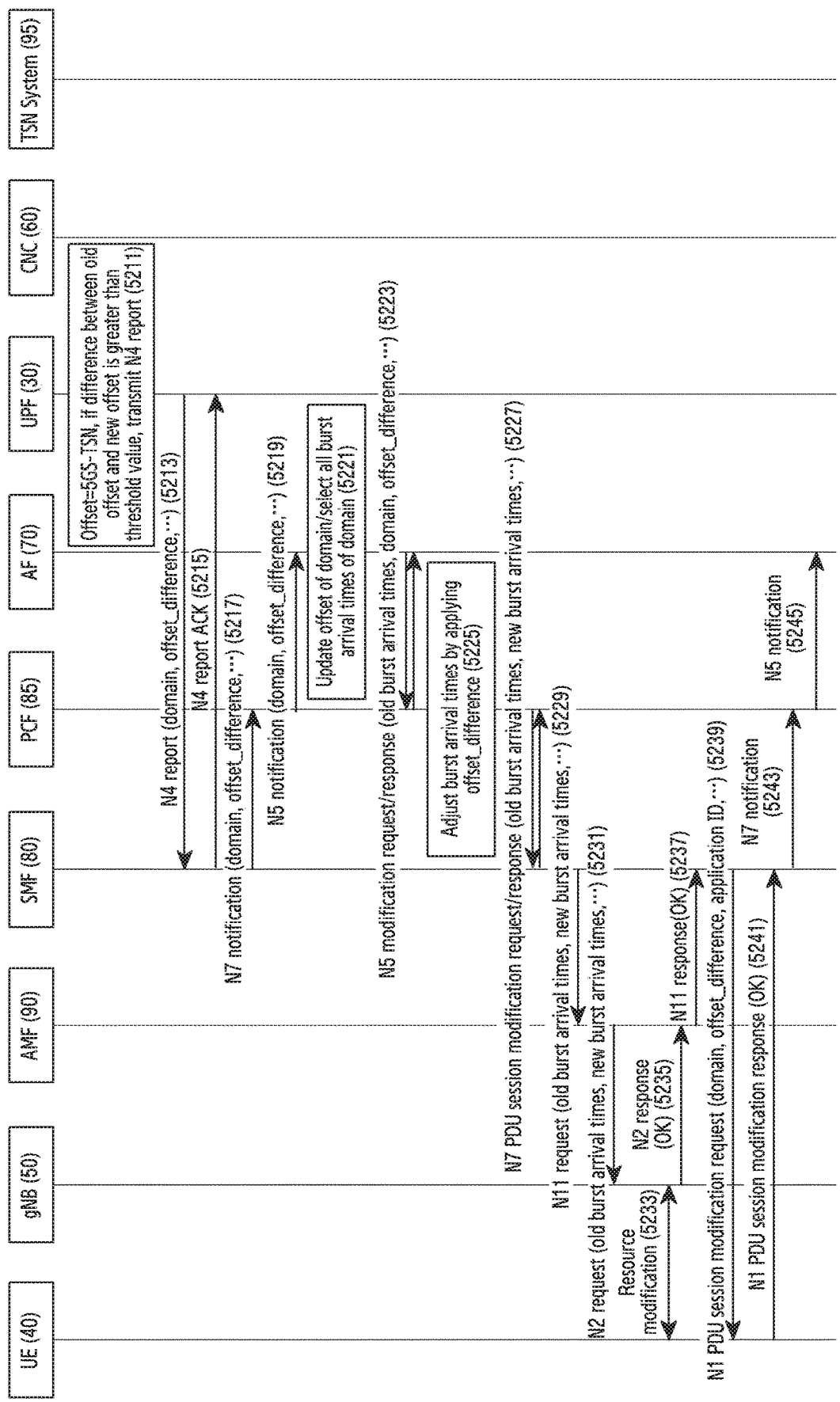
FIG. 52 is a signal flow diagram showing the flow of UPF→SMF→PCF→AF utilized in a method in which a gNB uses an adjusted burst arrival time and illustrates adjustment performed by the PCF according to an embodiment of the disclosure.
Figure 53:
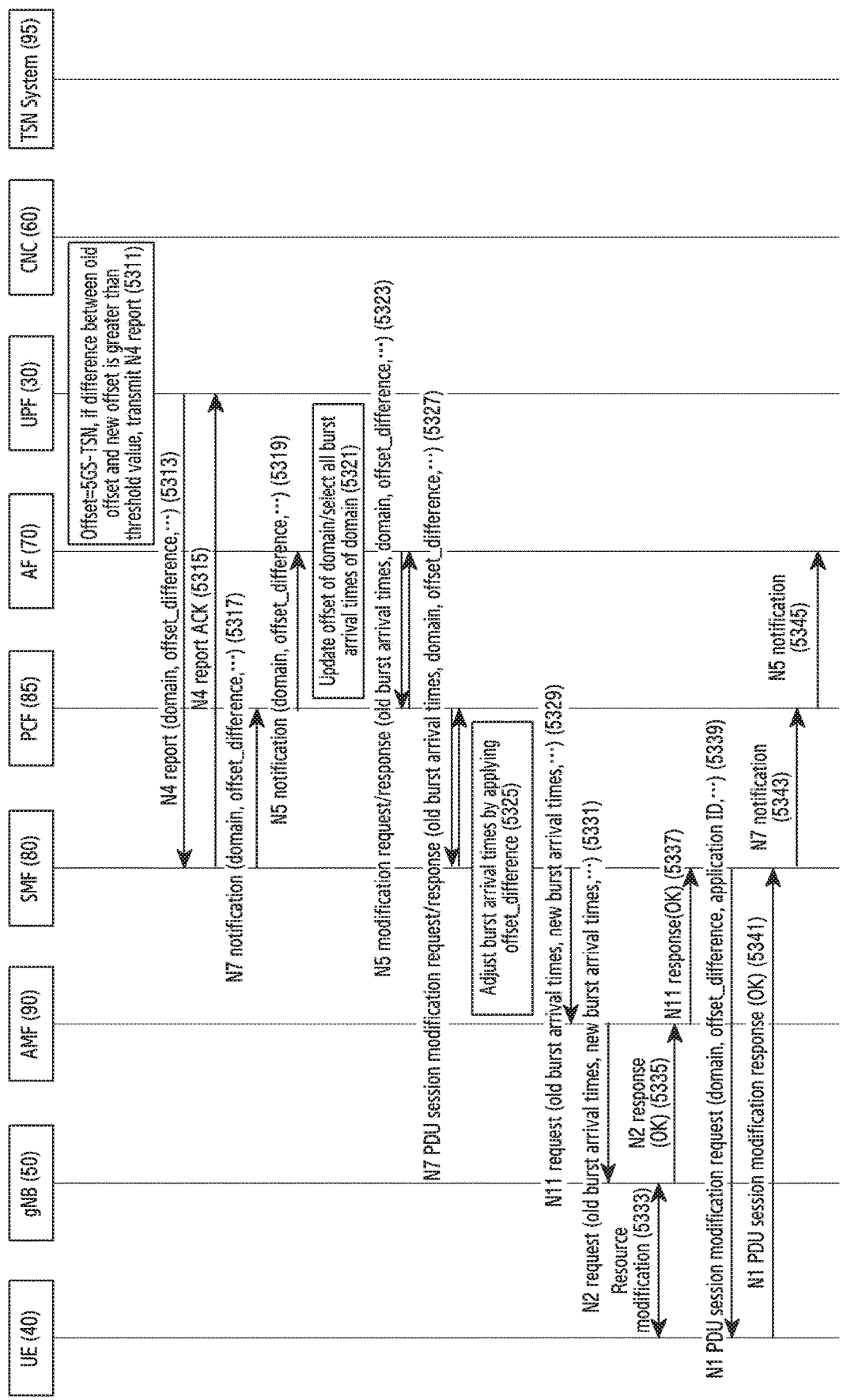
FIG. 53 is a signal flow diagram showing the flow of UPF→SMF→PCF→AF utilized in a method in which a gNB uses an adjusted burst arrival time and illustrates adjustment performed by the SMF according to an embodiment of the disclosure.
Figure 54:
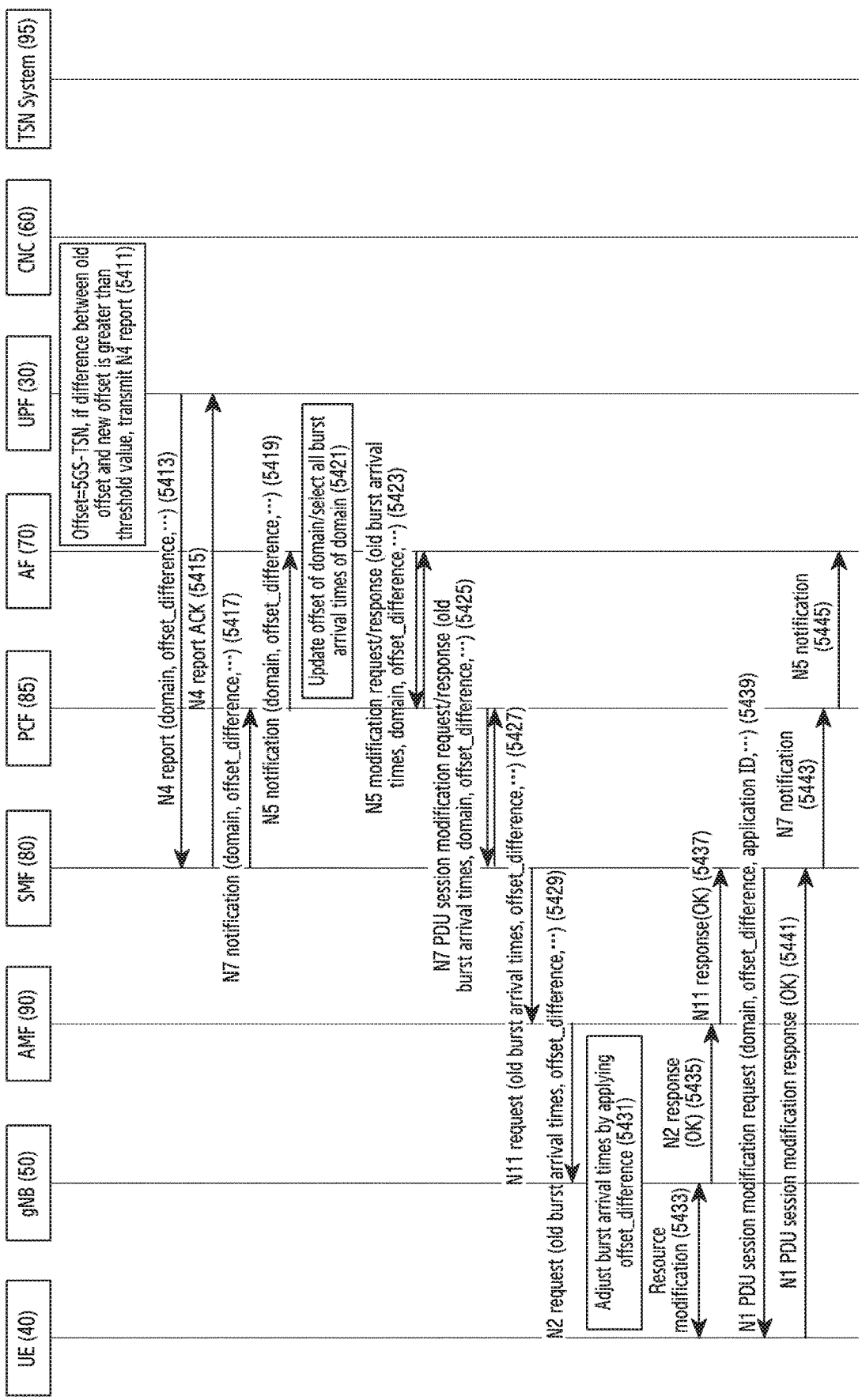
FIG. 54 is a signal flow diagram showing the flow of UPF→SMF→PCF→AF utilized in a method in which a gNB uses an adjusted burst arrival time and illustrates adjustment performed by the gNB according to an embodiment of the disclosure.

FIG. 51 is a signal flow diagram showing the flow of UPF 30→SMF 80→PCF 85→AF 70 utilized in a method in which the gNB 50 uses an adjusted burst arrival time and illustrates adjustment performed by the AF 70 according to an embodiment of the disclosure. Operations 5111 to 5143 are shown in FIG. 51. FIG. 52 is a signal flow diagram showing the flow of UPF 30→SMF 80→PCF 85→AF 70 utilized in a method in which the gNB 50 uses an adjusted burst arrival time and illustrates adjustment performed by the PCF 85 according to an embodiment of the disclosure. Operations 5211 to 5245 are shown in FIG. 52. FIG. 53 is a signal flow diagram showing the flow of UPF 30→SMF 80→PCF 85→AF 70 utilized in a method in which the gNB 50 uses an adjusted burst arrival time and illustrates adjustment performed by the SMF 80 according to an embodiment of the disclosure. Operations 5311 to 5345 are shown in FIG. 53. FIG. 54 is a signal flow diagram showing the flow of UPF 30→SMF 80→PCF 85→AF 70 utilized in a method in which the gNB 50 uses an adjusted burst arrival time and illustrates adjustment performed by the gNB 50 according to an embodiment of the disclosure. Operations 5411 to 5445 are shown in FIG. 54.

The signaling shown in FIGS. 51, 52, 53, and 54, which utilizes the flow of UPF 30→SMF 80→PCF 85→AF 70 in a method in which the gNB 50 uses an adjusted burst arrival time, is only an example for explaining the embodiment of the adjustment performed by the AF 70, PCF 85, SMF 80 or gNB 50, and signaling between specific entities is not to be interpreted as limiting the operation of the embodiment to be described in connection with the drawings. The criterion for triggering information delivery is the same as in FIGS. 14 to 18. After adjustment is performed, the old burst arrival time is used as a stream ID.

Figure 55:
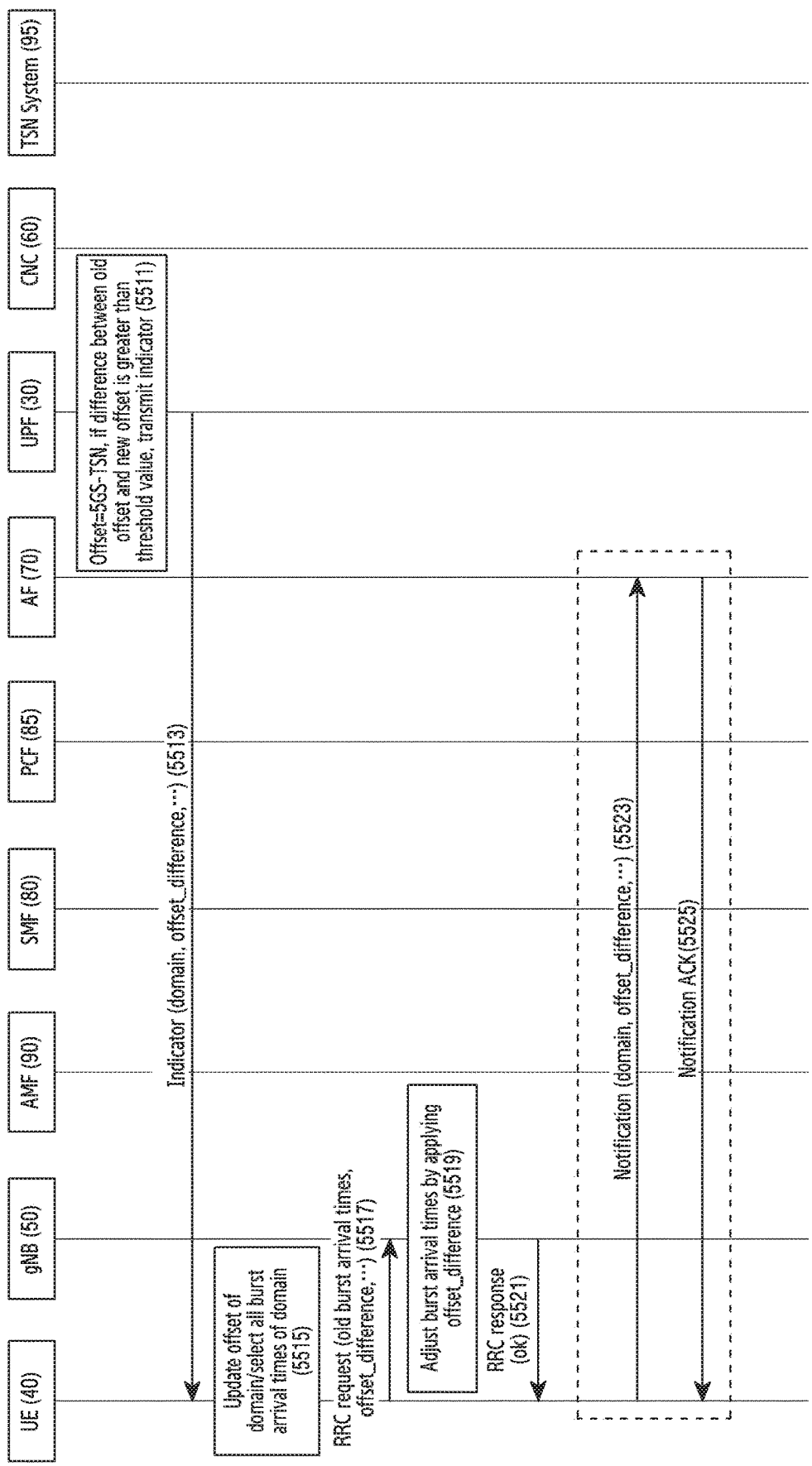
FIG. 55 is a signal flow diagram showing the flow of UPF→UE utilized in a method in which an adjusted burst arrival time is used according to an embodiment of the disclosure.

FIG. 55 is a signal flow diagram showing the flow of UPF 30→UE 40, utilized in a method in which the gNB 50 uses an adjusted burst arrival time, represents the case in which the flow of UE 40→gNB 50 among the subsequent flows from the UE 40 is combined, and in this case, adjustment is performed by the gNB 50 (operation 5519) according to an embodiment of the disclosure. Operations 5511 to 5525 are shown in FIG. 55.

The signaling in FIG. 55 is only an example for explaining an embodiment utilizing the flow of UPF 30→UE 40 in a method in which the gNB 50 uses an adjusted burst arrival time, and signaling between specific entities is not to be interpreted as limiting the operation of the embodiments to be described in connection with the drawings. Reference may be made to FIGS. 22 to 40 in connection with other processes of delivering information from the UE 40.

As described through FIGS. 42 to 55, depending on which entity (e.g., AF, SMF, etc.) performs a mapping operation, the path via which the UPF transmits and updates the difference between the 5G clock and the TSN clock (e.g., time offset and frequency offset) is different. For example, as shown in FIG. 51, the UPF may transmit information on the difference (hereinafter, difference information) between the 5G clock and the TSN clock to the SMF. The SMF may deliver difference information to the AF. The AF may perform a mapping operation, based on the difference information and may obtain a burst arrival time or period mapped based on the 5G clock. The AF may deliver information on the mapped burst arrival time or mapped period to the SMF, and the SMF may deliver information (e.g., burst arrival time and period) in respect to the 5G clock to a base station (e.g., the gNB 50) through a PDU session procedure. For example, as shown in FIG. 52, the UPF may transmit information on the difference between the 5G clock and the TSN clock (hereinafter, difference information) to the SMF. The SMF may deliver the difference information to the AF. The AF may deliver the difference information to the PCF. The PCF may perform a mapping operation, based on the difference information and may obtain a burst arrival time or period mapped based on the 5G clock. The PCF may deliver information on the mapped burst arrival time or mapped period to the SMF, and the SMF may deliver information in respect to the TSN clock to a base station (e.g., the gNB 50) through a PDU session procedure. For example, as shown in FIG. 53, the UPF may transmit information on the difference between the 5G clock and the TSN clock (hereinafter, difference information) to the SMF. The SMF performs a mapping operation, based on the difference information, and may obtain a burst arrival time or period mapped based on a 5G clock. The SMF may deliver information on the mapped burst arrival time or mapped period to the SMF, and the SMF may deliver information in respect to the TSN clock to a base station (e.g., the gNB 50) through a PDU session procedure. For example, as shown in FIG. 54, the UPF may transmit information on the difference between the 5G clock and the TSN clock (hereinafter, difference information) to the SMF. The SMF may deliver the difference information to a base station. The base station may obtain a burst arrival time or period mapped based on the 5G clock. For example, as shown in FIG. 55, the UPF may transmit information on the difference between the 5G clock and the TSN clock (hereinafter, difference information) to a terminal. The terminal may deliver difference information to a base station. The base station may obtain a burst arrival time or period mapped based on the 5G clock.

Since the base station (e.g., gNB) is not aware of the TSN clock, the description has been made on signaling between entities in a core network for delivering an offset, which is the difference between the 5G clock and the TSN clock, to a base station or for delivering information (e.g., burst arrival time associated with a 5G clock reference) in which an offset is reflected. At this time, the offset, which is the difference between the 5GS clock and the TSN clock, may be indicated in a distinguished manner according to the absolute time difference and the speed difference. In one embodiment, the UPF 30 or UE 40 may calculate a time offset=T_5GS-T_TSN (the difference between the 5GS clock and the TSN clock) and may calculate the offset to a frequency offset=frequency_5GS/frequency_TSN. In this case, the time offset may be used to map a burst arrival time based on the TSN clock to a time based on the 5GS clock. The frequency offset may be used to map period based on the TSN clock to period based on the 5GS clock.

When an offset is delivered from the UPF 30 or UE 40 to SMF/PCF/AF, etc., one of the UPF 30 or UE 40 may perform delivery, or both may support the delivery. In some embodiments, the UPF 30 and UE 40 may deliver an offset to at least one of SMF, PCF, or AF. In other embodiments, the UPF 30 may deliver an offset to at least one of SMF, PCF, or AF. When one of the UPF 30 and UE 40 performs the delivery, either of the UPF or the UE may support the delivery. However, resources may be saved when the UPF performs the delivery since the UE uses air resources when delivering. In other embodiments, the UE 40 may deliver an offset to at least one of the SMF, PCF, or AF. In the case in which the UPF is not aware of the TSN clock and only the UE is aware of the TSN clock due to a special case, such as when TSC traffic is transmitted from one UE to another UE, the UE may deliver an offset.

When TSCAI is derived, it is necessary to reflect the difference between the 5GS clock and the TSN clock and correct a CN PDB (packet delay budget) or UE residence time. These two processes may be performed in one network entity (NE) or in another NE. The NE may be an entity of 5GC (e.g., the core network 104 of FIG. 1A). In one embodiment, the AF reflects the difference between the 5GS clock and the TSN clock, and the SMF may correct a CN PDB (packet delay budget) or UE residence time. The AF may map period based on the TSN clock to period based on the 5GS clock using a frequency offset, and the SMF may be responsible for mapping of a burst arrival time based on the TSN clock to a time based on the 5GS clock using a time offset and for mapping of a burst arrival time to which CN PDB, UE residence time, etc. are reflected. In addition, in one embodiment, the AF reflects the difference between the 5GS clock and the TSN clock, and the AMF may correct the CN PDB or UE residence time. In addition, in one embodiment, the AF may reflect the difference between the 5GS clock and the TSN clock, and the AF may correct the CN PDB or UE residence time. In addition, in one embodiment, the AF reflects the difference between the 5GS clock and the TSN clock, and the PCF may correct the CN PDB or UE residence time. In addition, in one embodiment, the SMF reflects the difference between the 5GS clock and the TSN clock, and the SMF may correct the CN PDB or UE residence time. In addition, in one embodiment, the SMF reflects the difference between the 5GS clock and the TSN clock, and the AMF may correct the CN PDB or UE residence time. In addition, in one embodiment, the SMF reflects the difference between the 5GS clock and the TSN clock, and the AF may correct the CN PDB or UE residence time. In addition, in one embodiment, the SMF reflects the difference between the 5GS clock and the TSN clock, and the PCF may correct the CN PDB or UE residence time.

In the disclosure, the description has been made on roles/signaling of each entity with respect to a main entity that maps a time offset and a frequency offset. However, various embodiments are not limited thereto. In some embodiments, an entity responsible for mapping a time offset and an entity responsible for mapping a frequency offset may be configured independently of each other. That is, functional separation between the AF and the SMF may be performed in order to obtain information in TSCAI associated with the TSN clock. According to one embodiment, the AF performs time conversion using a time offset (e.g., mapping associated with a burst arrival time of TSCAI), and the SMF performs frequency conversion using a frequency offset (e.g., mapping associated with a burst arrival time of TSCAI). The AF performs time conversion of TSCAI, and the SMF may reflect only CN PDB, UE residence time, and the like inside 5GS. In addition, according to one embodiment, the AF maps only period (mapping period information from the TSN clock to the 5G clock) by reflecting only a frequency offset (e.g., frequency ratio), and the SMF may include CN PDB, UE residence time, etc. so as to be responsible for mapping of a burst arrival time.

In the disclosure, the gNB has been described for the sake of illustration as a base station of an access network (AN), but the embodiments herein are not limited thereto. That is, the embodiments may be applied in the same or a similar manner for a base station using a 5G core network, rather than the gNB. For example, in the case in which a base station (e.g., eNB) associated with LTE RAT (radio access technology) is connected to a 5GC (5G core) instead of an EPC, the base station may obtain TSSAI according to the first solution or second solution which have been described in connection with FIGS. 5 to 55.

Methods disclosed in the claims and/or methods according to various embodiments described in the specification of the disclosure may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in nonvolatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of them may form a memory in which the program is stored. Further, a plurality of such memories may be included in the electronic device.

In addition, the programs may be stored in an attachable storage device which may access the electronic device through communication networks such as the Internet, Intranet, Local Area Network (LAN), Wide LAN (WLAN), and Storage Area Network (SAN) or a combination thereof. Such a storage device may access the electronic device via an external port. Further, a separate storage device on the communication network may access a portable electronic device.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a session management function (SMF) in a wireless communication system, the method comprising:
   performing a mapping of a burst arrival time from a time-sensitive networking (TSN) clock to a $5^{th}$ generation (5G) clock based on an offset between a $5^{th}$ generation system (5GS) time and a time-sensitive networking (TSN) time; and
   transmitting, to a node of an access network, time-sensitive communication assistant information (TSCAI) including information on the burst arrival time mapped to the 5G clock.

2. The method of claim 1, further comprising receiving information on the offset from a user-plane function (UPF).

3. The method of claim 2, wherein, in case that a change to the offset from a previous offset between a TSN time and a 5GS time is larger than a threshold, the information on the offset is received from the UPF.

4. The method of claim 2, wherein the TSCAI is transmitted based on a protocol data unit (PDU) session modification procedure.

5. The method of claim 1,
   wherein the burst arrival time is determined based on a core network (CN) packet delay budget (PDB) if the burst arrival time is associated with a downlink, and
   wherein the burst arrival time is determined based on a UE residence time if the burst arrival time is associated with an uplink.

6. The method of claim 1, further comprising:
   receiving information from an application function (AF); and
   determining the TSCAI, based on the received information.

7. A method performed by a node of an access network in a wireless communication system, the method comprising:

receiving time-sensitive communication assistant information (TSCAI) including information on a burst arrival time associated with a $5^{th}$ generation (5G) clock from a session management function (SMF), wherein the information on the burst arrival time associated with the 5G clock is determined based on an offset between a $5^{th}$ generation system (5GS) time and a time-sensitive networking (TSN) time.

8. An apparatus of a session management function (SMF) in a wireless communication system, the apparatus comprising:
at least one transceiver; and
at least one processor coupled to the at least one transceiver,
wherein the at least one processor is configured to:
obtain a mapped burst arrival time associated with a $5^{th}$ generation (5G) clock based on a mapping of a burst arrival time from a time-sensitive networking (TSN) clock to the 5G clock, and
control the at least one transceiver to transmit time-sensitive communication assistant information (TSCAI) including information on the mapped burst arrival time associated with the 5G clock to a node of an access network, and
wherein the mapping of the burst arrival time from the TSN clock to the 5G clock is performed in the SMF, based on an offset between a $5^{th}$ generation system (5GS) time and a TSN time.

9. The apparatus of claim 8, wherein the at least one processor is further configured to control the at least one transceiver to receive information on the offset from a user-plane function (UPF).

10. The apparatus of claim 9, wherein in case that a change to the offset from a previous offset between a TSN time and a 5GS time is larger than a threshold, the information on the offset is transmitted from the UPF.

11. The apparatus of claim 9, wherein the TSCAI is transmitted based on a protocol data unit (PDU) session modification procedure.

12. The apparatus of claim 8,
wherein the burst arrival time is determined based on a core network (CN) packet delay budget (PDB) if the burst arrival time is associated with a downlink, and
wherein the burst arrival time is determined based on a UE residence time if the burst arrival time is associated with an uplink.

13. The apparatus of claim 8, wherein the at least one processor is further configured to:
control the at least one transceiver to receive information from an application function (AF); and
determine the TSCAI, based on the received information.

14. An apparatus of a node of an access network in a wireless communication system, the apparatus comprising:
at least one transceiver; and
at least one processor coupled to the at least one transceiver,
wherein the at least one processor is configured to control the at least one transceiver to receive time-sensitive communication assistant information (TSCAI) including information on a burst arrival time associated with a $5^{th}$ generation (5G) clock from a session management function (SMF), and
wherein the information on the burst arrival time associated with the 5G clock is determined based on an offset between a $5^{th}$ generation system (5GS) time and a time-sensitive networking (TSN) time.

15. The method of claim 1, further comprising:
performing a mapping of a period from the TSN clock to the 5G clock based on a frequency offset between the 5GS time and the TSN time, the frequency offset received from a user-plane function (UPF),
wherein the TSCAI includes information on the period mapped to the 5G clock.

16. The method of claim 15, wherein, in case that a change to the frequency offset from a previous frequency offset between a TSN time and a 5GS time is larger than a threshold, the information on the frequency offset is received from the UPF.

17. The apparatus of claim 8,
wherein the at least one processor is further configured to perform a mapping of a period from the TSN clock to the 5G clock based on a frequency offset between the 5GS time and the TSN time, the frequency offset received from a user-plane function (UPF), and
wherein the TSCAI includes information on the period mapped to the 5G clock.

18. The apparatus of claim 17, wherein, in case that a change to the frequency offset from a previous frequency offset between a TSN time and a 5GS time is larger than a threshold, the information on the frequency offset is received from the UPF.

* * * * *